(12) United States Patent
Kobayashi et al.

(10) Patent No.: US 6,334,028 B1
(45) Date of Patent: Dec. 25, 2001

(54) PHOTO PRINTING SYSTEM AND CAMERA FOR THE SAME

(75) Inventors: Hideo Kobayashi; Kazunori Ohno; Katsuji Ozawa; Michio Cho; Yoichi Iwasaki; Kazuhiko Onda; Takao Kōda; Shigenori Goto, all of Saitama-ken (JP)

(73) Assignees: Fuji Photo Optical Co., Ltd.; Fuji Photo Film Co., Ltd., both of Saitama-ken (JP)

( * ) Notice: Subject to any disclaimer, the term of this patent is extended or adjusted under 35 U.S.C. 154(b) by 0 days.

(21) Appl. No.: 09/907,635

(22) Filed: Jul. 19, 2001

Related U.S. Application Data

(62) Division of application No. 09/656,965, filed on Sep. 7, 2000, which is a division of application No. 09/257,215, filed on Feb. 25, 1999, now Pat. No. 6,137,957.

(30) Foreign Application Priority Data

| Feb. 25, 1998 | (JP) | 10-44116 |
| Feb. 25, 1998 | (JP) | 10-44119 |
| Feb. 25, 1998 | (JP) | 10-44122 |
| Feb. 25, 1998 | (JP) | 10-44123 |

(51) Int. Cl.[7] ............ G03B 15/03; G03B 17/00
(52) U.S. Cl. ............ 396/62; 396/175; 396/311; 396/321
(58) Field of Search ............ 396/62, 175, 208, 396/207, 311, 321, 310

(56) References Cited

U.S. PATENT DOCUMENTS

| 4,462,666 | * | 7/1984 | Orban | 396/62 |
| 4,583,831 | | 4/1986 | Harvey | 396/318 |
| 5,293,189 | * | 3/1994 | Taniguchi et al. | 396/311 |
| 5,606,383 | | 2/1997 | Daitoku et al. | 396/60 |
| 5,848,302 | | 12/1998 | Machida | 396/60 |
| 5,966,551 | | 10/1999 | Haraguchi et al. | 396/84 |

FOREIGN PATENT DOCUMENTS

| 0726672 | 8/1996 | (EP) . |
| 0751674 | 1/1997 | (EP) . |

* cited by examiner

*Primary Examiner*—W. B. Perkey
(74) *Attorney, Agent, or Firm*—Young & Thompson

(57) ABSTRACT

A pseudo zoom camera, which utilizes a film cartridge provided with an information storing device, comprises a taking lens optical system for projecting an object image onto a portion of photographic film, which portion has been pulled out of the film cartridge. The camera also comprises a finder optical system capable of displaying an image of a field angle, which is different from the field angle of the object image formed by the taking lens optical system, in a predetermined region representing an image-recording range. A writing device writes information representing an image range ratio of the image, which is displayed in the predetermined region by the finder optical system, to the object image, the information being written on the information storing device of the film cartridge.

20 Claims, 31 Drawing Sheets

F I G. 32A
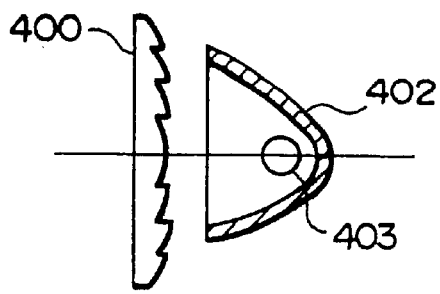
F I G. 32B
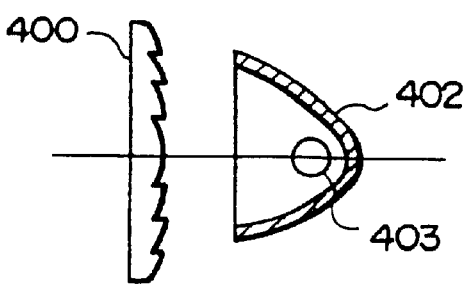
F I G. 33
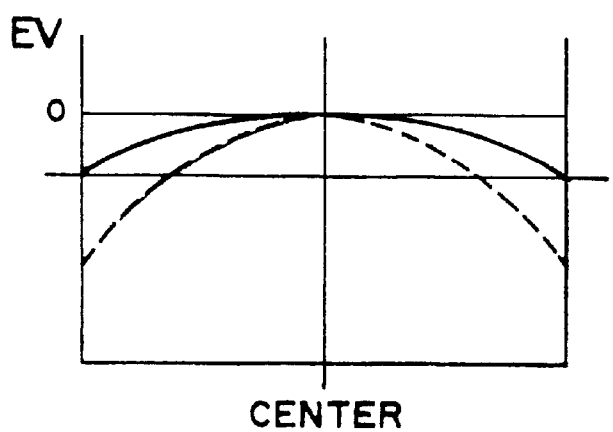

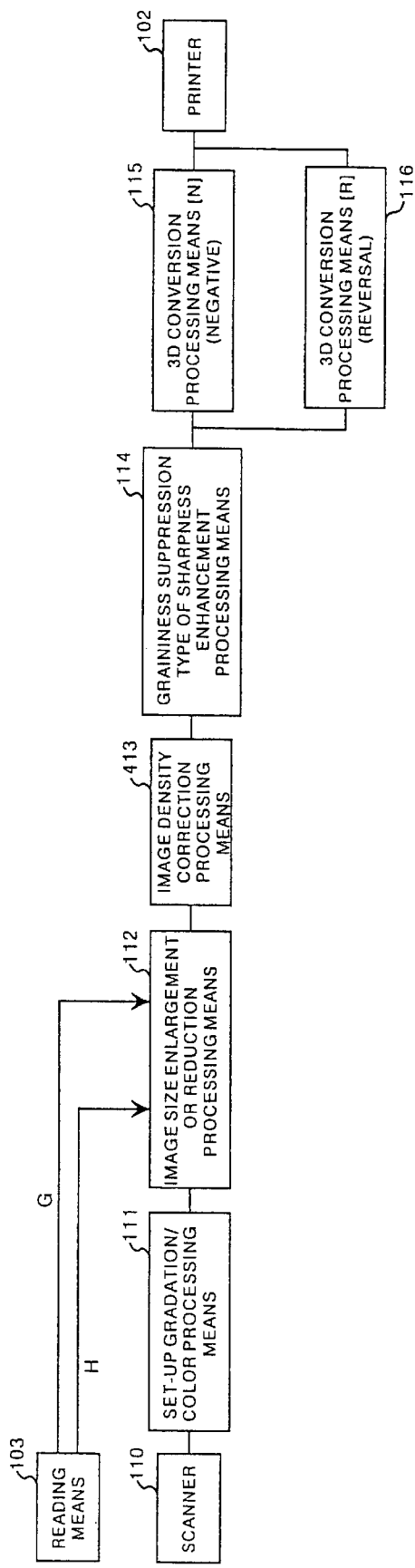

PHOTO PRINTING SYSTEM AND CAMERA FOR THE SAME

This application is a division of co-pending Application Ser. No. 09/656,965 filed on Sep. 7, 2000, which is a division of Application No. 09/257,215 filed on Feb. 25, 1999, now U.S. Pat. No. 6,137,957 the entire contents of which are hereby incorporated by reference.

BACKGROUND OF THE INVENTION

1. Field of the Invention

This invention relates to a photo printing system, wherein an image of a field angle different from the field angle of an image, which has been recorded on photographic film with a photographing operation, is capable of being printed. This invention also relates to a photo printing system, wherein a photograph, which has been taken under incorrect conditions of light distribution characteristics and/or a light throw distance of a strobe, is capable of being printed as if it were taken with a correct exposure. This invention further relates to a camera for use in the photo printing system. This invention still further relates to a zoom finder constituted such that the field angle of a displayed image can be altered continuously.

2. Description of the Prior Art

Photo printing systems, wherein an enlargement magnification ratio in a printing process is adjusted, and an image of a field angle different from the field angle of an image, which has been recorded on photographic film with a photographing operation, is thereby printed, have heretofore been proposed. One example of such photo printing systems is disclosed in Japanese Patent Publication No. 5(1993)-82921. It is necessary for cameras corresponding to such photo printing systems to be formed such that the field angle of a printed photograph can be specified, such that the photographer can confirm the specified field angle, and such that the printing process in a processing laboratory, or the like, can be notified of the specified field angle.

One example of a pseudo zoom camera formed in the manner described above is disclosed in Japanese Patent Publication No. 5(1993)-82921. The disclosed pseudo zoom camera has a structure such that a zoom ring of a zoom taking lens can be moved to a region beyond a tele-side limit or a wide-angle side limit of the lens itself, such that part of the visual field within a finder may be limited by a masking unit and a printing range is thereby displayed when the zoom ring has been moved to such a region, and such that information, which represents what masking state was set when the photograph was taken, may be optically recorded in an area outside of an image recording region on the film.

With the pseudo zoom camera having the structure described above, in the pseudo zoom region, the size of the image displayed in the finder is invariable. Therefore, in cases where the pseudo zoom camera having the structure described above is used, the problems are encountered in that it is difficult for the photographer to intuitively ascertain an image of a print obtained from pseudo zoom functions.

For example, in the pseudo zoom region on the tele-side, as the zoom magnification ratio is set to be high, the masking range becomes broad and the visual field in the finder becomes narrow. However, a photographer, or the like, who is inexperienced in pseudo zoom cameras, cannot easily imagine that a print, in which such a narrow range has been enlarged to a predetermined size, is obtained, and he will intuitively feel that a print, in which a peripheral blank area is broad and an image-recording range is limited to a narrow area, is obtained.

SUMMARY OF THE INVENTION

The primary object of the present invention is to provide a pseudo zoom camera, which is capable of indicating an image reproduction range on a print obtained from pseudo zoom functions such that a photographer can easily ascertain the image reproduction range.

Another object of the present invention is to provide a photo printing system, wherein a photoprint of the same field angle as that indicated by a finder of the pseudo zoom camera is capable of being obtained from a film cartridge, which has been used in the pseudo zoom camera.

A further object of the present invention is to provide a pseudo zoom camera, wherein magnification ratios, which are required of a taking zoom lens and a tele-conversion lens such that a zoom magnification ratio of a print obtained from pseudo zoom functions may be kept high, are kept to be comparatively low, and the camera is thereby kept small in size and cheap in cost.

A still further object of the present invention is to provide a photo printing system, wherein a photographic image having been recorded on photographic film with the pseudo zoom camera, in which the magnification ratios required of the taking zoom lens and the tele-conversion lens are kept to be comparatively low, is printed as an image of a field angle different from the field angle of the photographic image, which has been recorded on the photographic film.

Another object of the present invention is to provide a photo printing system, wherein a photograph, which has been taken under incorrect conditions of light distribution characteristics and/or a light throw distance of a strobe, is capable of being printed as if it were taken with a correct exposure.

A further object of the present invention is to provide a camera, with which a photographer is capable of taking a photograph by arbitrarily altering the light distribution characteristics and/or the light throw distance of the strobe on the assumption that an incorrect exposure will be compensated for by the photo printing system.

A still further object of the present invention is to provide a zoom finder wherein, even if a zoom ratio is set to be high, various aberrations are capable of being kept to be low, and wherein the overall length of the finder is capable of being kept to be comparatively short.

The present invention provides a first pseudo zoom camera, which utilizes a film cartridge provided with an information storing means, the pseudo zoom camera comprising:

i) a taking lens optical system for projecting an object image onto a portion of photographic film, which portion has been pulled out of the film cartridge, ii) a finder optical system capable of displaying an image of a field angle, which is different from the field angle of the object image formed by the taking lens optical system, in a predetermined region representing an image-recording range, and iii) a writing means for writing information representing an image range ratio of the image, which is displayed in the predetermined region by the finder optical system, to the object image, the information being written on the information storing means of the film cartridge.

In the first pseudo zoom camera in accordance with the present invention, by way of example, the finder optical system may comprise:

a) a fundamental optical system for displaying an image of a field angle, which approximately coincides with the field angle of the object image formed by the taking lens optical system, in the predetermined region, and b) at least one conversion lens, which is releasably combined with the fundamental optical system, and which alters the field angle of the displayed image in the predetermined region when it is combined with the fundamental optical system, and the writing means may write information, which is defined by relationship between a magnification ratio of the fundamental optical system and a magnification ratio of the taking lens optical system and by a magnification ratio of the conversion lens, which is combined with the fundamental optical system.

Also, the fundamental optical system of the finder optical system and the taking lens optical system should preferably be zoom optical systems, which are interlocked with each other at least in a partial region.

In cases where the zoom optical systems interlocked with each other are employed, the pseudo zoom camera should preferably further comprise a lens driving means, which combines a predetermined conversion lens with the fundamental optical system of the finder optical system when a zooming position of the taking lens optical system has been set at a predetermined position.

In cases where the lens driving means described above is provided and a conversion lens is automatically combined with the fundamental optical system of the finder optical system, the pseudo zoom camera should preferably further comprise means for carrying out a zooming operation of the fundamental optical system of the finder optical system when a state of combination of the fundamental optical system and a conversion lens with each other (i.e., whether a conversion lens is or is not combined with the fundamental optical system, or the kind of the conversion lens combined with the fundamental optical system) is changed over, the zooming operation of the fundamental optical system being carried out such that a magnification ratio of the entire finder optical system before the change-over is carried out and the magnification ratio of the entire finder optical system after the change-over is carried out may become approximately identical with each other.

In cases where the fundamental optical system of the finder optical system and the taking lens optical system are constituted as the zoom optical systems, which are interlocked with each other, the pseudo zoom camera may further comprise a pseudo zoom operation switch, which is to be operated by a photographer, and a lens driving means, which combines a predetermined conversion lens with the fundamental optical system of the finder optical system in accordance with the operation of the pseudo zoom operation switch.

In the first pseudo zoom camera in accordance with the present invention, the taking lens optical system may be an optical system having a fixed focal length, and the finder optical system may be a zoom optical system.

Also, in the first pseudo zoom camera in accordance with the present invention, the taking lens optical system and the finder optical system may be zoom optical systems, which are interlocked with each other in a partial region, the zoom optical system, which constitutes the finder optical system, having a zoom ratio higher than the zoom ratio of the zoom optical system, which constitutes the taking lens optical system.

The present invention also provides a first photo printing system, wherein a photoprint is obtained from the film cartridge having been used in the first pseudo zoom camera in accordance with the present invention, the photo printing system comprising:

i) a printing means for printing the object image in a predetermined image forming area on a recording material and from the photographic film, which has been subjected to development processing, the printing being carried out such that image size enlargement and reduction scales may be altered, ii) a reading means for reading the information representing the image range ratio, which information has been written on the information storing means of the film cartridge, and iii) an image size enlargement and reduction scales control means for setting the image size enlargement scale or the image size reduction scale in the printing operation, which is carried out by the printing means, at a value obtained by multiplying a normal value, at which the object image formed by the taking lens optical system is printed in the image forming area such that the entire area of the object image may approximately exactly correspond to the entire area of the image forming area, by the image range ratio, which has been read by the reading means.

In the first photo printing system in accordance with the present invention, the printing means should preferably comprise:

a) a film image read-out means for reading out a film image formed on the photographic film, which has been subjected to the development processing, and thereby obtaining an image signal representing the film image, b) a printed image output means for reproducing the film image on the recording material from the image signal, and c) a signal processing means for carrying out signal processing on the image signal, and thereby altering a printed image output magnification ratio in the printed image output means.

Alternatively, the printing means may comprise:

a) a film support means for supporting the photographic film, which has been subjected to the development processing, b) a projection optical system for projecting a film image, which has been formed on the photographic film, onto a photosensitive recording material, and c) means for changing relationship between positions of at least two among the projection optical system, the film support means, and the photosensitive recording material, and thereby altering a projection magnification ratio of the film image.

The present invention further provides a second pseudo zoom camera for use in taking a photograph for obtaining pseudo zoom effects with the maximum zoom magnification ratio of m by changing an enlargement ratio in a printing operation, the pseudo zoom camera comprising:

i) a taking zoom lens for projecting an object image onto photographic film, the taking zoom lens having a zoom magnification ratio of n, ii) a finder zoom optical system capable of displaying an image of a field angle, which is different from the field angle of the object image formed by the taking zoom lens, in a region representing an image-recording range, the finder zoom optical system having a zoom magnification ratio of p, where $n<p<m \cdot n$, iii) a tele-conversion lens, which is releasably combined with the finder zoom optical system, and which alters the field angle of the displayed image in the predetermined region when it is combined with the finder zoom optical system, the tele-conversion lens having a magnification ratio of q, and iv) a conversion lens driving means, which is to be operated by a photographer, and which locates the tele-conversion lens selectively at a position that combines with the finder zoom optical system or at a position that is released from the finder zoom optical system.

In the second pseudo zoom camera in accordance with the present invention, the magnification ratios should preferably be set such that m·n=p·q.

Also, the second pseudo zoom camera in accordance with the present invention should preferably utilize a film cartridge provided with an information storing means and should preferably further comprise a writing means for writing information representing an image range ratio of the image, which is displayed in the region representing the image-recording range, to the object image, the information being written on the information storing means of the film cartridge.

The present invention still further provides a second photo printing system, wherein a photoprint is obtained from the film cartridge having been used in the second pseudo zoom camera in accordance with the present invention, the photo printing system comprising:

i) a printing means for printing the object image in a predetermined image forming area on a recording material and from the photographic film, which has been subjected to development processing, the printing being carried out such that image size enlargement and reduction scales may be altered, ii) a reading means for reading the information representing the image range ratio, which information has been written on the information storing means of the film cartridge, and iii) an image size enlargement and reduction scales control means for setting the image size enlargement scale or the image size reduction scale in the printing operation, which is carried out by the printing means, at a value at which the image of the field angle displayed in the region by the finder zoom optical system is printed in the image forming area such that the entire area of the image displayed in the region may approximately exactly correspond to the entire area of the image forming area, the image size enlargement scale or the image size reduction scale being set in accordance with the information, which has been read by the reading means.

In the second photo printing system in accordance with the present invention, the printing means should preferably comprise:

a) a film image read-out means for reading out a film image formed on the photographic film, which has been subjected to the development processing, and thereby obtaining an image signal representing the film image, b) a printed image output means for reproducing the film image on the recording material from the image signal, and c) a signal processing means for carrying out signal processing on the image signal, and thereby altering a printed image output magnification ratio in the printed image output means.

Alternatively, the printing means may comprise:

a) a film support means for supporting the photographic film, which has been subjected to the development processing, b) a projection optical system for projecting a film image, which has been formed on the photographic film, onto a photosensitive recording material, and c) means for changing relationship between positions of at least two among the projection optical system, the film support means, and the photosensitive recording material, and thereby altering a projection magnification ratio of the film image.

The present invention also provides a third camera, which utilizes a film cartridge provided with an information storing means, the camera comprising:

i) a light distribution characteristics altering means for altering light distribution characteristics of a strobe, and ii) a writing means for writing information, which represents the light distribution characteristics with respect to each of frames on photographic film, and information, which represents the corresponding frame number, on the information storing means of the film cartridge.

By way of example, the light distribution characteristics altering means may change positions of a flash tube and a reflector of the strobe relative to the position of an optical panel, which is located in front of the flash tube.

Also, the light distribution characteristics altering means may change relationship between a position of a flash tube of the strobe and a position of a reflector of the strobe. Further, the light distribution characteristics altering means may change characteristics of an optical panel, which is located in front of a flash tube of the strobe. For example, for such purposes, the optical panel may be exchanged with a different one, or a new panel may be added to the optical panel.

Such that the setting of the light distribution characteristics may be carried out easily, the third camera in accordance with the present invention should preferably further comprise:

a taking lens constituted of a zoom optical system, a plurality of tables, each of which defines the light distribution characteristics with respect to one of a plurality of zooming positions of the taking lens, a table selecting means for selecting a table from the plurality of the tables, and a control means for controlling the light distribution characteristics altering means in accordance with the table, which has been selected by the table selecting means, such that the light distribution characteristics according to a zooming position of the taking lens may be obtained.

The present invention further provides a third photo printing system, wherein a photoprint is obtained from the film cartridge having been used in the third camera in accordance with the present invention, the photo printing system comprising:

i) a printing means for printing an object image on a recording material and from the photographic film, which has been subjected to development processing, ii) a reading means for reading the information representing the light distribution characteristics, which information has been written on the information storing means of the film cartridge, and iii) a printed image density control means for controlling printed image density, which is formed by the printing means, in accordance with the information, which has been read by the reading means, such that an incorrect exposure may be compensated for with respect to each portion in a surface of the recording material.

In the third photo printing system in accordance with the present invention, the printed image density control means should preferably control the printed image density at a peripheral portion of the recording material, such that insufficiency in brightness of an edge of an image field due to the strobe may be compensated for.

Also, in order for the printed image density to be controlled appropriately with respect to each portion in the surface of the recording material, the third photo printing system in accordance with the present invention should preferably be modified such that the printing means may comprise:

a) a film image read-out means for reading out a film image formed on the photographic film, which has been subjected to the development processing, and thereby obtaining an image signal representing the film image, and b) a printed image output means for reproducing the film image on the recording material from the image signal, and the printed image density control means may carry out signal processing on the image signal and may thereby change the printed image density.

The present invention still further provides a zoom finder, comprising:

i) a zoom optical system, which is formed as a system independent of a taking lens of a camera, and which displays a visual field image in a predetermined region representing an image-recording range, such that a field angle of the visual field image may be altered, ii) at least one conversion lens, which is releasably combined with the zoom optical system, and which alters the field angle of the displayed image in the predetermined region when it is combined with the zoom optical system, and iii) a lens driving means for moving the conversion lens between a position that combines with the zoom optical system and a position that is released from the zoom optical system.

In the zoom finder in accordance with the present invention, in cases where the taking lens is a zoom lens, the lens driving means should preferably be constituted such that, when a zooming position of the taking lens has been set at a predetermined position, the lens driving means may automatically combine a predetermined conversion lens with the zoom optical system.

In cases where a conversion lens is automatically combined with the zoom optical system, the zoom finder should preferably further comprise means for carrying out a zooming operation of the zoom optical system when a state of combination of the zoom optical system and a conversion lens with each other (i.e., whether a conversion lens is or is not combined with the zoom optical system, or the kind of the conversion lens combined with the zoom optical system) is changed over, the zooming operation of the zoom optical system being carried out such that a magnification ratio of the entire finder optical system before the change-over is carried out and the magnification ratio of the entire finder optical system after the change-over is carried out may become approximately identical with each other.

Also, in cases where the taking lens of the camera is the zoom lens, a range of field angle alteration by the zoom optical system and a conversion lens should preferably be set to be wider than the range of field angle alteration by the taking lens.

With the first pseudo zoom camera in accordance with the present invention, the finder optical system is formed such that the image of the field angle, which is different from the field angle of the object image formed by the taking lens optical system, can be displayed in the predetermined region representing the image-recording range. Also, the information representing the image range ratio of the image, which is displayed in the predetermined region by the finder optical system, to the object image is written on the information storing means of the film cartridge. Therefore, the printing process in a processing laboratory, or the like, which is furnished with the film cartridge, can be notified of in what ratio the range, which has been recognized as the image-recording range by the photographer, differs from the range of the object image having been recorded on the photographic film.

Accordingly, in the first photo printing system in accordance with the present invention, the information representing the image range ratio is read from the information storing means of the film cartridge. Also, in accordance with the thus read information, the image size enlargement scale or the image size reduction scale in the printing operation, which is carried out by the printing means, is set at a value obtained by multiplying the normal value, at which the object image formed by the taking lens optical system is printed in the image forming area of the recording material such that the entire area of the object image may approximately exactly correspond to the entire area of the image forming area, by the image range ratio, which has been read by the reading means. In this manner, a photoprint of the same field angle as that indicated by the finder of the pseudo zoom camera as the image-recording range can be obtained.

Further, with the first pseudo zoom camera in accordance with the present invention, the image of the field angle, which will be printed, is displayed at all times in the predetermined region of the finder. Therefore, the photographer can intuitively and accurately ascertain the field angle of the printed photograph. The feature is advantageous over the conventional technique, wherein the size of the image displayed in the finder is kept the same and the field angle of the image to be printed is adjusted and displayed with the masking operation, or the like.

As described above, the first pseudo zoom camera in accordance with the present invention, wherein the finder optical system comprises the fundamental optical system and at least one conversion lens, may further comprise the lens driving means, which combines a predetermined conversion lens with the fundamental optical system of the finder optical system when a zooming position of the taking lens optical system has been set at a predetermined position. In such cases, it is unnecessary for the photographer to carry out a particular operation for pseudo zoom, and the photographer can thus record the image, which is to be subjected to pseudo zoom processing.

Also, in cases where the lens driving means described above is provided and a conversion lens is automatically combined with the fundamental optical system of the finder optical system, the first pseudo zoom camera in accordance with the present invention may further comprise the means for carrying out a zooming operation of the fundamental optical system of the finder optical system when the state of combination of the fundamental optical system and a conversion lens with each other (i.e., whether a conversion lens is or is not combined with the fundamental optical system, or the kind of the conversion lens combined with the fundamental optical system) is changed over, the zooming operation of the fundamental optical system being carried out such that the magnification ratio of the entire finder optical system before the change-over is carried out and the magnification ratio of the entire finder optical system after the change-over is carried out may become approximately identical with each other. In such cases, the field angle of the image displayed in the finder can be prevented from changing sharply before the change-over is carried out and after the change-over is carried out. Therefore, the photographer can carry out the zooming operation without experiencing a feeling of discomfort.

Further, in cases where the fundamental optical system of the finder optical system and the taking lens optical system are constituted as the zoom optical systems, which are interlocked with each other, the first pseudo zoom camera in accordance with the present invention may further comprise the pseudo zoom operation switch, which is to be operated by the photographer, and the lens driving means, which combines a predetermined conversion lens with the fundamental optical system of the finder optical system in accordance with the operation of the pseudo zoom operation switch. In such cases, the field angle of the image displayed in the finder will change sharply before the pseudo zoom operation switch is operated and after the pseudo zoom operation switch is operated. However, in such cases, since the photographer operates the pseudo zoom operation switch with the intention of changing the photographing field angle to the tele-side or the wide-angle side, he can feel the sharp change in field angle as being natural.

With the first pseudo zoom camera in accordance with the present invention, wherein the taking lens optical system is an optical system having a fixed focal length and the finder optical system is a zoom optical system, the taking lens optical system, which should ordinarily be formed under more severe design conditions from the view point of aberrations, or the like, than in the finder optical system, ago can be kept comparatively simple in structure and cheap in cost.

In the first pseudo zoom camera in accordance with the present invention, the taking lens optical system and the finder optical system may be constituted of the zoom optical systems, which are interlocked with each other in a partial region, the zoom optical system, which constitutes the finder optical system, having a zoom ratio higher than the zoom ratio of the zoom optical system, which constitutes the taking lens optical system. In such cases, a wide range of the photographing field angle and a wide range of the pseudo zoom field angle can be covered by virtue of the finder optical system, while the taking lens optical system is being kept comparatively simple in structure and cheap in cost as described above.

The optical performance required of the finder optical system is lower than the optical performance required of the taking lens optical system. Therefore, even if the finder optical system having a zoom ratio higher than the zoom ratio of the taking lens optical system is employed, ordinarily, no problem will occur in practice.

The second pseudo zoom camera in accordance with the present invention has the effects described below.

When the taking zoom lens and the finder zoom optical system are compared with each other with respect to the tendency to become large in size and expensive in cost due to an increase in zoom magnification ratio, the taking zoom lens has a higher tendency than the finder zoom optical system. With the second pseudo zoom camera in accordance with the present invention, the zoom magnification ratio, n, of the taking zoom lens, which has a high tendency to become large in size and expensive in cost due to an increase in zoom magnification ratio, is set to be lower than the zoom magnification ratio, p, of the finder zoom optical system. Therefore, the taking zoom lens can be prevented from becoming large in size and expensive in cost due to an increase in zoom magnification ratio, and the pseudo zoom camera can be kept comparatively small in size and cheap in cost.

Also, with the second pseudo zoom camera, wherein the zoom magnification ratio, p, of the finder zoom optical system is higher than the zoom magnification ratio, n, of the taking zoom lens, as the tele-conversion lens, which is apt to become large in size and expensive in cost due to an increase in magnification ratio, a tele-conversion lens having a comparatively low magnification ratio can be employed. Therefore, also with this feature, the second pseudo zoom camera in accordance with the present invention can be kept small in size and cheap in cost.

Particularly, with the second pseudo zoom camera in accordance with the present invention, wherein the magnification ratios are set such that $m \cdot n = p \cdot q$, the finder zoom optical system can display at most an image of the same field angle as the field angle of the print in the extreme tele-state, which is obtained by combining the zoom effects of the taking zoom lens and the pseudo zoom effects with each other.

The field angle of the image displayed in the finder will change sharply before the conversion lens driving means is operated by the photographer and after the conversion lens driving means is operated by the photographer. However, in such cases, since the photographer operates the conversion lens driving means with the intention of changing the photographing field angle to the tele-side or the wide-angle side, he can feel the sharp change in field angle as being natural.

With the second photo printing system in accordance with the present invention, the same effects as those with the first photo printing system in accordance with the present invention can be obtained.

With the third camera in accordance with the present invention, which is provided with the light distribution characteristics altering means for altering the light distribution characteristics of the strobe, the photographer can take a photograph by arbitrarily altering the light distribution characteristics and/or the light throw distance of the strobe. For example, the photographer can take a photograph by setting the light distribution characteristics of the strobe such that the peripheral light quantity may be low or such that the light throw distance may be short.

Also, with the third camera in accordance with the present invention, the writing means writes the information, which represents the light distribution characteristics with respect to each of frames on the photographic film, and the information, which represents the corresponding frame number, on the information storing means of the film cartridge. Therefore, the printing process can be notified of the light distribution characteristics of the strobe.

With the third photo printing system in accordance with the present invention, the printed image density can be controlled in accordance with the information representing the light distribution characteristics, which has been read from the information storing means of the film cartridge, such that an incorrect exposure may be compensated for with respect to each portion in a surface of the recording material. Therefore, even if the light distribution characteristics and the light throw distance of the strobe, which were set in the photographing operation, were incorrect, a print can be obtained such that it may have correct image density over the entire area of the surface of the recording material.

With the zoom finder in accordance with the present invention, at least one conversion lens is combined with the zoom optical system, and the field angle of the image displayed in the finder is thereby altered. Therefore, even if a zoom optical system having a comparatively low zoom ratio is employed as the zoom optical system, a high zoom ratio can be achieved as a whole. For example, a zoom optical system having a zoom ratio of 3 may be employed, and a tele-conversion lens having a zoom ratio of 2 may be set at the position that is combined with the zoom optical system or at the position that is released from the zoom optical system. In such cases, a zoom ratio of 6 can be achieved by the entire finder.

Since a high zoom ratio can thus be obtained, a zoom optical system having a comparatively low zoom ratio can be employed as the zoom optical system. As a result, various aberrations of the zoom optical system can be kept small, and the zoom length of the zoom optical system can be kept short. Therefore, the zoom finder in accordance with the present invention can be formed such that the aberrations may be small and the overall length may be comparatively short.

In the zoom finder in accordance with the present invention, in cases where the taking lens is a zoom lens, the lens driving means may be constituted such that, when the zooming position of the taking lens has been set at a predetermined position, the lens driving means may automatically combine a predetermined conversion lens with the zoom optical system. In such cases, it is unnecessary for the photographer to carry out an operation for changing over the conversion lens. When the photographer merely carries out the zooming operation of the taking lens for selecting the photographing field angle, a predetermined conversion lens can be automatically combined with the zoom optical system.

In cases where a conversion lens is automatically combined with the zoom optical system, the zoom finder in accordance with the present invention may further comprise the means for carrying out the zooming operation of the zoom optical system when the state of combination of the zoom optical system and a conversion lens with each other (i.e., whether a conversion lens is or is not combined with the zoom optical system, or the kind of the conversion lens combined with the zoom optical system) is changed over, the zooming operation of the zoom optical system being carried out such that the magnification ratio of the entire finder optical system before the change-over is carried out and the magnification ratio of the entire finder optical system after the change-over is carried out may become approximately identical with each other. In such cases, the field angle of the image displayed in the finder can be prevented from changing sharply before the change-over is carried out and after the change-over is carried out. Therefore, the photographer can carry out the zooming operation without experiencing a feeling of discomfort.

Also, in cases where the taking lens of the camera is the zoom lens, the zoom finder in accordance with the present invention may be constituted such that the range of field angle alteration by the zoom optical system and the conversion lens may be set to be wider than the range of field angle alteration by the taking lens. In such cases, when the pseudo zoom technique or an electronic zoom technique is utilized, a visual field image of the field angle, which is beyond the range of field angle alteration by the taking lens and which is the same as the field angle of a print obtained with the pseudo zoom technique or an image formed by the electronic zoom technique, can be displayed in the finder. (The electronic zoom technique is a technique utilized in an electronic still camera or a video camera for detecting an image, which has been formed by a taking lens, with an image sensor, such as a CCD image sensor. With the electronic zoom technique, the field angle of the formed image is altered by thinning out the image signal components, which represent pixels in the image, or adding new signal components to the image signal components.)

BRIEF DESCRIPTION OF THE DRAWINGS

FIG. 33 is an explanatory diagram showing a change in light distribution characteristics of a strobe, and FIG. 34 is a block diagram showing the major part of an embodiment of the photo printing system in accordance with the present invention.

DESCRIPTION OF THE PREFERRED EMBODIMENTS

The present invention will hereinbelow be described in further detail with reference to the accompanying drawings.

Figure 1:
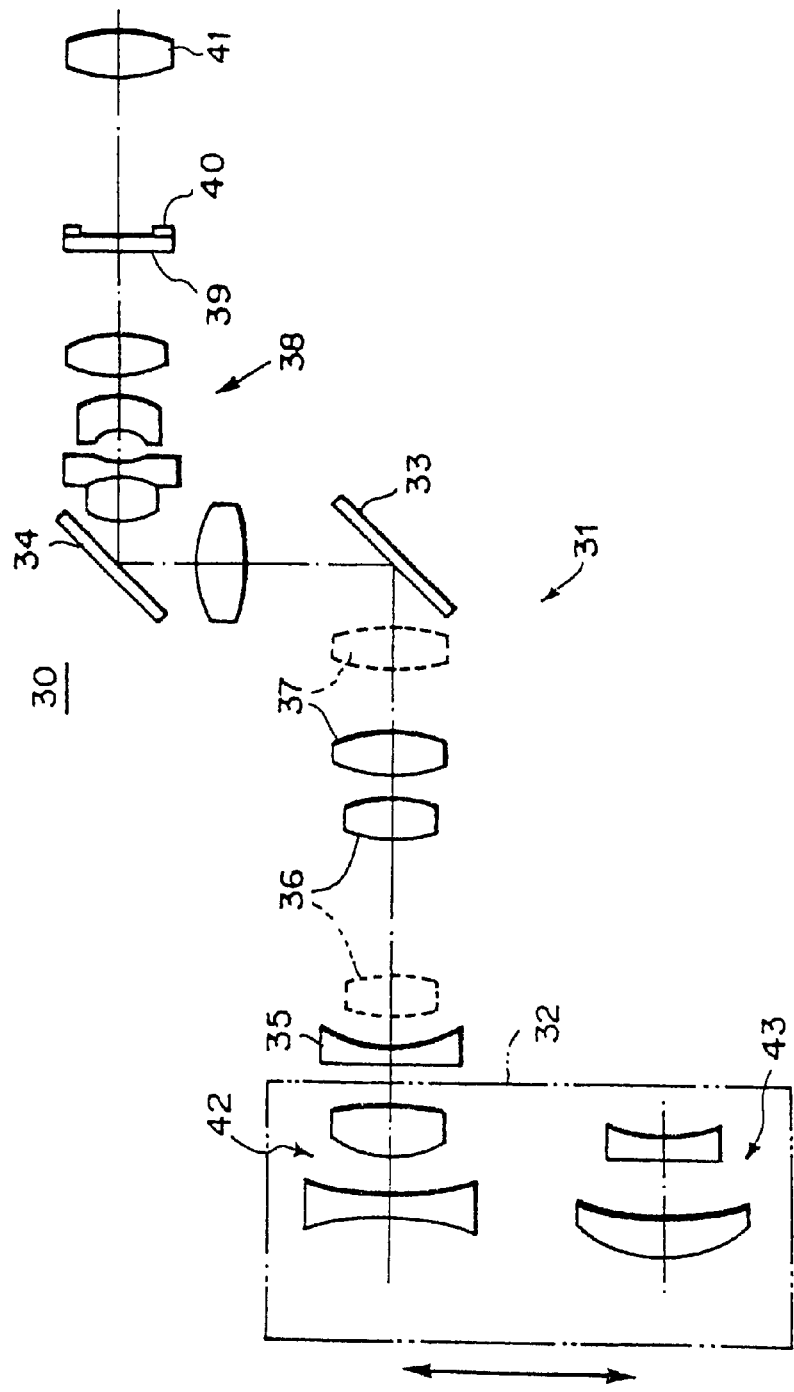
FIG. 1 is a side view showing a finder optical system in a first embodiment of the pseudo zoom camera in accordance with the present invention.
Figure 2:
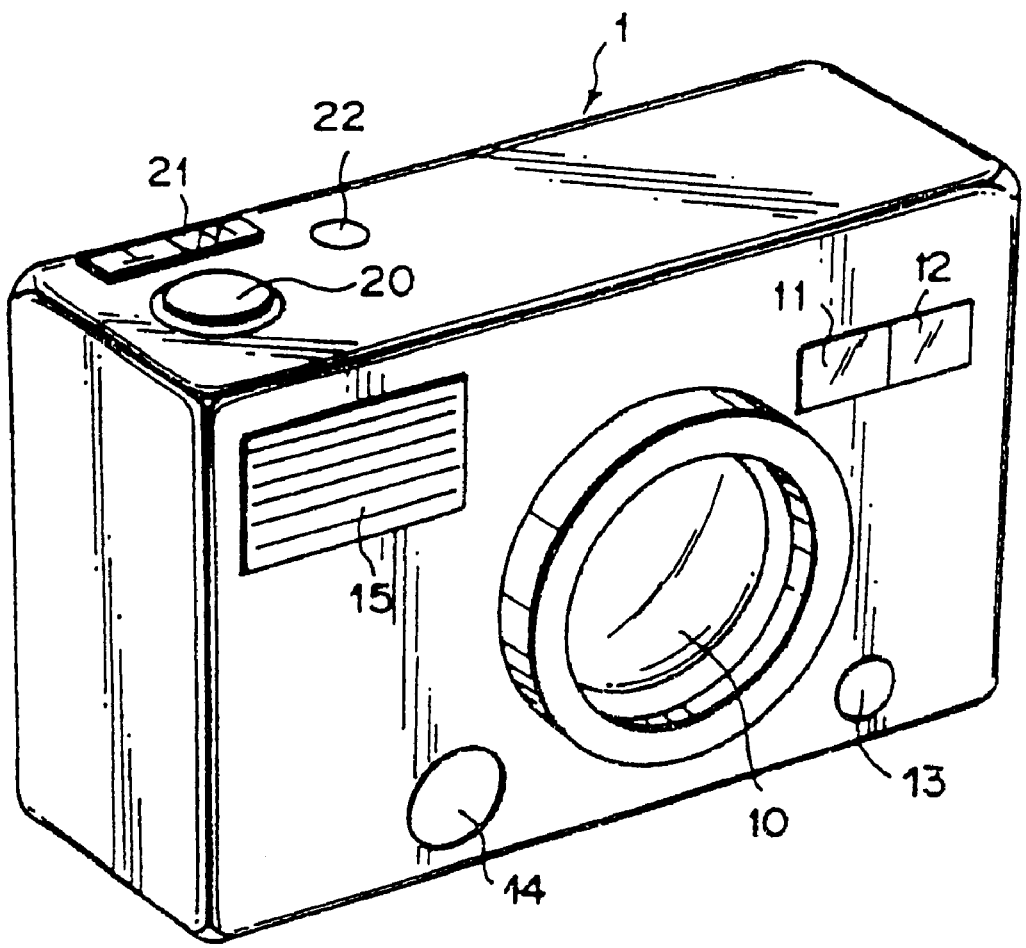
FIG. 2 is a perspective view showing the first embodiment of the pseudo zoom camera in accordance with the present invention.

FIG. 1 is a side view showing a finder optical system in a first embodiment of the pseudo zoom camera in accordance with the present invention. FIG. 2 is a perspective view showing the first embodiment of the pseudo zoom camera in accordance with the present invention.

As illustrated in FIG. 2, the pseudo zoom camera is provided with a taking lens 10 constituted of a zoom lens, a finder window 11, an AE (automatic exposure) light receiving window 12, an AF (automatic focusing) light projecting window 13, a strobe flashing section 15, and the like, which are located at the front surface of a body 1. Also, a shutter push button 20, a zoom lever 21, a pseudo zoom mode push button 22, and the like, are located at the top surface of the body 1.

As illustrated in FIG. 1, a finder optical system 30 comprises a fundamental optical system 31 and a conversion lens block 32.

The fundamental optical system 31 is an ordinary relay type of real image finder optical system, in which the height of the optical path is changed at an intermediate position by mirrors 33 and 34. The fundamental optical system 31 comprises an objective lens 35, zoom lenses 36 and 37, a relay lens 38, a focal plate 39 on which a finder image is formed, a visual field plate 40 which indicates the range of an image recorded, an eyepiece 41, and the like.

A wide-conversion lens 42 and a tele-conversion lens 43 are secured to the conversion lens block 32. By way of example, the wide-conversion lens 42 reduces the finder image, which is formed by the fundamental optical system 31, to a size 0.7 times as large as the original size. The tele-conversion lens 43 enlarges the finder image to a size 1.4 times as large as the original size.

Figure 3:
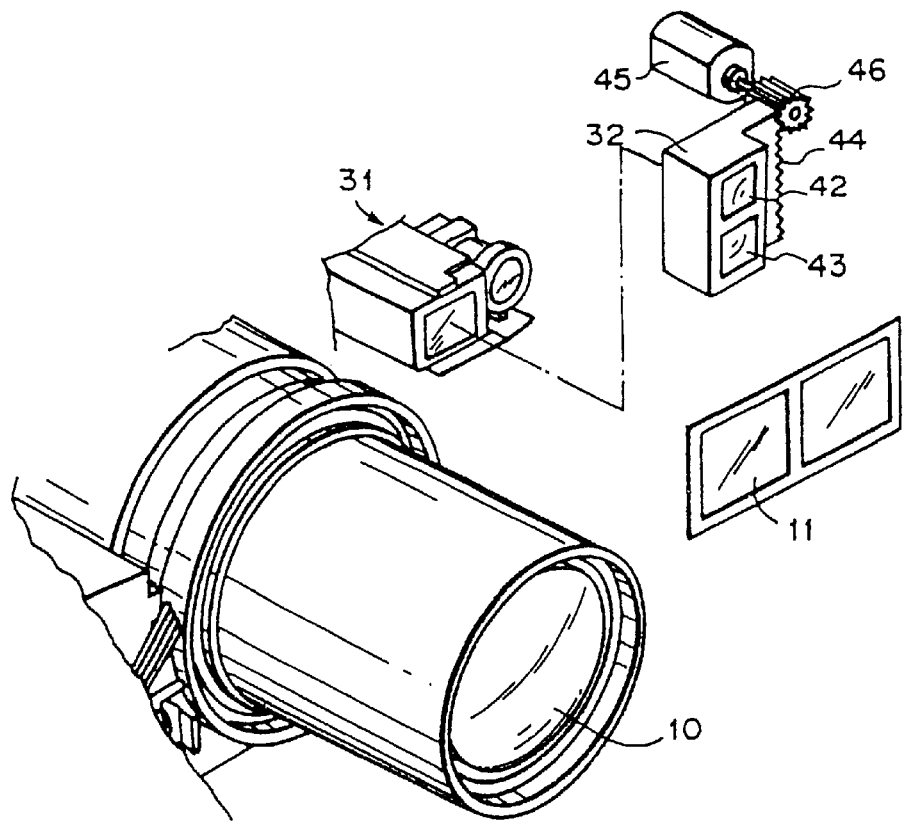
FIG. 3 is an exploded perspective view showing the major part of the pseudo zoom camera shown in FIG. 2.

FIG. 3 is an exploded perspective view showing the major part of the pseudo zoom camera shown in FIG. 2. As illustrated in FIG. 3, the conversion lens block 32 is provided with a rack 44, which extends vertically. A pinion gear 46, which is rotated by a lens change-over actuator 45, is engaged with the rack 44.

Figure 4:
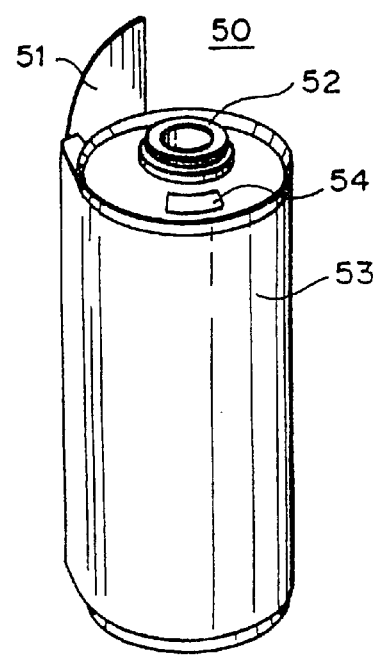
FIG. 4 is a perspective view showing a photographic film cartridge, which is utilized in the pseudo zoom camera shown in FIG. 2.

FIG. 4 is a perspective view showing a film cartridge 50, which is utilized in the pseudo zoom camera shown in FIG. 2. The film cartridge 50 comprises a negative type of photographic film 51 having a comparatively broad width, such as Brownie film, a spool 52, and a cartridge 53. The photographic film 51 is wound around the spool 52 and is thereby accommodated in the cartridge 53. A storage device 54, which is constituted of an IC memory chip, is secured to a portion of the outer surface of the cartridge 53.

Figure 5:
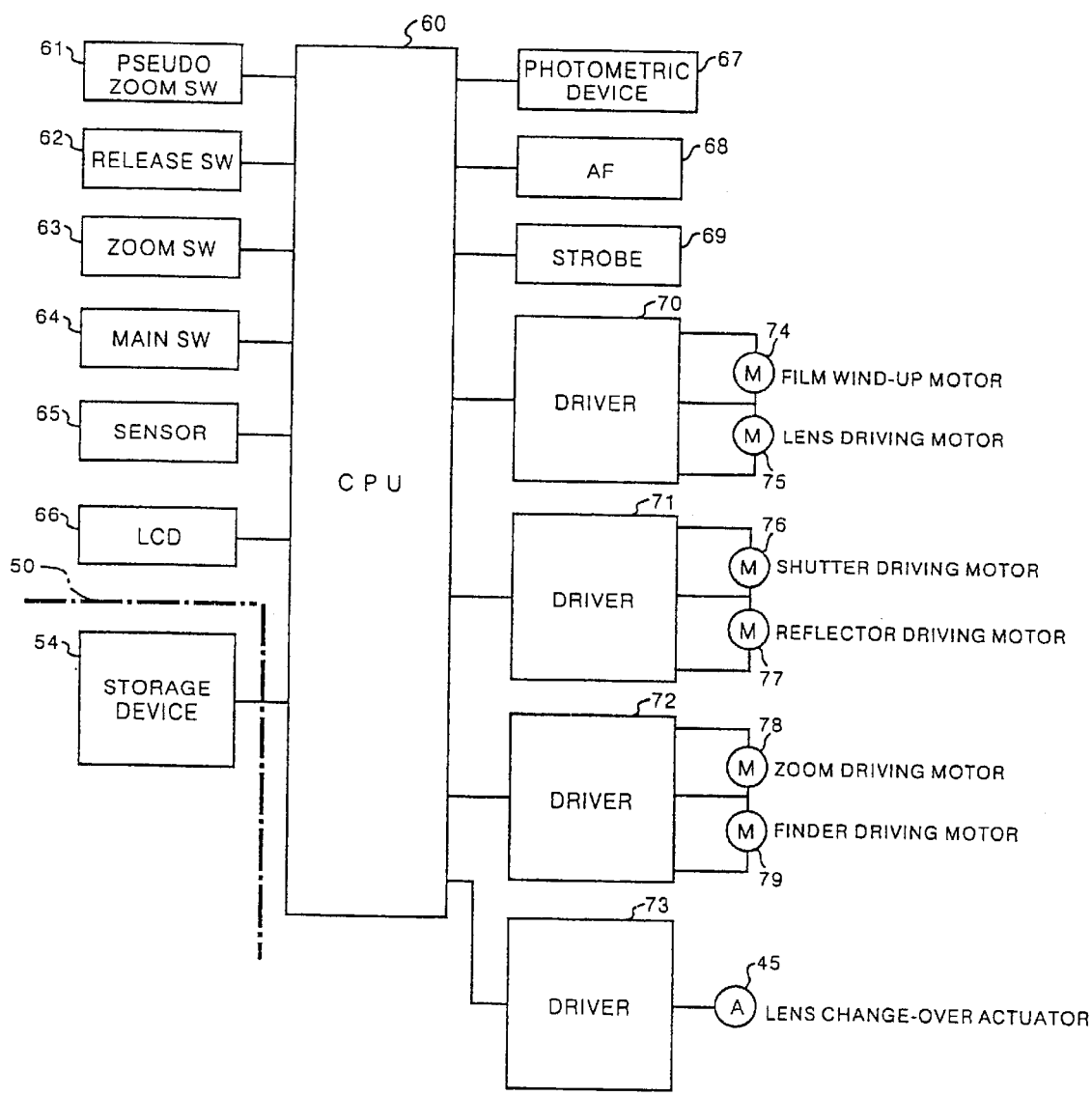
FIG. 5 is a block diagram showing an electric control constitution in the first embodiment of the pseudo zoom camera.

FIG. 5 is a block diagram showing an electric control constitution in the first embodiment of the pseudo zoom camera. As illustrated in FIG. 5, the electric circuitry of the pseudo zoom camera is provided with a central processing unit (CPU) 60, which controls fundamental operations of the pseudo zoom camera. The CPU 60 receives signals from a pseudo. zoom switch 61 which is operated by the pseudo zoom mode push button 22 described above, a release switch 62, a zoom switch 63, a main switch 64, and a sensor 65. (The sensor 65 represents a group of various kinds of sensors.)

Also, the CPU 60 is connected to a liquid crystal display device (LCD) 66 which displays various kinds of information in, for example, the finder, a photometric device 67 for determining a correct exposure, an AF circuit 68, a strobe 69, and drivers 70, 71, 72, and 73. Each of these devices is controlled by the CPU 60.

The driver 70 drives a film wind-up motor 74 and a lens driving motor 75. The driver 71 drives a shutter driving motor 76 and a reflector driving motor 77, which operates a reflector (i.e., a reflecting plate) for changing light distribution characteristics of the strobe 69. The driver 72 drives a zoom driving motor 78 and a finder driving motor 79. The driver 73 drives the lens change-over actuator 45 described above (shown in FIG. 3).

How the first embodiment of the pseudo zoom camera operates will be described hereinbelow. By way of example, the taking lens 10 has a zoom ratio of 3, and the fundamental optical system 31 of the finder optical system 30 has a zoom ratio of 3. In the range of the zoom ratio of 3, alteration of the photographing field angle is carried out in the same manner as that in an ordinary 35 mm lens shutter camera provided with a zoom lens, or the like.

Specifically, when the zoom lever 21 is operated to a tele-side or a wide-side (i.e., a wide-angle side), a tele-operation signal or a wide-operation signal is fed from the zoom switch 63 shown in FIG. 5 into the CPU 60. The feeding-of the tele-operation signal or the wide-operation signal into the CPU 60 is continued until the operation of the zoom lever 21 is stopped.

When the CPU 60 receives the tele-operation signal, it feeds a control signal, which instructs tele-side driving, to the driver 72. Also, the zoom driving motor 78 and the finder driving motor 79 receive driving current from the driver 72 and rotate in directions that set the focal lengths of the taking lens 10 and the fundamental optical system 31, respectively, at large values.

When the CPU 60 receives the wide-operation signal, it feeds a control signal, which instructs wide-side driving, to the driver 72. Also, the zoom driving motor 78 and the finder driving motor 79 receive driving current from the driver 72 and rotate in directions that set the focal lengths of the taking lens 10 and the fundamental optical system 31, respectively, at small values.

In each of the taking lens 10 and the fundamental optical system 31, a predetermined number of lenses a removed along the optical axis direction by a known cam mechanism, which receives the rotation force of the corresponding zoom driving motor 78 or the corresponding finder driving motor 79, and the focal length is thereby changed. In this manner, the field angle of the object image, which is formed by the taking lens 10, and the field angle of the finder image, which is displayed by the finder optical system 30, are changed such that the field angles of the object image and the finder image may be kept identical with each other.

When the operation of the zoom lever 21 is stopped, the feeding of the tele-operation signal or the wide-operation signal into the CPU 60 is ceased, and the zoom driving motor 78 and the finder driving motor 79 are stopped. At this time, the taking lens 10 is set in the state, in which an image of a field angle identical with the field angle of the finder image displayed in a visual field frame of the visual field plate 40 is formed on the photographic film 51. Therefore, when the shutter push button 20 is pushed in this state, predetermined automatic focusing processing and automatic exposure processing are carried out, and a photographic latent image of the aforesaid field angle is recorded on the photographic film 51.

In FIG. 1, wide-end positions of the zoom lenses 36 and 37 are indicated by the solid lines, and tele-end positions of them are indicated by the broken lines. By way of example, the wide-end positions are such that the magnification ratio of the fundamental optical system 31 may become equal to 0.4, and the tele-end positions are such that the magnification ratio of the fundamental optical system 31 may become equal to 1.2. When the zoom lenses 36 and 37 take the tele-end positions, the taking lens 10 is also set in the corresponding state, in which the focal length is longest. Also, when the zoom lenses 36 and 37 take the wide-end positions, the taking lens.10 is also set in the corresponding state, in which the focal length is shortest.

As described above, the finder optical system 30 is constituted of the fundamental optical system 31 and the conversion lens block 32. Either one of the wide-conversion lens 42 and the tele-conversion lens 43 is selectively combined with the fundamental optical system 31. The selection of the wide-conversion lens 42 or the tele-conversion lens 43 is carried out by the lens change-over actuator 45, which is operated in accordance with the state of signal input from a sensor, which detects the zooming positions of the zoom lenses 36 and 37, and the zoom switch 63 into the CPU 60. How such an operation is carried out will hereinbelow be described in detail with reference to FIG. 6.

In cases where the aforesaid sensor detects that the zooming positions of the zoom lenses 36 and 37 have not reached the tele-end positions, the CPU 60 controls the lens change-over actuator 45 via the driver 73, such that the wide-conversion lens 42 having a magnification ratio of 0.7 may be combined with the fundamental optical system 31.

In this state, the zoom lever 21 may be operated, and the finder driving motor 79 may be actuated during the operation of the zoom lever 21. In such cases, the magnification ratio of the fundamental optical system 31 takes a value falling within the range, which is indicated by a line segment "a" in FIG. 6, i.e. a value falling within the range of 0.4 to 1.2. Therefore, the finder magnification ratio takes a value falling within the range of 0.28 to 0.84, the values being the products of the magnification ratios of the fundamental optical system 31 and 0.7. (The term "finder magnification ratio" as used herein means the magnification ratio of the combination of the fundamental optical system 31 and the wide-conversion lens 42 or the tele-conversion lens 43 with each other.) As described above, the zooming operation of the taking lens 10 is interlocked with the zooming operation of the fundamental optical system 31, and the photographing field angle with the taking lens 10 becomes identical with the field angle of the finder image, which is formed in a finder magnification ratio falling within the range of 0.28 to 0.84.

In cases where the aforesaid sensor detects that the zooming positions of the zoom lenses 36 and 37 (and the zooming position of the taking lens 10) have reached the tele-end positions, the CPU 60 operates the lens change-over actuator 45 via the driver 73, such that the conversion lens block 32 may be set in the state, in which the tele-conversion lens 43 having a magnification ratio of 1.4 is combined with the fundamental optical system 31. Also, the CPU 60 operates the finder driving motor 79 via the driver 72, such that the magnification ratio of the fundamental optical system 31 may decrease to 0.6 as indicated by a line segment "b" in FIG. 6.

In this state, the finder magnification ratio is 0.6×1.4= 0.84, and is the same as the finder magnification ratio before the conversion lens block 32 is moved for the change-over. However, in the intermediate stage of the change-over and the zooming operation of the fundamental optical system 31, the finder magnification ratio will sharply become high and will thereafter become low little by little. The unnatural finder image, which changes in such a manner, will often confuse the photographer. Therefore, the pseudo zoom camera should preferably be provided with an appropriate blackout means for preventing the finder image from being seen during the period in which a change in magnification ratio occurs.

In cases where the zoom lever 21 is operated to the tele-side even further after the zooming positions of the zoom lenses 36 and 37 have reached the tele-end positions and the tele-operation signal is fed from the zoom switch 63 into the CPU 60, the CPU 60 operates the finder driving motor 79 such that the magnification ratio of the fundamental optical system 31 may become high (i.e., such that the focal length of the fundamental optical system 31 may become long).

Figure 6:
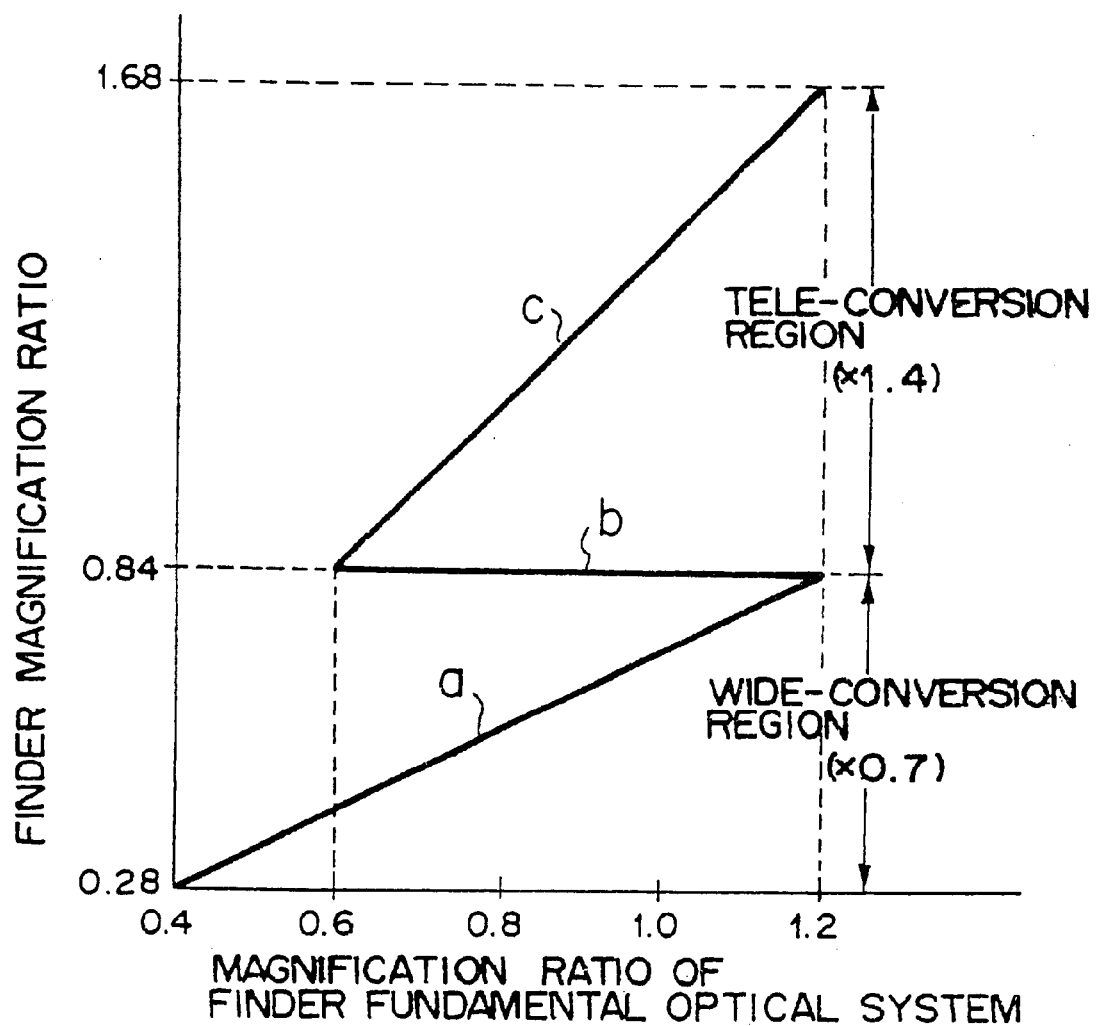
FIG. 6 is a graph showing an example of change characteristics of a magnification ratio of a finder optical system in the first embodiment of the pseudo zoom camera.

Therefore, in this case, as indicated by a line segment "c" in FIG. 6, the magnification ratio of the fundamental optical system 31 takes a value falling within the range of 0.6 to 1.2. Also, the finder magnification ratio takes a value falling within the range of 0.84 to 1.68, the values being the products of the magnification ratios of the fundamental optical system 31 and 1.4. Even if the finder magnification ratio changes in this manner, since the taking lens 10 is kept at the tele-end position, the field angle of the image photographed at this time is kept the same as the field angle of the finder image, which is displayed in a finder magnification ratio of 0.84.

Each time the shutter push button 20 is pushed and an object image, which is formed by the taking lens 10, is recorded on the photographic film 51, in the region indicated by the line segment "c," the CPU 60 writes information, which represents the image range ratio of the image displayed in the finder to the object image, and information, which represents the frame number of the frame that records the object image, on the storage device 54 of the cartridge 53. The writing of the information may be carried out with a contact technique via a contact point or with a non-contact technique.

In this embodiment, the finder magnification ratio in this region is equal to (0.84/0.6)A, wherein A represents the magnification ratio of the fundamental optical system 31. Also, the field angle of the object image is equal to the field angle of the image displayed in the finder. Therefore, the field angle ratio is equal to A/0.6.

The magnification ratio A of the fundamental optical system 31 can be calculated by utilizing the driving control signal for the finder driving motor 79, a rotation angle detection signal, which is fed out by an encoder coupled with a rotation shaft of the finder driving motor 79, output signals, which are obtained from sensors for detecting the positions of the zoom lenses 36 and 37 of the fundamental optical system 31, or the like.

Thereafter, in accordance with the output signals obtained from the sensors for detecting the positions of the zoom lenses 36 and 37, or the like, the CPU 60 may detects that the fundamental optical system 31 has been operated toward the wide-side until the magnification ratio A becomes equal to 0.6. In such cases, the CPU 60 operates the lens change-over actuator 45 via the driver 73 and sets the conversion lens block 32 such that the wide-conversion lens 42 having a magnification ratio of 0.7 may be combined with the fundamental optical system 31.

Also, the CPU 60 operates the finder driving motor 79 via the driver 72 and sets the magnification ratio of the fundamental optical system 31 at the highest value of 1.2 so as to follow the line segment "b" shown in FIG. 6 reversely to the direction in the aforesaid cases. In this state, the finder magnification ratio is equal to 1.2×0.7=0.84 and is thus identical with the value before the conversion lens block 32 is moved for the change-over.

In cases where the zoom lever 21 is operated to the wide-side even further and the wide-operation signal is fed from the zoom switch 63 into the CPU 60, the CPU 60 operates the finder driving motor 79 such that the magnification ratio of the fundamental optical system 31 may become low (i.e., such that the focal length of the fundamental optical system 31 may become short). Also, after the wide-conversion lens 42 has been combined with the fundamental optical system 31 in the manner described above, the CPU 60 operates the zoom driving motor 78 in the manner interlocked with the finder driving motor 79, such that an object image may be recorded in the manner described above in the region indicated by the line segment "a" in FIG. 6. Specifically, in this region, the taking lens 10 is also subjected to the zooming operation, and the object image of the same field angle as the field angle of the image displayed in the finder is recorded on the photographic film 51.

In the region indicated by the line segment "a" in FIG. 6, the image range ratio of the image displayed in the finder to the object image is automatically taken as "1" and is written no the storage device 54.

After object images have been recorded in the frames of the photographic film 51 accommodated in the film cartridge 50, the film cartridge 50 is taken out of the camera body 1 and subjected to the development processing in a processing laboratory, or the like. In this manner, the photographic latent images having been recorded on the photographic film 51 are developed. From the thus formed negative film, photoprints are formed on predetermined recording paper. At this time, pseudo zoom processing is carried out in accordance with the information, which has been stored in the storage device 54. How the pseudo zoom processing is carried out will hereinbelow be described in detail.

Figure 7:
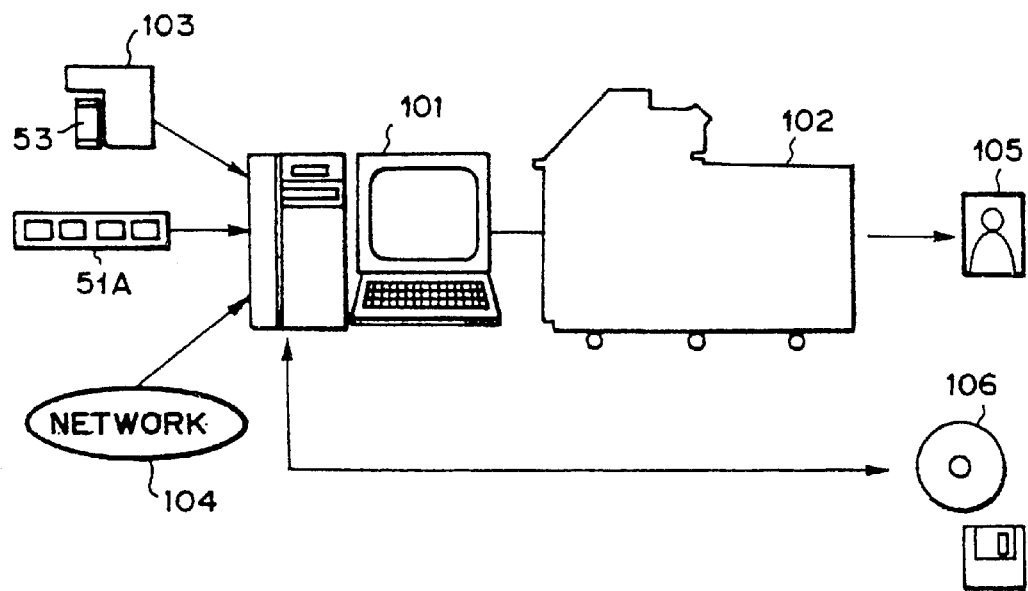
FIG. 7 is a schematic view showing an embodiment of the photo printing system in accordance with the present invention.

FIG. 7 is a schematic view showing an embodiment of the photo printing system in accordance with the present invention. As illustrated in FIG. 7, the photo printing system comprises an image processing apparatus 101 and a photo printer 102, which is connected to the image processing apparatus 101.

In this embodiment of the photo printing system, the image processing apparatus 101 is constituted of a general-purpose personal computer, in which special-purpose programs have been incorporated. Also, the image processing apparatus 101 is provided with peripheral equipments, such as a film scanner, which reads out the images from photographic film 51A having been subjected to the development processing, and a reading means 103, which reads the information having been stored in the storage device 54 of the cartridge 53 (shown in FIG. 4) that has accommodated the photographic film 51A. The image processing apparatus 101 is further provided with a media drive unit, such as CD-R or Zip, as an internal or external unit. The image processing apparatus 101 is still further provided with communication equipments (not shown) for transfer of image signals with other computers via a network 104.

The photo printer 102 may be constituted of a known digital photo printer. The photo printer 102 receives an image signal and output instruction information (representing the number of prints to be formed, the print size, and the like) from the image processing apparatus 101 and carries out a printing operation in accordance with the received image signal and received output instruction information.

In the photo printing system described above, the image processing apparatus 101 carries out predetermined image processing on the image signal, which has been detected from the developed photographic film 51A, and transfers the processed image signal to the photo printer 102. Also, the image processing apparatus 101 records the processed image signal on media 106, such as CD-R. Further, the image processing apparatus 101 receives storage information H, which has been stored in the storage device 54 and has been read by the reading means 103, from the reading means 103.

The system constitution of the photo printing system will hereinbelow be described in detail with reference to FIG. 8. In the constitution shown in FIG. 8, functions concerning the image processing may be provided as the functions of the image processing apparatus 101, or may be incorporated as the functions of the photo printer 102 or the film scanner. Therefore, the constitution shown in FIG. 8 will be described hereinbelow without the correspondence with FIG. 7 being manifested.

Figure 8:
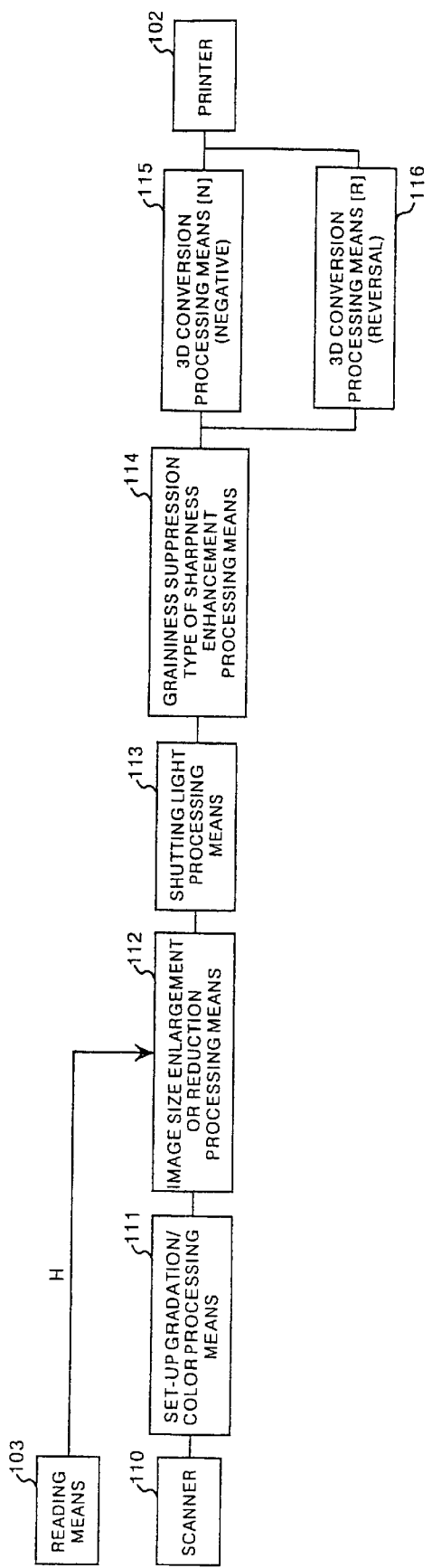
FIG. 8 is a block diagram showing the major part of the photo printing system shown in FIG. 7, FIGS. 9A, 9B, and 9C are explanatory views showing how pseudo zoom processing is carried out by the photo printing system shown in FIG. 7.

As illustrated in FIG. 8, a scanner 110 detects an image signal from the photographic image. The image signal is processed by various image processing means 111 through 116 and is then used in the photo printer 102 for reproducing a photoprint.

A set-up gradation/color processing means 111 automatically makes a judgment as to under-exposure or over-exposure and makes a correction to an appropriate value. An image size enlargement or reduction processing means 112 converts pixel density for matching the size of the printed image to the width of a recording material (e.g., a roll of printing paper) or for carrying out the pseudo zoom processing. A shutting light processing means 113 carries out processing with a shutting light technique described in, for example, Japanese Unexamined Patent Publication No. 9(1997)-18704. A graininess suppression type of sharpness enhancement processing means 114 carries out a graininess suppression type of sharpness enhancement processing described in, for example, Japanese Unexamined Patent Publication No. 9(1997)-22460.

Further, besides a series of image processing described above, color conversion in accordance with characteristics of the printer is carried out on the image signal for print reproduction by a 3D conversion processing means 115 or 116. The 3D conversion processing varies in accordance with whether the film from which the image signal was obtained is negative film or reversal film.

How the pixel density conversion for the pseudo zoom processing is carried out by the image size enlargement or reduction processing means 112 will be described hereinbelow. The image size enlargement or reduction processing means 112 receives the storage information H of each of frames of the photographic film 51A from the reading means 103. As described above, the storage information H represents an image range ratio R of the image displayed in the finder to the object image.

Figure 9B:
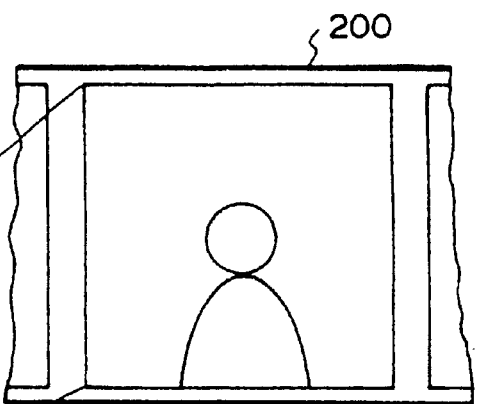

In the region indicated by the line segment "a" in FIG. 6, the image range ratio R is "1" at all times. With respect to the frame associated with the image range ratio of "1," the image size enlargement or reduction processing means 112 does not carry out the pixel density conversion processing for the image size enlargement or reduction. Specifically, in such cases, printing processing is carried out such that an image shown in FIG. 9A, which has been recorded in a certain frame F on the developed photographic film 51A, may be reproduced on a recording material 200 having a predetermined size as shown in FIG. 9B, such that the image size may not be enlarged or reduced. In this manner, in such cases, a print, on which an image of the same field angle as the field angle of the image displayed in the finder has been recorded, is obtained.

In the region indicated by the line segment "c" in FIG. 6, the image range ratio R, which is represented by the storage information H, takes a value falling within the range of 1 to 2. With respect to the frame associated with the image range ratio taking such a value, the image size enlargement or reduction processing means 112 carries out the image size enlargement processing on the image signal, which has been detected by the scanner 110, such that, for example, the center point of the photographic image may not be shifted, and such that only a range of 1/R in horizontal and vertical directions may be reproduced on the recording material 200 having a predetermined size. Specifically, in such cases, printing processing is carried out such that, of an image shown in FIG. 9A, which has been recorded in a certain frame F on the developed photographic film 51A, only the region surrounded by the double-dot chained lines shown in FIG. 9A may be reproduced on the recording material 200 as shown in FIG. 9C.

As described above, in the region indicated by the line segment "c" in FIG. 6, the finder magnification ratio takes a value falling within the range of 0.84 to 1.68. In such cases, the field angle of the object image is kept the same as the field angle of the finder image, which is displayed in a finder magnification ratio of 0.84. However, in such cases, since the image size enlargement processing is carried out in the manner described above, a print, on which an image of the same field angle as the field angle of the image displayed in the finder has been recorded, is obtained.

As described above, with the first embodiment of the pseudo zoom camera and this embodiment of the photo printing system in accordance with the present invention, even if the taking lens 10 having a zoom ratio of 3 is employed, a photoprint can be obtained as if it were photographed with a taking lens having a zoom ratio of 6.

In the first embodiment of the pseudo zoom camera in accordance with the present invention, in cases where a zoom lens is employed as the taking lens, the zoom ratio of the zoom lens is not limited to 3. Also, the taking lens is not limited to the zoom lens, and a lens having a fixed focal length may be utilized as the taking lens.

In cases where the conversion lens is utilized, its magnification ratio is not limited to 0.7 or 1.4 as in the embodiment described above. Also, the number of the conversion lenses is not limited to two. Further, in cases where the conversion lens is utilized, a mode, in which the object image is recorded without a conversion lens being combined with the fundamental optical system 31 of the finder optical system 30, may also be set.

Also, the way, in which the wide-conversion lens 42 or the tele-conversion lens 43 is selected, is not limited to that shown in FIG. 6. For example, each time the pseudo zoom mode push button 22 shown in FIG. 2 is pushed, an on signal and an off signal may be alternately fed from the pseudo zoom switch 61 shown in FIG. 5 into the CPU 60. In cases where the off signal is fed into the CPU 60, the CPU 60 may control such that the wide-conversion lens 42 may be combined with the fundamental optical system 31. Also, in cases where the on signal is fed into the CPU 60, the CPU 60 may control such that the tele-conversion lens 43 may be combined with the fundamental optical system 31.

Figure 10:
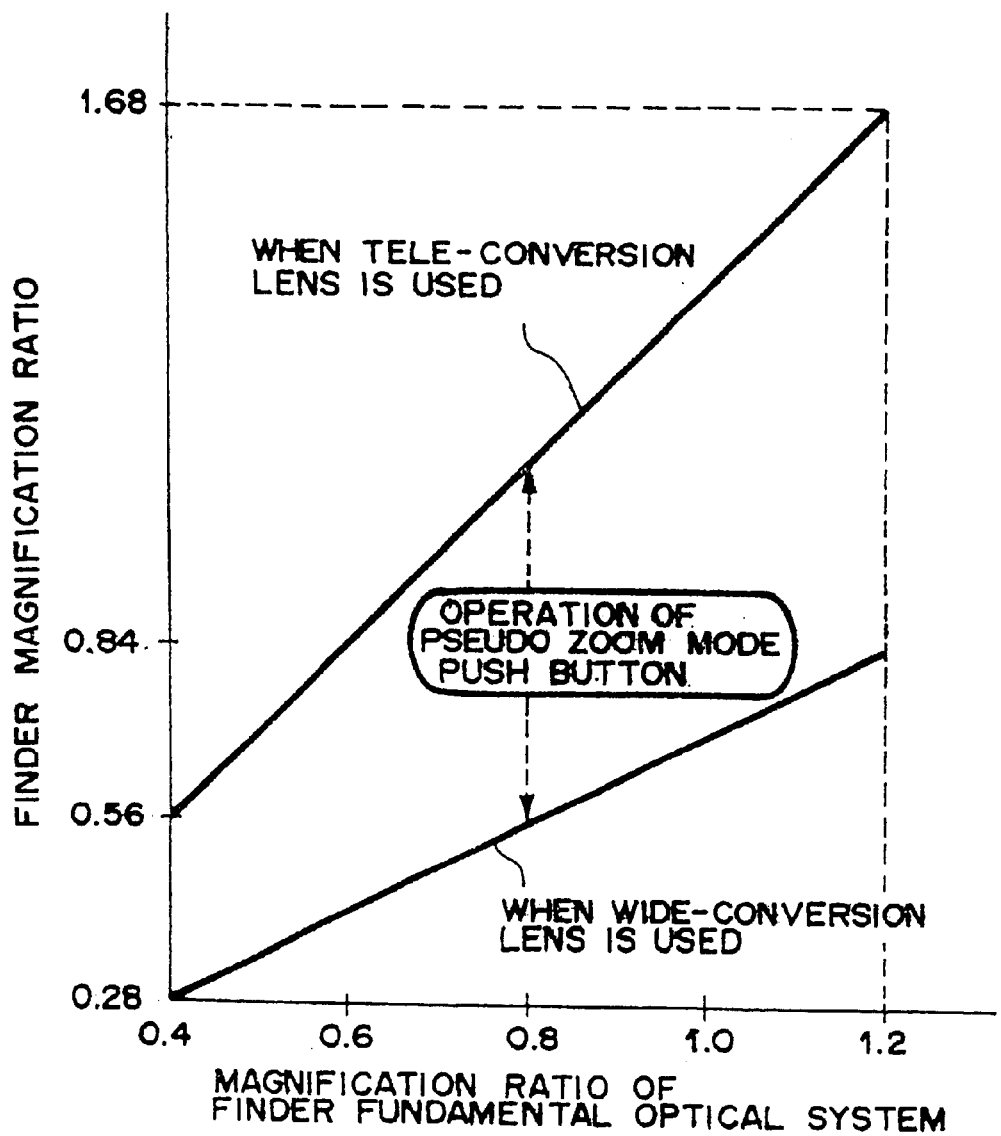
FIG. 10 is a graph showing a different example of change characteristics of a magnification ratio of a finder optical system in the first embodiment of the pseudo zoom camera.

In such cases, the relationship between the magnification ratio of the fundamental optical system 31 and the finder magnification ratio, which is shown in FIG. 10, is obtained.

In such cases, the field angle of the image displayed in the finder will change sharply before the pseudo zoom mode push button 22 is operated and after the pseudo zoom mode push button 22 is operated. However, in such cases, since the photographer operates the pseudo zoom mode push button 22 with the intention of changing the photographing field angle to the tele-side or the wide-angle side, he can feel the sharp change in field angle as being natural.

Figure 11:
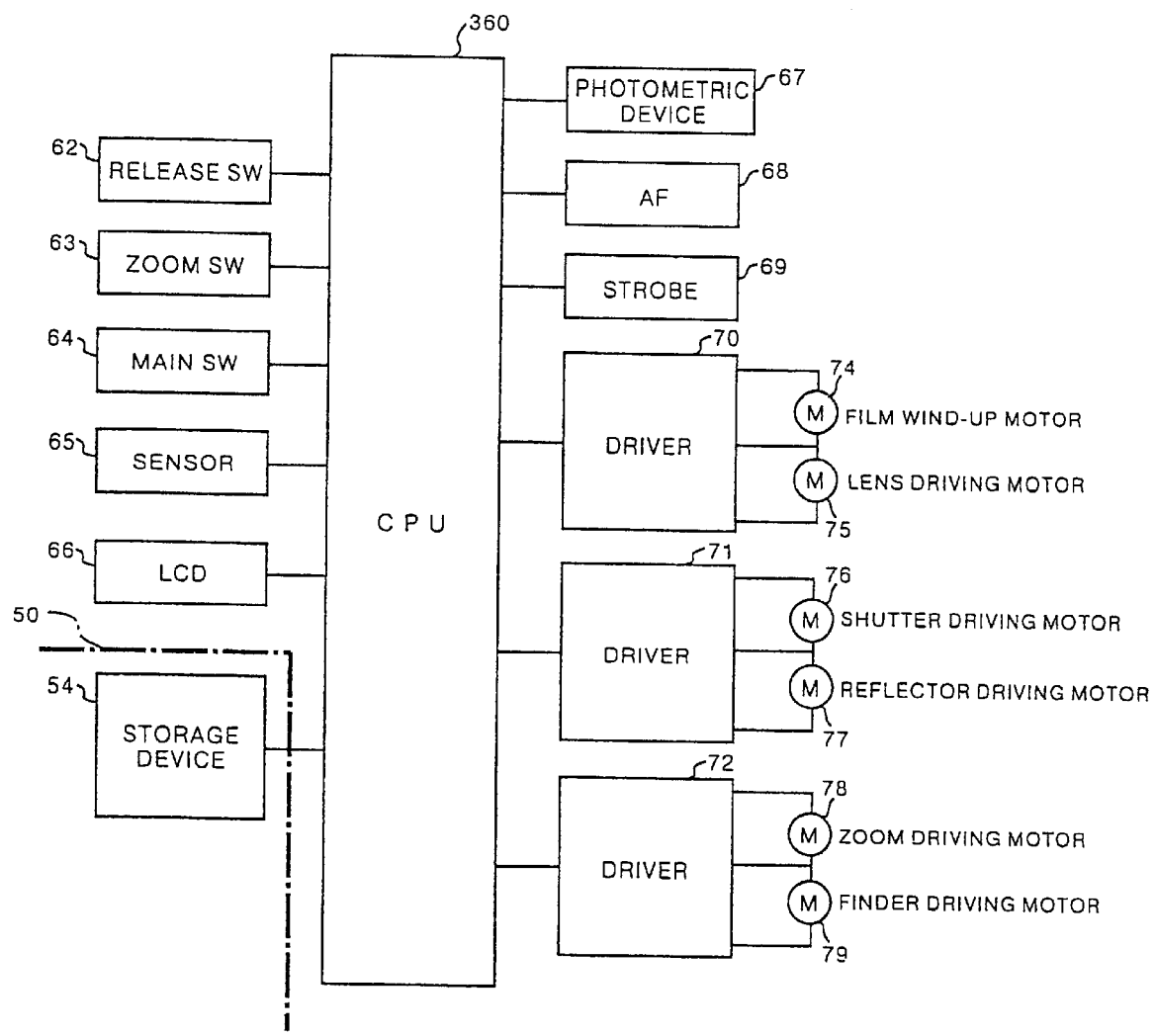
FIG. 11 is a block diagram showing an electric control constitution in a second embodiment of the pseudo zoom camera in accordance with the present invention.

A second embodiment of the pseudo zoom camera in accordance with the present invention will be described hereinbelow with reference to FIGS. 11, 12, 13, and 14. In FIG. 11, similar elements are numbered with the same reference numerals with respect to FIG. 5.

Basically, the second embodiment of the pseudo zoom camera has the same mechanical constitution as that in the first embodiment of the pseudo zoom camera shown in FIG. 1, except that the conversion lens block 32 provided with the wide-conversion lens 42 and the tele-conversion lens 43 is omitted and a zoom optical system having a zoom ratio of 6 is employed as the fundamental optical system 31. Specifically, in the second embodiment, a zoom lens having a zoom ratio of 3 is employed as the taking lens 10, and the fundamental optical system 31, which does not take part in the image quality of the object image, has a zoom ratio higher than the zoom ratio of the taking lens 10.

In the region in which the zoom ratio of the taking lens 10 takes a value falling within the range of 1 to 3, as in an ordinary camera, in accordance with the zooming operation, the field angle of the image displayed in the finder and the photographing field angle are changed in an interlocked manner. When the zooming operation is carried out to the tele-side beyond this range, only the field angle of the image displayed by the fundamental optical system 31 can be changed, while the photographing field angle is being kept unchanged. How such a control operation is achieved will be described hereinbelow.

FIG. 11 is a block diagram showing an electric control constitution in the second embodiment of the pseudo zoom camera in accordance with the present invention. The constitution shown in FIG. 11 is basically identical with the constitution shown in FIG. 5, except that the pseudo zoom switch 61, the driver 73, and the lens change-over actuator 45 are omitted. How a CPU 360 carries out control processing will be described hereinbelow with reference to FIGS. 12, 13, and 14.

Figure 12:
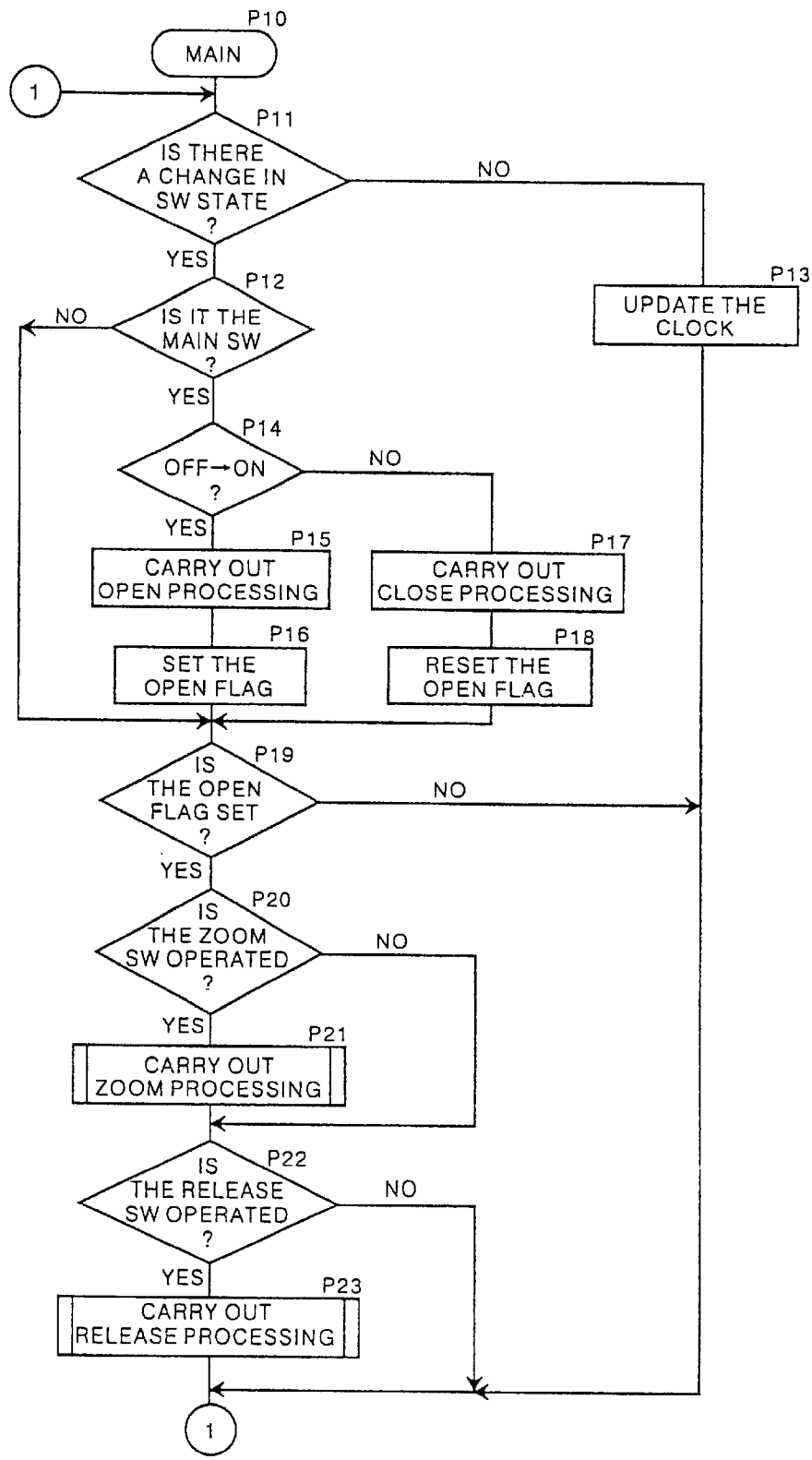
FIG. 12 is a flow chart showing how control processing is carried out in the electric control constitution shown in FIG. 11.

FIG. 12 shows a flow of general control processing carried out by the CPU 360. As illustrated in FIG. 12, in a step P10, the general control processing starts. In a step P11, a judgment is made as to whether there is or is not a change in the state of various switches of the camera. In cases where it has been judged that there is no change in the switch state, in a step P13, the incorporated clock is updated, and the processing returns to the step P11.

In cases where it has been judged in the step P11 that there is a change in the switch state, in a step P12, a judgment is made as to whether the switch whose state has been changed is or is not the main switch 64 shown in FIG. 11. In cases where it has been judged that the switch whose state has been changed is the main switch 64, in a step P14, a judgment is made as to whether the change in the state of the main switch 64 is or is not an off-to-on change.

In cases where it has been judged that the change in the state of the main switch 64 is the off-to-on change, in a step P15, open processing for setting the zoom type of taking lens 10 in a waiting state is carried out. Thereafter, in a step P16, processing for setting an open flag is carried out. In cases where it has been judged in the step P14 that the change in the state of the main switch 64 is the on-to-off change, in a step P17, close processing for setting the zoom type of taking lens 10 in a retreating state is carried out. Thereafter, in a step P18, processing for resetting the open flag is carried out.

After the open flag has been set or reset, or in cases where it has been judged in the step P12 that the switch whose state has been changed is not the main switch 64, the processing proceeds to a step P19. In the step P19, a judgment is made as to whether the open flag is or is not set. In cases where it has been judged that the open flag is not set, the processing returns to the step P11. In cases where it has been judged that the open flag is set, in a step P20, a judgment is made as to whether the zoom switch 63 shown in FIG. 11 is or is not operated.

In cases where it has been judged that the zoom switch 63 is not operated, the processing proceeds to a step P22, which will be described later. In cases where it has been judged that the zoom switch 63 is operated, in a step P21, zoom processing is carried out. How the zoom processing is carried out will be described later.

Thereafter, in the step P22, a judgment is made as to whether the release switch 62 shown in FIG. 11 is or is not operated. In cases where it has been judged that the release switch 62 is not operated, the processing returns to the step P11. In cases where it has been judged that the release switch 62 is operated, in a step P23, release processing is carried out. Thereafter, the processing returns to the step P11.

Figure 13:
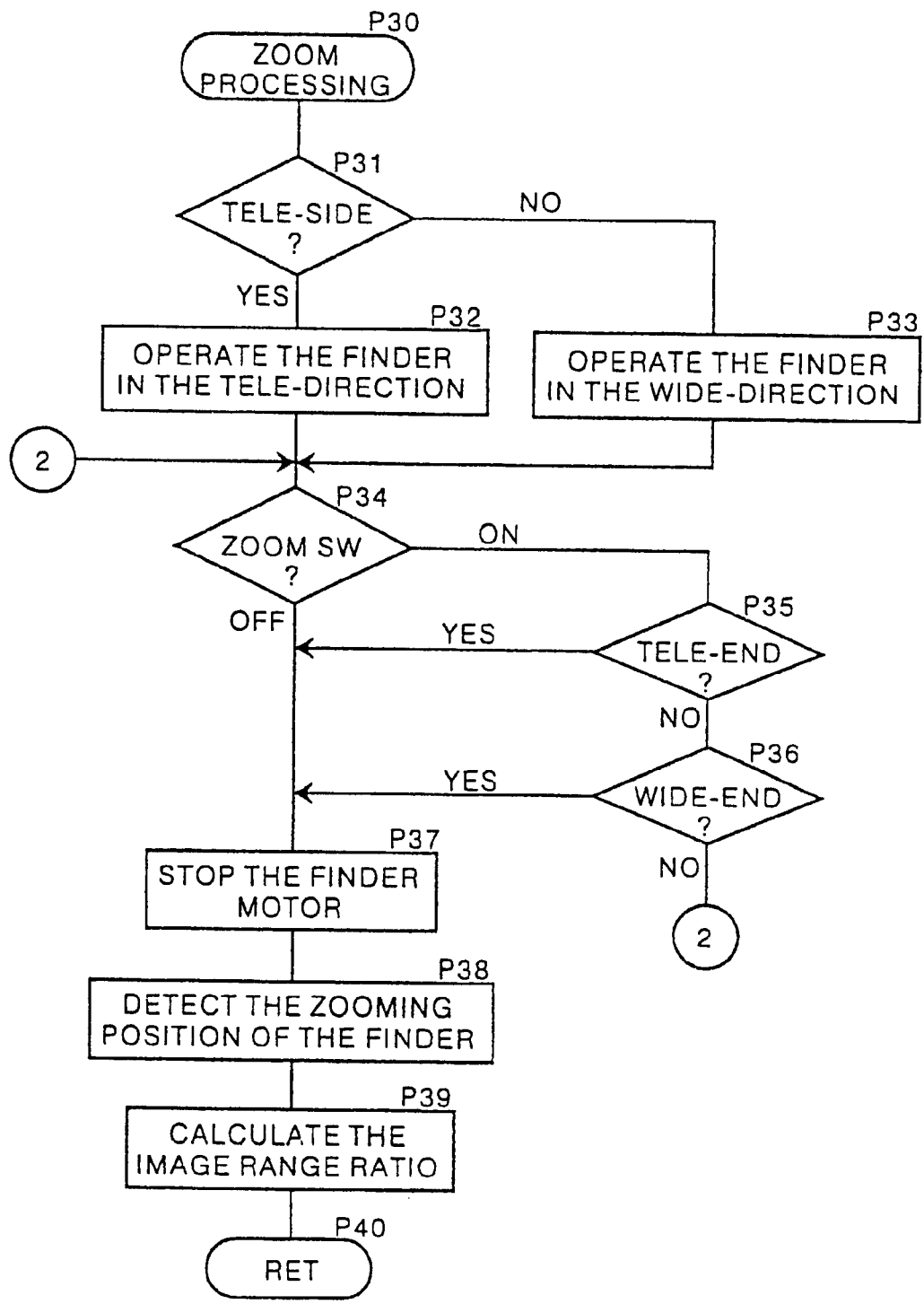
FIG. 13 is a flow chart showing a part of the flow of the control processing shown in FIG. 12.

How the zoom processing is carried out in the step P21 will be described hereinbelow with reference to FIG. 13. As illustrated in FIG. 13, in a step P30, the subroutine processing for the zooming starts. In a step P31, a judgment is made as to whether the operation of the zoom switch 63 is or is not the operation to the tele-side.

In cases where it has been judged that the operation of the zoom switch 63 is the operation to the tele-side, in a step P32, processing for zooming the fundamental optical system 31 by a predetermined distance to the tele-side is carried out. As in the aforesaid cases, the zooming is carried out by operating the finder driving motor 79 with the driver 72. In cases where it has been judged that the operation of the zoom switch 63 is not the operation to the tele-side, i.e. in cases where the zoom switch 63 is operated to the wide-side, in a step P33, processing for zooming the fundamental optical system 31 by a predetermined distance to the wide-side is carried out.

The zooming processing to the tele-side or the wide-side is carried out in the manner described above. Thereafter, in a step P34, a judgment is made as to whether the zoom switch 63 is or is not operated even further. In cases where it has been judged that the zoom switch 63 is operated even further, in a step P35, a judgment is made as to whether the fundamental optical system 31 has or has not reached the tele-end position. In cases where it has been judged that the fundamental optical system 31 has reached the tele-end position, in a step P37, the finder driving motor 79 is stopped.

In cases where it has been judged that the fundamental optical system 31 has not reached the tele-end position, in a step P36, a judgment is made as to whether the fundamental optical system 31 has or has not reached the wide-end position. In cases where it has been judged that the fundamental optical system 31 has reached the wide-end position, in the step P37, the finder driving motor 79 is stopped.

In cases where it has been judged that the fundamental optical system 31 has not reached the wide-end position, the processing returns to the step P34, and the same processing as the processing described above is repeated. In cases where it has been judged in the step P34 that the zoom switch 63 is not operated, in the step P37, the finder driving motor 79 is stopped.

When the finder driving motor 79 is thus stopped, in cases where the fundamental optical system 31 is in the state in which the zoom ratio falls within the range of 1 to 3, as described above, the zooming position of the taking lens 10 is such that the zoom ratio may fall within the range of 1 to 3, and the image of the same field angle as the field angle of the image displayed in the finder can be recorded In cases where the fundamental optical system 31 is in the state in which the zoom ratio falls within the range of 3 to 6, the zooming position of the taking lens 10 is set at the tele-end position at all times.

Thereafter, in a step P38, the zooming position of the fundamental optical system 31 is detected. The detection is carried out by utilizing, for example, an output of a linear encoder for detecting the positions of the zoom lenses 36 and 37.

Thereafter, in a step P39, in accordance with the zooming position of the fundamental optical system 31, the image range ratio of the image, which is displayed in the visual field frame of the finder, to the object image is calculated. Information, which represents the calculated image range ratio, and information, which represents the corresponding frame number, are temporarily stored in a predetermined memory (not shown). Thereafter, in a step P40, the subroutine for the zooming is finished. The processing then returns to the flow shown in FIG. 12.

Figure 14:
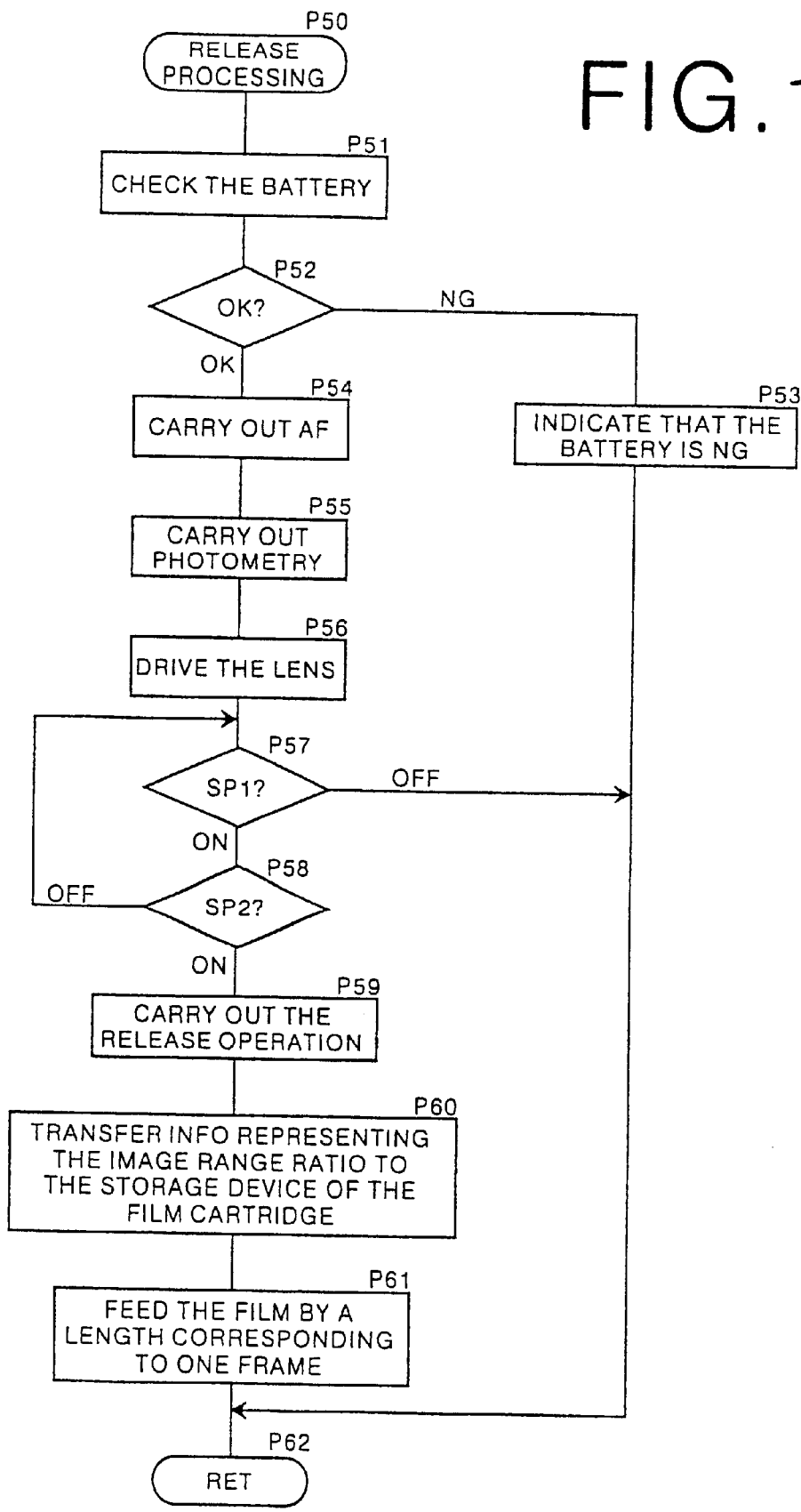
FIG. 14 is a flow chart showing a different part of the flow of the control processing shown in FIG. 12.

How the release processing in the step P23 shown in FIG. 12 is carried out will be described hereinbelow with reference to FIG. 14. As illustrated in FIG. 14, in a step P50, the subroutine processing for the release starts. Thereafter, in a step P51, a battery check is made. In a step P52, a judgment is made as to whether the results of the battery check are or are not good. In cases where it has been judged that the battery does not satisfy predetermined performance, in a step P53, the results of the battery check are indicated in the finder. Also, in a step P62, the subroutine processing is finished.

In cases where it has been judged that in the step P52 that the results of the battery check are good, in steps P54, P55, and P56, respectively, automatic focusing, photometry, and lens driving processing for the focusing are carried out.

Thereafter, in a step P57, a judgment is made as to whether the shutter push button 20 shown in FIG. 2 has or has not reached a predetermined push-down position P1. In cases where it has been judged that the shutter push button 20 has not reached the push-down position P1, in the step P62, the subroutine processing is finished. Also, the processing returns to the flow shown in FIG. 12.

In cases where it has been judged that the shutter push button 20 has reached the push-down position P1, in a step P58, a judgment is made as to whether the shutter push button 20 has or has not reached a predetermined push-down position P2, which is deeper than the push-down position P1. In cases where it has been judged that the shutter push button 20 has not reached the push-down position P2, the processing returns to the step P57. In cases where it has been judged that the shutter push button 20 has reached the push-down position P2, in a step P59, a release operation is carried out, and the photographing operation is completed.

Thereafter, in a step P60, the information, which represents the image range ratio having been calculated in the step P39 shown in FIG. 13 and which has been stored in the memory together with the information representing the corresponding frame number, is transferred to the storage device 54 of the cartridge 53 shown in FIG. 4 and written on it.

In a step P61, the photographic film 51 is fed by a length corresponding to one frame. Thereafter, in a step P62, the subroutine is finished. Also, the processing returns to the flow shown in FIG. 12.

After object images have been recorded in the frames of the photographic film 51 accommodated in the film cartridge 50, the film cartridge 50 is taken out of the camera body 1 and subjected to the development processing in a processing laboratory, or the like. In this manner, the photographic latent images having been recorded on the photographic film 51 are developed. Therefore, in the same manner as that in the embodiment described above, photoprints are formed by the utilization of the developed photographic film 51A in the photo printing system shown in FIGS. 7 and 8.

In such cases, the pseudo zoom processing is carried out in accordance with the information representing the image range ratio, which is stored together with the information representing the corresponding frame number on the storage device 54 of the cartridge 53.

At this time, as described above, as for the images having been recorded when the fundamental optical system 31 is set in the state in which the zoom ratio falls within the range of 1 to 3, the field angle is identical with the field angle of the image displayed in the finder. Therefore, as for such images, the relationship between the size of the image recorded on the film and the size of the printed image becomes identical with the relationship shown in FIGS. 9A and 9B. Specifically, as for such images, the pseudo zoom processing is not carried out consequently.

Figure 9A:
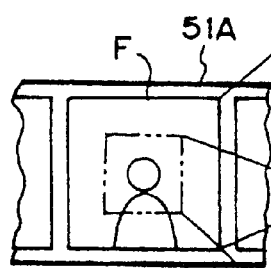
Figure 9C:
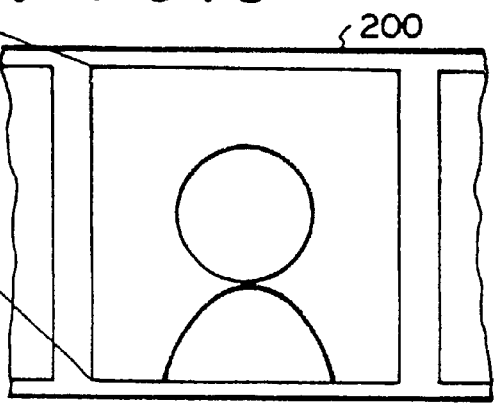

As for the images having been recorded when the fundamental optical system 31 is set in the state in which the zoom ratio falls within the range of 3 to 6, the relationship between the size of the image recorded on the film and the size of the printed image becomes identical with the relationship shown in FIGS. 9A and 9C. Specifically, as for such images, the pseudo zoom processing is carried out.

A third embodiment of the pseudo zoom camera in accordance with the present invention will be described hereinbelow with reference to FIGS. 15, 16, 17, 18, and 19. In the third embodiment, the blackout processing, i.e. the processing for preventing the finder image to be seen when the finder magnification ratio increases or decreases sharply, is carried out. Only the constitution concerning the blackout processing will be described hereinbelow. As for the other features, the foregoing may be referred to.

Figure 19:
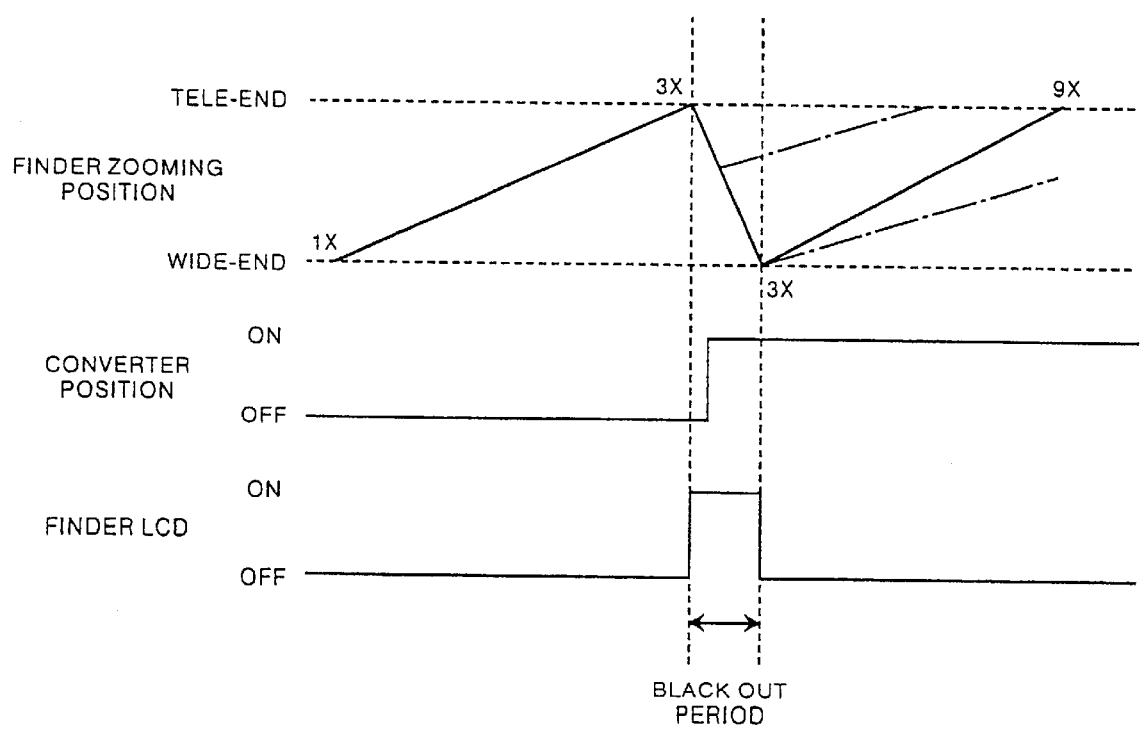
FIG. 19 is a time chart showing a change in magnification ratio of a finder optical system, and the like, in the processing shown in FIGS. 15, 16, 17, and 18.

As illustrated in FIG. 19, in the third embodiment, a tele-converter on state, in which a tele-conversion lens (a tele-converter) having a magnification ratio of, for example, 3, is combined with the finder optical system, and a tele-converter off state, in which the tele-converter is released from the finder optical system, is set selectively. In this manner, even if the fundamental optical system having a zoom ratio of 3 is employed, a zoom ratio of 9 can be achieved by the entire finder.

Specifically, as illustrated in FIG. 19, in cases where the finder zooming position is set such that the magnification ratio may fall within the range of 1 to 3, the tele-converter off state is set, and the taking lens is operated in the interlocked manner such that the zoom magnification ratio may fall within the range of 1 to 3. In this manner, an image of the same field angle as the field angle of the image displayed in the finder is recorded on the photographic film 51. In cases where the zoom lever is operated such that the zoom magnification ratio may become higher than 3, the zooming position of the taking lens is kept at the tele-end, and the tele-converter on state is set. Also, the finder zooming position is returned to the wide-end, and the finder is zoomed from the wide-end toward the tele-end.

During the period in which the finder zooming position is returned to the wide-end in the manner described above, the finder LCD (liquid crystal display device), which is incorporated in the finder optical system, is turned on, such that the finder image may not been seen.

In cases where the tele-converter is changed over from the on state to the off state, the operation reverse to the aforesaid operation is carried out.

The flow of the aforesaid processing will hereinbelow be described in detail with reference to FIGS. 15, 16, 17, and 18. The processing can be achieved by, for example, the constitution shown in FIG. 5. Explanation of the processing concerning the operation of the taking lens, and the like, will be omitted hereinbelow, and only the processing concerning the finder displaying will be described hereinbelow.

Figure 15:
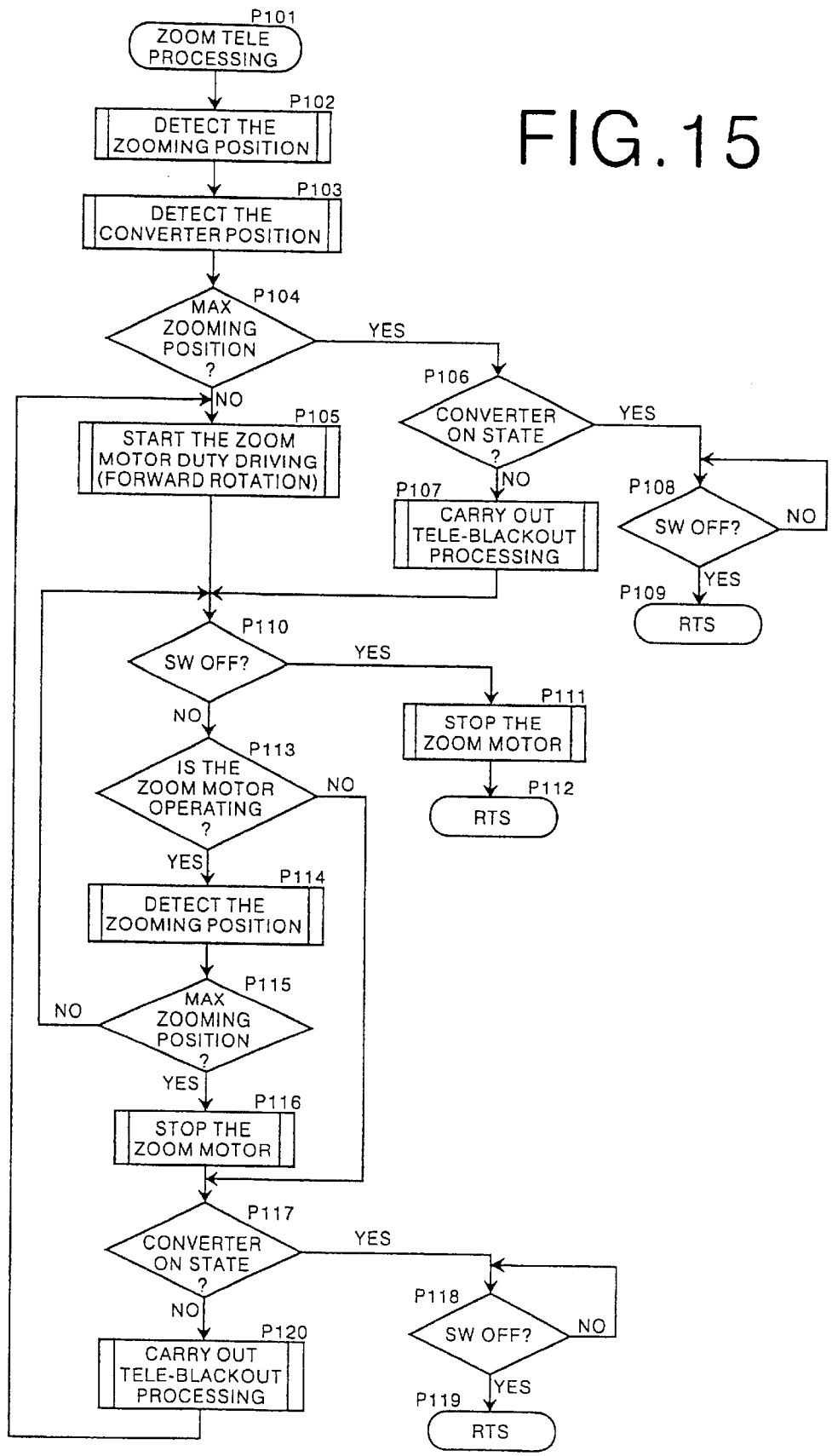
FIG. 15 is a flow chart showing how operation control processing is carried out in a third embodiment of the pseudo zoom camera in accordance with the present invention.

Firstly, how the processing is carried out in the cases of the zooming operation to the tele-side will hereinbelow be described in detail with reference to FIG. 15. In the flow of the general control processing with the CPU shown in FIG. 12, in a step P101, the zoom teleprocessing (i.e., the zooming operation to the tele-side) starts. In a step P102, the finder zooming position is detected. Also, in a step P103, the tele-converter position is detected.

Thereafter, in a step P104, a judgment is made as to whether the finder optical system is or is not set at the maximum zooming position (i.e., the tele-end position). In cases where it has been judged that the finder optical system is set at the maximum zooming position, in a step P106, a judgment is made as to whether the tele-converter is or is not in the on state. In cases where it has been judged that the tele-converter is in the on state, in a step P108, a judgment is made as to whether the zoom motor operation switch, which is operated by the zoom lever, is or is not off. In cases where it has been judged that the zoom motor operation switch is off, in a step P109, the processing returns to the general processing. In cases where it has been judged that the zoom motor operation switch is not off, the processing of the step P108 is repeated.

Figure 16:
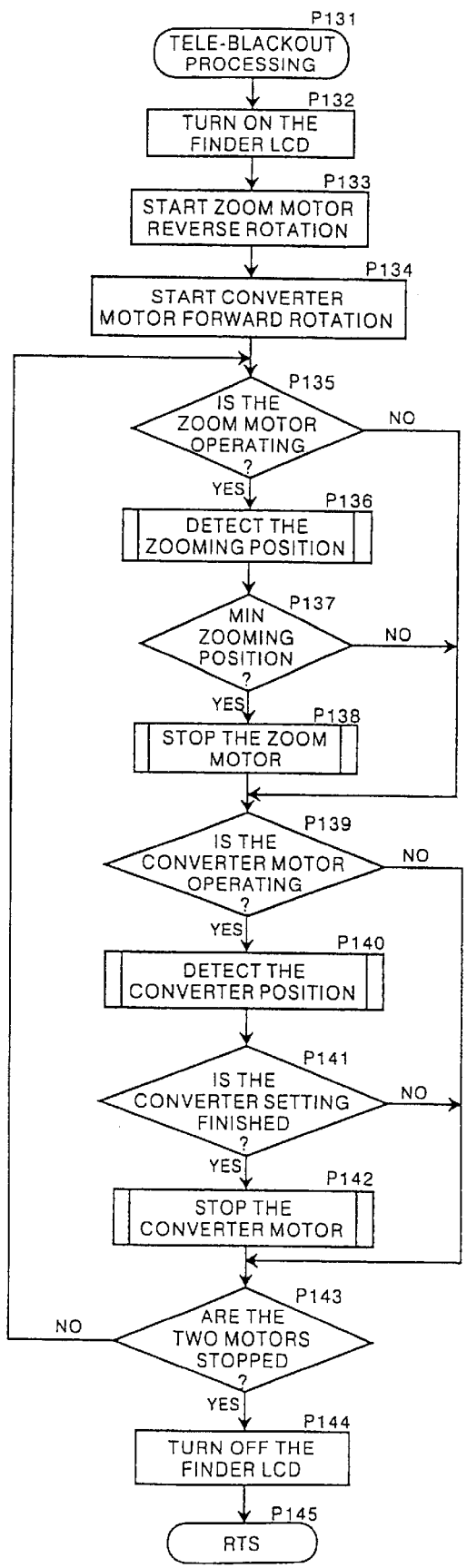
FIG. 16 is a flow chart showing control processing relevant to the processing shown in FIG. 15.

In cases where it has been judged in the step P106 that the tele-converter is in the off state, in a step P107, tele-blackout processing (i.e., blackout processing at the time of the zooming operation to the tele-side, which will be described later with reference to FIG. 16) is carried out.

In cases where it has been judged in the step P104 that the finder optical system is not set at the maximum zooming position (i.e., the tele-end position), in a step P105, the operation of the zoom motor is begun such that it may rotate in the forward direction with the rotation of the zoom motor in the forward direction, the zoom mechanism is operated to the tele-side. The rotation is carried out under duty control such that the zoom mechanism may be operated at a predetermined speed.

When the forward rotation of the zoom motor is begun, in a step P110, a judgment is made as to whether the aforesaid zoom motor operation switch is or is not off. In cases where it has been judged that the zoom motor operation switch is off, in a step P111, the zoom motor is stopped. Also, in a step P112, the processing returns to the general processing. In cases where it has been judged that the zoom motor operation switch is not off, in a step P113, a judgment is made as to whether the zoom motor is or is not operating.

In cases where it has been judged that the zoom motor is operating, in a step P114, the finder zooming position is detected. Also, in a step P115, a judgment is made as to whether the finder optical system is or is not set at the maximum zooming position (i.e., the tele-end position). In cases where it has been judged that the finder optical system is not set at the maximum zooming position, the processing returns to the step P110. In cases where it has been judged that the finder optical system is set at the maximum zooming position, in a step P116, the zoom motor is stopped.

After the zoom motor has been stopped, in a step P117, a judgment is made as to whether the tele-converter is or is not in the on state. In cases where it has been judged that the tele-converter is in the on state, in a step P118, a judgment is made as to whether the zoom motor operation switch is or is not off. In cases where it has been judged that the zoom motor operation switch is off, in a step P119, the processing returns to the general processing. In cases where it has been judged that the zoom motor operation switch is not off, the processing of the step P118 is repeated. In cases where it has been judged in the step P113 that the zoom motor is not operating, the processing proceeds to the step P117.

In cases where it has been judged in the step P117 that the tele-converter is in the off state, in a step P120, the tele-blackout processing is carried out.

How the tele-blackout processing is carried out will be described hereinbelow with reference to FIG. 16. In a step P131, the tele-blackout processing starts. In a step P132, the aforesaid LCD is turned on, such that the image displayed in the finder cannot be seen. Thereafter, in a step P133, the zoom motor is operated such that it may rotate in the reverse direction. With the rotation of the zoom motor in the reverse direction, the zoom mechanism is operated to the wide-side. Instead of being carried out under the duty control described above, the rotation is carried out, for example, in an ordinary DC driving mode, such that the finder zooming position may quickly return to the wide-end.

After the reverse rotation of the zoom motor is begun, in a step P134, the operation of a converter motor, which moves the tele-converter, is begun such that it may rotated in the forward direction with the rotation of the converter motor in the forward direction, the tele-converter is set at the position that is combined with the finder optical system.

Thereafter, in a step P135, a judgment is made as to whether the zoom motor is or is not operating. In cases where it has been judged that the zoom motor is operating, in a step P136, the finder zooming position is detected. Also, in a step P137, a judgment is made as to whether the finder optical system is or is not set at the minimum zooming position (i.e., the wide-end position). In cases where it has been judged that the finder optical system is set at the minimum zooming position, in a step P138, the zoom motor is stopped. Thereafter, in a step P139, a judgment is made as to whether the converter motor is or is not operating. In cases where it has been judged in the step P135 that the zoom motor is not operating, and in cases where it has been judged in the step P137 that the finder optical system is not set at the minimum zooming position, the processing proceeds to the aforesaid step P139.

In cases where it has been judged in the step P139 that the converter motor is operating, in a step P140, the tele-converter position is detected. Also, in a step P141, a judgment is made as to whether or not the setting of the tele-converter has been finished such that it may be normally combined with the finder optical system. In cases where it has been judged that the setting of the tele-converter has been finished, in a step P142, the converter motor is stopped. Also, in a step P143, a judgment is made as to whether both the converter motor and the zoom motor have or have not been stopped.

In cases where it has been judged in the step P139 that the converter motor is not operating, and in cases where it has been judged in the step P141 that the setting of the tele-converter has not been finished, the processing proceeds to the aforesaid step P143. In cases where it has been judged in the step P143 that the converter motor and the zoom motor have not been stopped, the processing returns to the step P135.

In cases where it has been judged in the step P143 that the converter motor and the zoom motor have been stopped, in a step P144, the aforesaid LCD is turned off, such that the image displayed in the finder can be seen. Also, in a step P145, the processing returns to the general processing.

Figure 17:
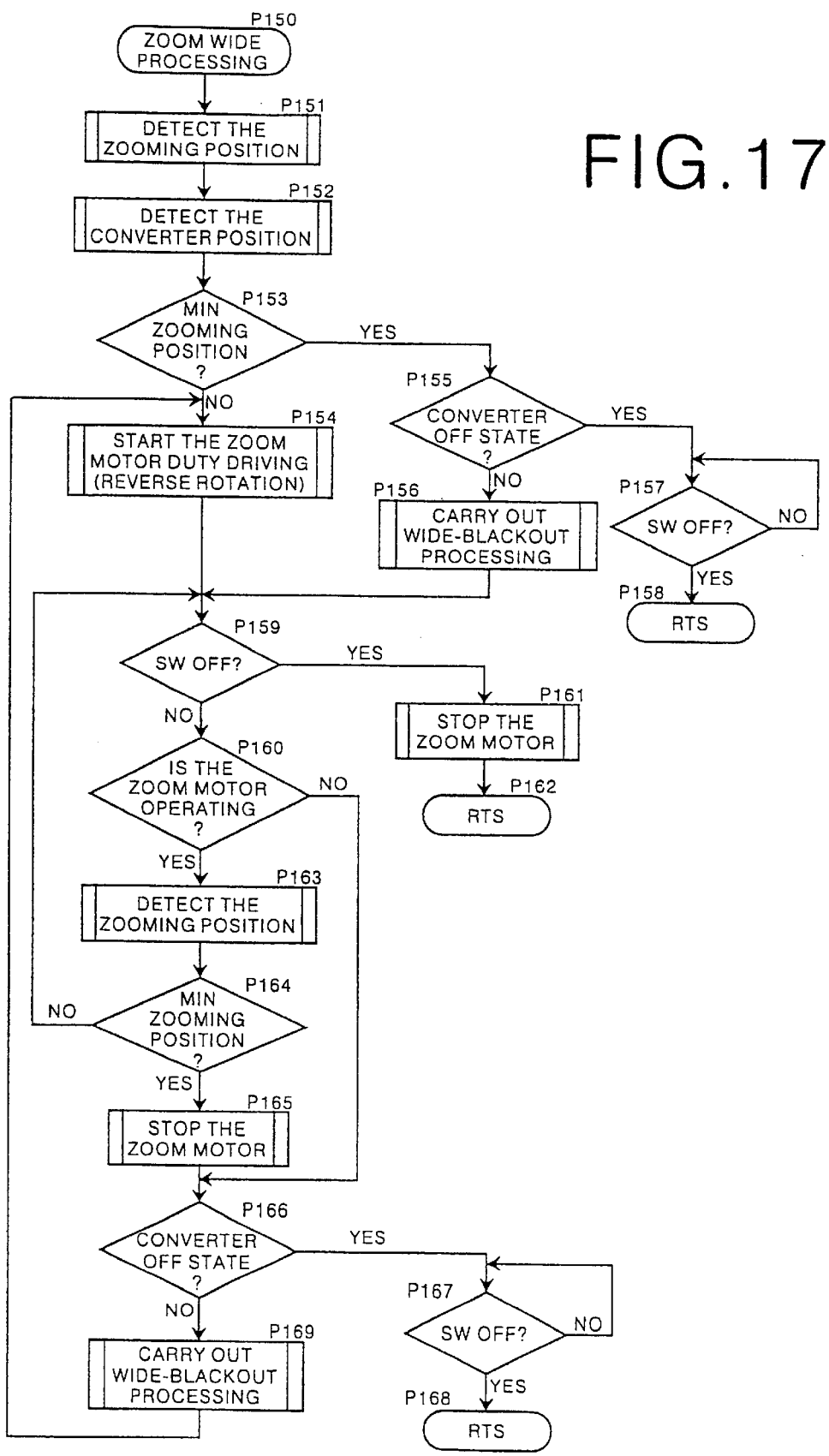
FIG. 17 is a flow chart showing control processing relevant to the processing shown in FIG. 15.
Figure 18:
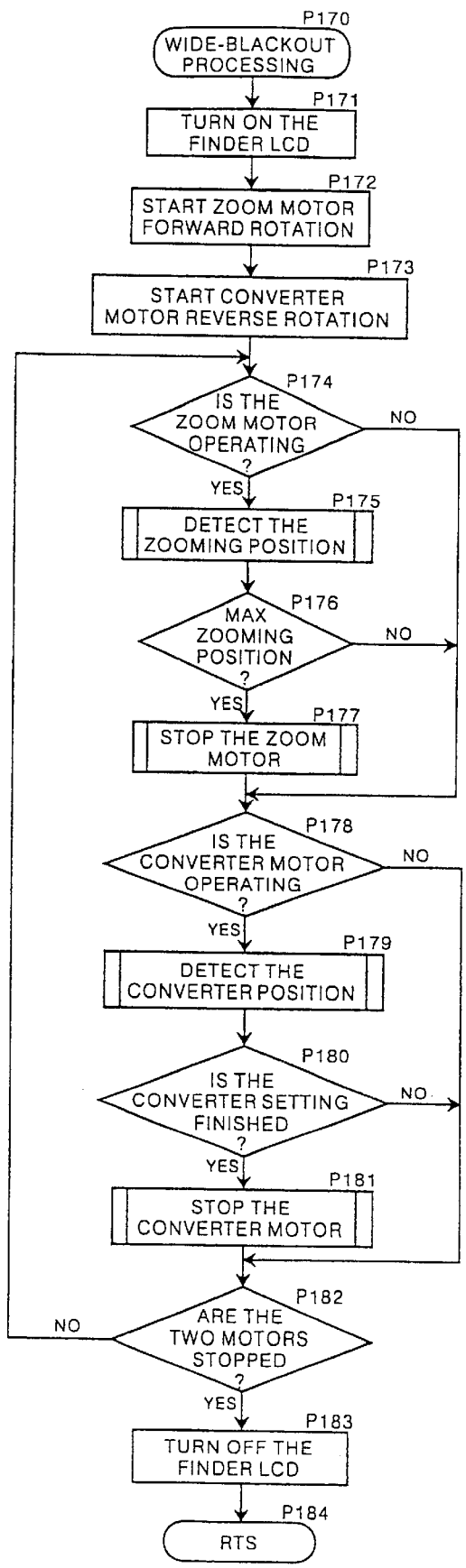
FIG. 18 is a flow chart showing control processing relevant to the processing shown in FIG. 15.

How the zooming operation to the wide-side and the blackout processing at the time of the zooming operation to the wide-side are carried out will be described hereinbelow with reference to FIGS. 17 and 18. With reference to FIG. 17, in a step P15, the zoom wide processing (i.e., the zooming operation to the wide-side) starts. In a step P151, the finder zooming position is detected. Also, in a step P152, the tele-converter position is detected.

Thereafter, in a step P153, a judgment is made as to whether the finder optical system is or is not set at the minimum zooming position (i.e., the wide-end position). In cases where it has been judged that the finder optical system is set at the minimum zooming position, in a step P155, a judgment is made as to whether the tele-converter is or is not in the off state. In cases where it has been judged that the tele-converter is in the off state, in a step P157, a judgment is made as to whether the zoom motor operation switch, which is operated by the zoom lever, is or is not off. In cases where it has been judged that the zoom motor operation switch is off, in a step P158, the processing returns to the general processing. In cases where it has been judged that the zoom motor operation switch is not off, the processing of the step P157 is repeated.

In cases where it has been judged in the step P155 that the tele-converter is in the on state, in a step P156, wide-blackout processing (i.e., blackout processing at the time of the zooming operation to the wide-side, which will be described later with reference to FIG. 18) is carried out.

In cases where it has been judged in the step P153 that the finder optical system is not set at the minimum zooming position (i.e., the wide-end position), in a step P154, the operation of the zoom motor is begun such that it may rotate in the reverse direction. With the rotation of the zoom motor in the reverse direction, the zoom mechanism is operated to the wide-side. The rotation is carried out under duty control such that the zoom mechanism may be operated at a predetermined speed.

When the reverse rotation of the zoom motor is begun, in a step P159, a judgment is made as to whether the aforesaid zoom motor operation switch is or is not off. In cases where it has been judged that the zoom motor operation switch is off, in a step P161, the zoom motor is stopped. Also, in a step P162, the processing returns to the general processing. In cases where it has been judged that the zoom motor operation switch is not off, in a step P160, a judgment is made as to whether the zoom motor is or is not operating.

In cases where it has been judged that the zoom motor is operating, in a step P163, the finder zooming position is detected. Also, in a step P164, a judgment is made as to whether the finder optical system is or is not set at the minimum zooming position (i.e., the wide-end position). In cases where it has been judged that the finder optical system is not set at the minimum zooming position, the processing returns to the step P159. In cases where it has been judged that the finder optical system is set at the minimum zooming position, in a step P165, the zoom motor is stopped.

After the zoom motor has been stopped, in a step P166, a judgment is made as to whether the tele-converter is or is not in the off state. In cases where it has been judged that the tele-converter is in the off state, in a step P167, a judgment is made as to whether the zoom motor operation switch is or is not off. In cases where it has been judged that the zoom motor operation switch is off, in a step P168, the processing returns to the general processing. In cases where it has been judged that the zoom motor operation switch is not off, the processing of the step P167 is repeated. In cases where it has been judged in the step P160 that the zoom motor is not operating, the processing proceeds to the step P166.

In cases where it has been judged in the step P166 that the tele-converter is in the on state, in a step P169, the wide-blackout processing is carried out.

How the wide-blackout processing is carried out will be described hereinbelow with reference to FIG. 18. In a step P170, the wide-blackout processing starts. In a step P171, the aforesaid LCD is turned on, such that the image displayed in the finder cannot be seen. Thereafter, in a step P172, the zoom motor is operated such that it may rotate in the forward direction. With the rotation of the zoom motor in the forward direction, the zoom mechanism is operated to the tele-side. Instead of being carried out under the duty control described above, the rotation is carried out, for example, in an ordinary DC driving mode, such that the finder zooming position may quickly return to the tele-end.

After the forward rotation of the zoom motor is begun, in a step P173, the operation of a converter motor, which moves the tele-converter, is begun such that it may rotated in the reverse direction. With the rotation of the converter motor in the reverse direction, the tele-converter is set at the position that is released from the finder optical system.

Thereafter, in a step P174, a judgment is made as to whether the zoom motor is or is not operating. In cases where it has been judged that the zoom motor is operating, in a step P175, the finder zooming position is detected. Also, in a step P176, a judgment is made as to whether the finder optical system is or is not set at the maximum zooming position (i.e., the tele-end position). In cases where it has been judged that the finder optical system is set at the maximum zooming position, in a step P177, the zoom motor is stopped. Thereafter, in a step P178, a judgment is made as to whether the converter motor is or is not operating. In cases where it has been judged in the step P174 that the zoom motor is not operating, and in cases where it has been judged in the step P176 that the finder optical system is not set at the maximum zooming position, the processing proceeds to the aforesaid step P178.

In cases where it has been judged in the step P178 that the converter motor is operating, in a step P179, the tele-converter position is detected. Also, in a step P180, a judgment is made as to whether or not the setting of the tele-converter has been finished such that it may be normally released from the finder optical system. In cases where it has been judged that the setting of the tele-converter has been finished, in a step P181, the converter motor is stopped. Also, in a step P182, a judgment is made as to whether both the converter motor and the zoom motor have or have not been stopped.

In cases where it has been judged in the step P178 that the converter motor is not operating, and in cases where it has been judged in the step P180 that the setting of the tele-converter has not been finished, the processing proceeds to the aforesaid step P182. In cases where it has been judged in the step P182 that the converter motor and the zoom motor have not been stopped, the processing returns to the step P174.

In cases where it has been judged in the step P182 that the converter motor and the zoom motor have been stopped, in a step P183, the aforesaid LCD is turned off, such that the image displayed in the finder can be seen. Also, in a step P184, the processing returns to the general processing.

In the third embodiment described above, as indicated by the solid line in FIG. 19, the rate of change in finder zooming position per unit time is kept the same between when the tele-converter is used and when the tele-converter is not used. Alternatively, as indicated by the single-dot chained line in FIG. 19, the rate of change in finder zooming position per unit time when the tele-converter is used may be set to be lower than the rate of change when the tele-converter is not used. In such cases, the sharp change in magnification ratio of the image displayed in the finder due to the use of the tele-converter can be relieved, and confirmation of the visual field range can be carried out easily.

Also, as indicated by the double-dot chained line in FIG. 19, in accordance with the relationship between the tele-converter magnification ratio and the zoom ratio of the finder zoom optical system, when the tele-converter on state and the tele-converter off state are changed over to each other, the finder zooming position may not be returned to the tele-end or the wide-end. In such cases, after the state of the tele-converter is changed over to the on state, the maximum magnification ratio can be reached quickly. Therefore, in such cases, the rate of change in finder zooming position per unit time should preferably be set to be particularly low.

Figure 20:
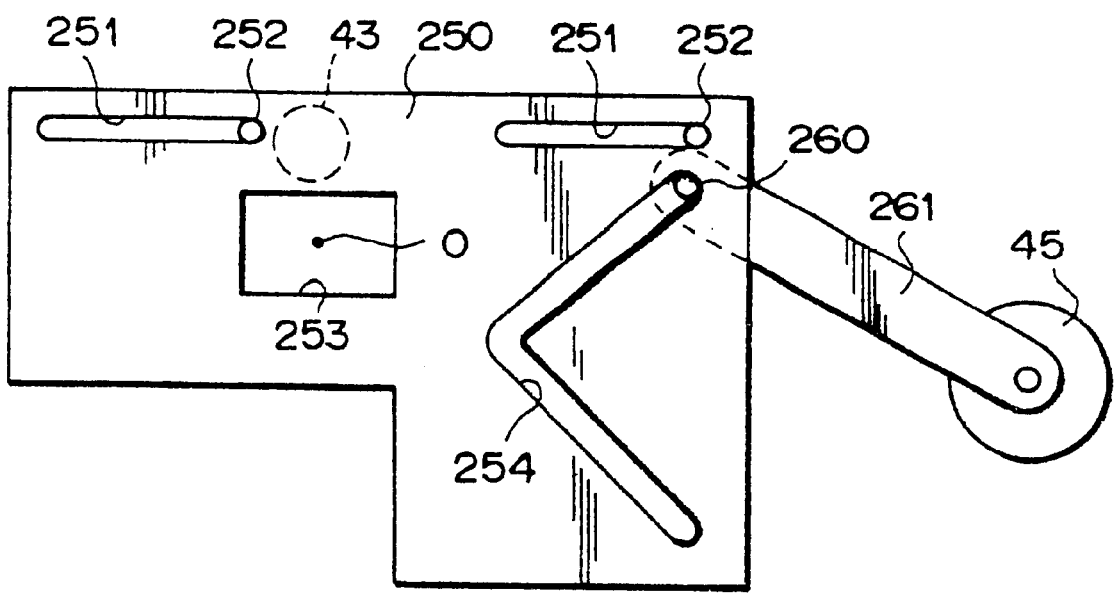
FIG. 20 is a front view showing a blackout means in a fourth embodiment of the pseudo zoom camera in accordance with the present invention.
Figure 21:
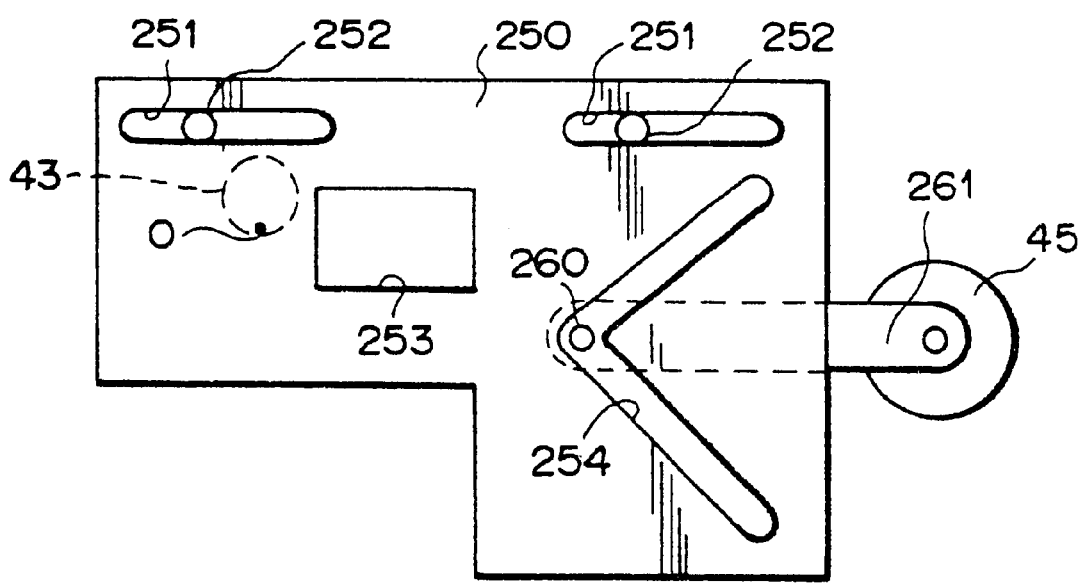
FIG. 21 is a front view showing a different state of the blackout means shown in FIG. 20.

In the third embodiment described above, the blackout is carried out by using the liquid crystal display device. Alternatively, the blackout may be carried out by using one of various other means. FIG. 20 is a front view showing a blackout means for mechanically carrying out the blackout in a fourth embodiment of the pseudo zoom camera in accordance with the present invention. FIG. 21 is a front view showing a different state of the blackout means shown in FIG. 20. In the blackout means, a light blocking plate 250 has two slide grooves 251, 251. Engagement pins 252, 252, which are secured to the camera body side, are inserted respectively through the slide grooves 251, 251. The light blocking plate 250 can thereby move horizontally in FIG. 20. Also, the light blocking plate 250 is provided with a light passage window 253, which matches with an optical axis O of the finder optical system when the finder is used.

The light blocking plate 250 is further provided with a dogleg-like slide groove 254. A pin 260 is inserted through the slide groove 254. The pin 260 is secured to an end of a connection bar 261, which is swung by the lens change-over actuator 45. In this embodiment, the tele- conversion lens 43 is set selectively to the state, in which it is combined with the finder optical system, or to the state, in which it is released from the finder optical system. The tele-conversion lens 43 is moved by, for example, a combination of the pinion gear (not shown in FIG. 20), which is driven by the lens change-over actuator 45, and the rack (not shown in FIG. 20). The tele-conversion lens 43 is thereby selectively set to one of the two states.

FIG. 20 shows the state, in which the tele-conversion lens 43 is not used. In this state, the light passage window 253 is matched with the optical axis O of the finder optical system. The lens change-over actuator 45 may then operates for moving the tele-conversion lens 43 to the position that matches with the optical axis O of the finder optical system. As a result, the connection bar 261 is swung, and the light blocking plate 250 is moved to the right in FIG. 20.

As illustrated in FIG. 21, when the pin 260 reaches the middle part of the slide groove 254, the tele-conversion lens 43 is located at an intermediate position of the movement to the position that matches with the optical axis O of the finder optical system. At this time, the light blocking plate 250 is located at the right end position of the horizontal movement range, and the light passage window 253 is located at the position spaced apart from the optical axis O of the finder optical system. In this state, the finder optical path is blocked by the light blocking plate 250. In this manner, the blackout can be carried out.

When the lens change-over actuator 45 operates even further from the state shown in FIG. 21 and the pin 260 reaches the lower end of the slide groove 254, the light blocking plate 250 returns to the position shown in FIG. 20. At this time, the tele-conversion lens 43 perfectly matches with the optical axis O of the finder optical system.

An embodiment of the zoom finder in accordance with the present invention will be described hereinbelow.

The embodiment of the zoom finder is constituted in the same manner as that in the finder optical system 30 in the aforesaid first embodiment of the pseudo zoom camera in accordance with the present invention. In this case, the fundamental optical system 31 shown in FIG. 1 constitutes the zoom optical system of the zoom finder.

An image, which has been recorded on the photographic film 51 by using the pseudo zoom camera, is subjected to the pseudo zoom processing, which is carried out by the photo printing system shown in FIG. 7 in the manner described above.

The relationship between the photographing field angle and the field angle of the printed image with the pseudo zoom processing is. identical with the relationship between the field angle of an image, which is formed by a taking lens, and the field angle of a recorded image in an electronic still camera, a video camera, or the like, in which electronic zoom functions are employed. Therefore, in cases where the zoom finder in accordance with the present invention is employed with respect to the electronic still camera, the video camera, or the like, the same effects as those described above can be obtained.

The zoom finder in accordance with the present invention may be embodied in the same manner as that in the aforesaid third or fourth embodiment of the pseudo zoom camera in accordance with the present invention.

Figure 22:
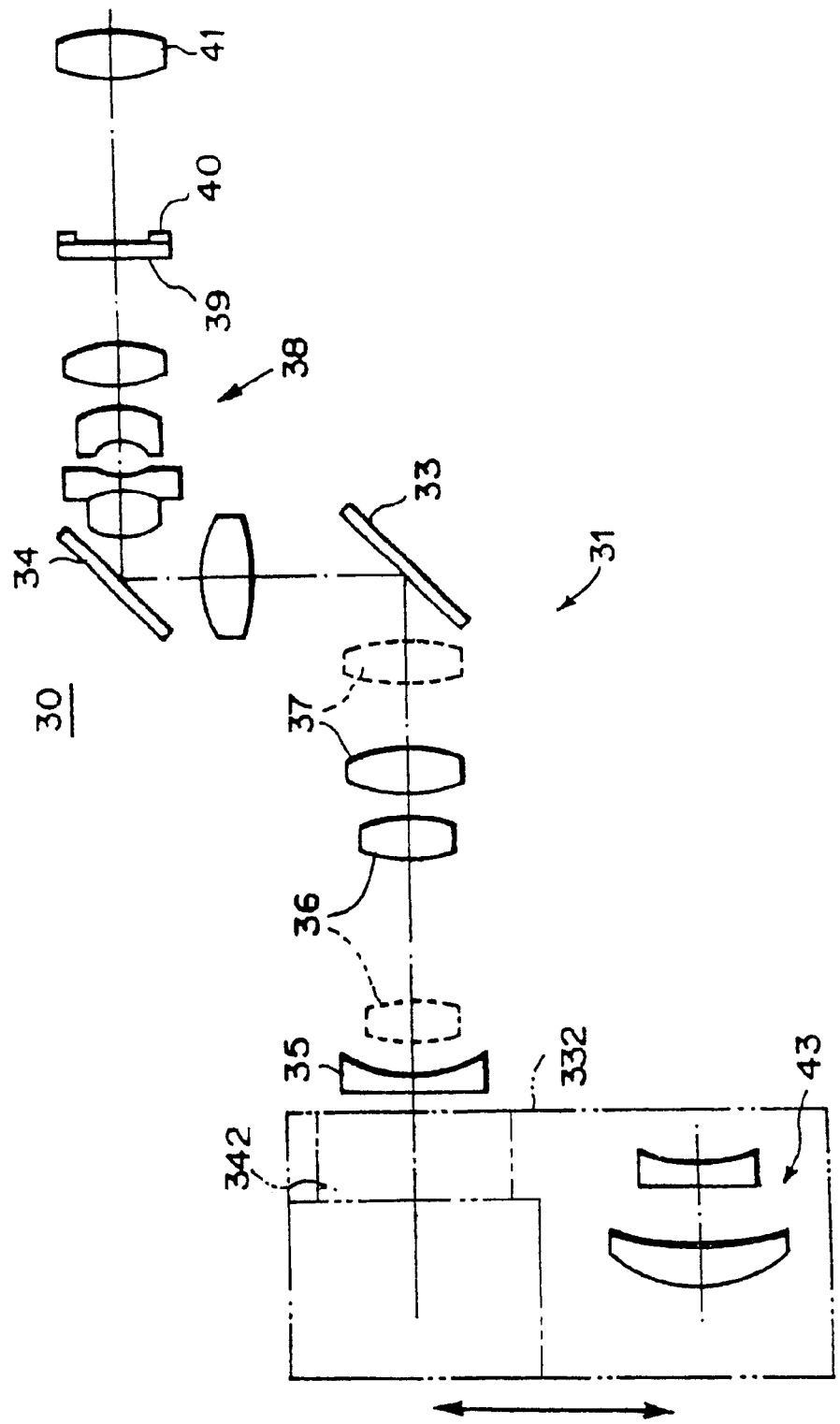
FIG. 22 is a side view showing a finder optical system in a fifth embodiment of the pseudo zoom camera in accordance with the present invention.

A fifth embodiment of the pseudo zoom camera in accordance with the present invention will be described hereinbelow. The fifth embodiment of the pseudo zoom camera has the same appearance as that shown in FIG. 2. FIG. 22 shows a finder optical system in the fifth embodiment of the pseudo zoom camera. In FIG. 22, similar elements are numbered with the same reference numerals with respect to FIG. 1.

As illustrated in FIG. 22, the finder (the finder optical system) 30 comprises the zoom optical system (the fundamental optical system) 31 and a conversion lens block 332.

The zoom optical system 31 has the same constitution as that of the fundamental optical system 31 shown in FIG. 1.

The conversion lens block 332 is provided with a window 342, which allows light to pass therethrough. Also, the tele-conversion lens 43 is secured to the conversion lens block 332. By way of example, the tele-conversion lens 43 enlarges the finder image, which is formed by the zoom optical system 31, to a size 2 times as large as the original size (i.e., q=2).

Figure 23:
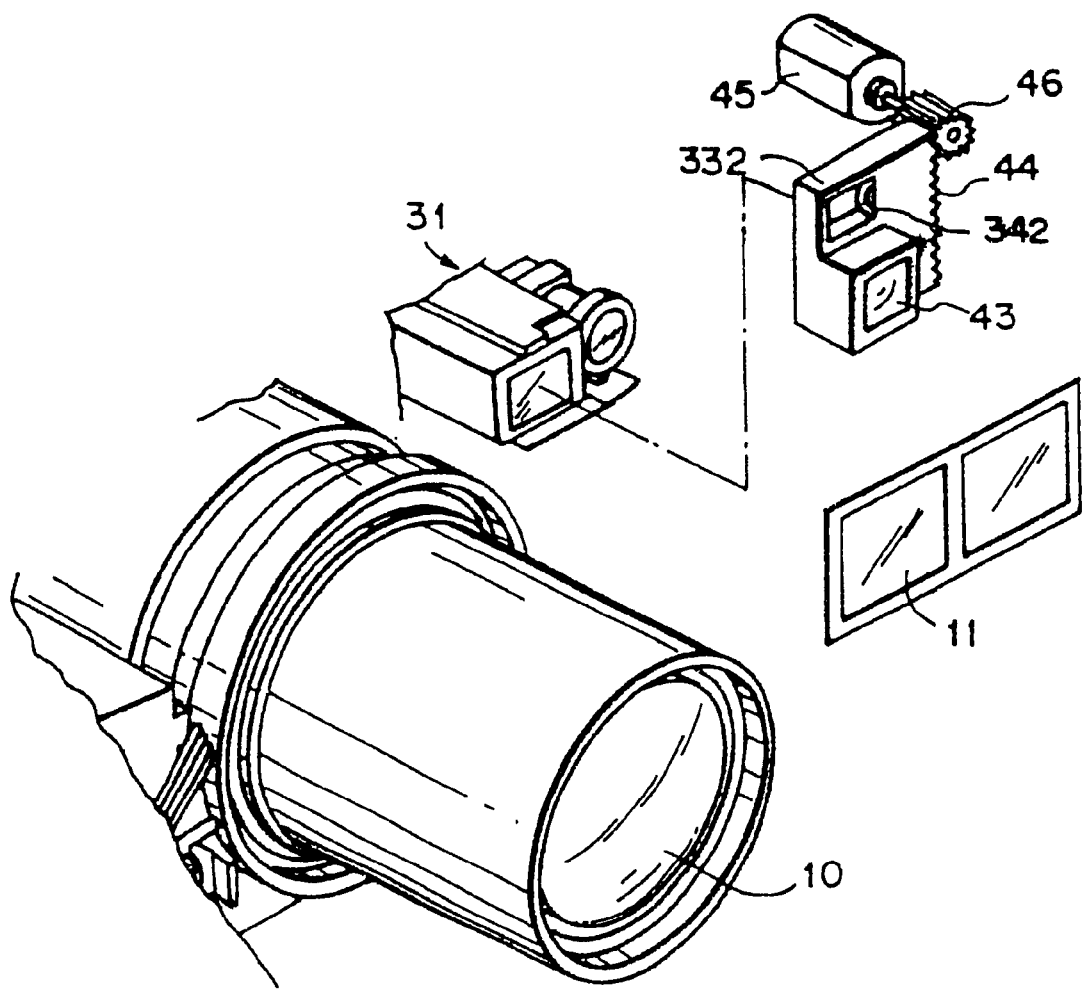
FIG. 23 is an exploded perspective view showing the major part of the pseudo zoom camera shown in FIG. 22.

FIG. 23 is an exploded perspective view showing the major part of the fifth embodiment of the pseudo zoom camera. As illustrated in FIG. 23, the conversion lens block 332 is provided with the rack 44, which extends vertically. The pinion gear 46, which is rotated by the lens change-over actuator 45, is engaged with the rack 44.

In the fifth embodiment of the pseudo zoom camera, the film cartridge 50 shown in FIG. 4 is utilized. The electric control constitution in the fifth embodiment of the pseudo zoom camera is the same as that shown in FIG. 5.

How the fifth embodiment of the pseudo zoom camera operates will be described hereinbelow. In this embodiment, by way of example, the taking lens 10 has a zoom magnification ratio, n, of 2, and the zoom optical system 31 of the finder 30 has a zoom magnification ratio, p, of 3. Also, the pseudo zoom magnification ratio in the printing process is at most 3 (m=3).

Figure 24:
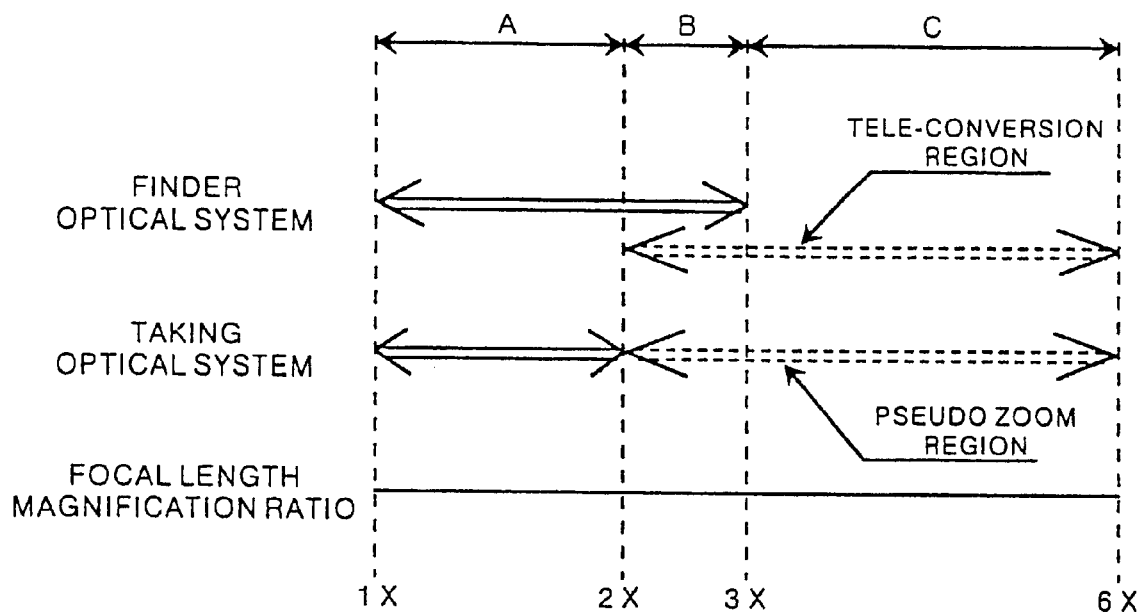
FIG. 24 is a graph showing change characteristics of magnification ratios of a finder optical system and a taking optical system in the fifth embodiment of the pseudo zoom camera.

FIG. 24 shows a change in focal length magnification ratio with the taking lens 10 and the zoom optical system 31, as well as with the tele-conversion lens 43 and the pseudo zoom processing. The change in focal length magnification ratio with the pseudo zoom processing, which change is shown in FIG. 24, is the apparent one.

In the range of the zoom magnification ratio of 2, which the taking lens 10 covers, i.e. a region A shown in FIG. 24, the conversion lens block 332 is forcibly located at the position, such that the window 342 may be aligned with the optical axis of the zoom optical system 31. Specifically, the tele-conversion lens 43 is set at the position that is released from the zoom optical system 31. In this region, alteration of the photographing field angle is carried out in the same manner as that in an ordinary 35mm lens shutter camera provided with a zoom lens, or the like.

Specifically, when the zoom lever 21 is operated to a tele-side or a wide-side (i.e., a wide-angle side), a tele-operation signal or a wide-operation signal is fed from the zoom switch 63 shown in FIG. 5 into the CPU 60. The feeding of the tele-operation signal or the wide-operation signal into the CPU 60 is continued until the operation of the zoom lever 21 is stopped.

When the CPU 60 receives the tele-operation signal, it feeds a control signal, which instructs tele-side driving, to the driver 72. Also, the zoom driving motor 78 and the finder driving motor 79 receive driving current from the driver 72 and rotate in directions that set the focal lengths of the taking lens 10 and the zoom optical system 31, respectively, at large values.

When the CPU 60 receives the wide-operation signal, it feeds a control signal, which instructs wide-side driving, to the driver 72. Also, the zoom driving motor 78 and the finder driving motor 79 receive driving current -from the driver 72 and rotate in directions that set the focal lengths of the taking lens 10 and the zoom optical system 31, respectively, at small values.

In each of the taking lens 10 and the zoom optical system 31, a predetermined number of lenses are moved along the optical axis direction by a known cam mechanism, which receives the rotation force of the corresponding zoom driving motor 78 or the corresponding finder driving motor 79, and the focal length is thereby changed. In this manner, in the region in which the zoom magnification ratio is at most 2, the field angle of the object image, which is formed by the taking lens 10, and the field angle of the finder image, which is displayed by the finder 30, are changed such that the field angles of the object image and the finder image may be kept identical with each other.

When the operation of the zoom lever 21 is stopped, the feeding of the tele- operation signal or the wide-operation signal into the CPU 60 is ceased, and the zoom driving motor 78 and the finder driving motor 79 are stopped. At this time, the taking lens 10 is set in the state, in which an image of a field angle identical with the field angle of the finder image displayed in a visual field frame of the visual field plate 40 is formed on the photographic film 51. Therefore, when the shutter push button 20 is pushed in this state, predetermined automatic focusing processing and automatic exposure processing are carried out, and a photographic latent image of the aforesaid field angle is recorded on the photographic film 51.

In FIG. 22, wide-end positions of the zoom lenses 36 and 37 are indicated by the solid lines, and tele-end positions of them are indicated by the broken lines. When the zoom lenses 36 and 37 take the wide-end positions, the taking lens 10 is set in the state, in which the focal length is shortest. Also, when the zoom lenses 36 and 37 take the positions, such that the zoom magnification ratio may become equal to 2, the taking lens 10 is set in the state, in which the focal length is longest, i.e. at the tele-end positions.

In a region B shown in FIG. 24, in which the zoom magnification ratio of the zoom optical system 31 is higher than 2, the taking lens 10 is kept at the tele-end position. Also, in accordance with an intention of the photographer, one of the state, in which the tele-conversion lens 43 is used, and the state, in which the tele-conversion lens 43 is not used, is set selectively.

Specifically, each time the pseudo zoom mode push button 22 shown in FIG. 2 is pushed one time, an on signal and an off signal are alternately fed from the pseudo zoom switch 61 shown in FIG. 5 into the CPU 60. Also, the CPU 60 controls the lens change-over actuator 45 in accordance with the received signals. In cases where the off signal is fed into the CPU 60, the conversion lens block 332 is set such that the window 342 may coincide with the optical axis of the zoom optical system 31. In cases where the on signal is fed into the CPU 60, the conversion lens block 332 is set such that the tele-conversion lens 43 may coincide with the optical axis of the zoom optical system 31.

In cases where the tele-conversion lens 43 is not used, in accordance with the operation of the zoom lever 21, the zoom magnification ratio of the zoom optical system 31 (in this case, the zoom magnification ratio of the entire finder) is set at a value falling within the range of 2 to 3. However, since the taking lens 10 is kept at the tele-end position as described above, the photographing field angle does not change.

Each time the shutter push button 20 is pushed and an object image, which is formed by the taking lens 10, is recorded on the photographic film 51, in this region, the CPU 60 writes the information, which represents the image range ratio of the image displayed in the finder to the object image of the predetermined field angle, and the information, which represents the frame number of the frame that records the object image, on the storage device 54 of the cartridge 53.

In cases where the tele-conversion lens 43 is used, in accordance with the operation of the zoom lever 21, the zoom magnification ratio of the zoom optical system 31 is set at a value falling within the range of 2 to 3. In such cases, with the effects of the tele-conversion lens 43 having a magnification ratio of 2, the zoom magnification ratio of the entire finder takes a value falling within the range of 4 to 6 (in the tele-conversion region shown in FIG. 24). Also, since the taking lens 10 is kept at the tele-end position as described above, the photographing field angle does not change.

Each time the shutter push button 20 is pushed and an object image, which is formed by the taking lens 10, is recorded on the photographic film 51, in this region, the CPU 60 writes the information, which represents the image range ratio of the image displayed in the finder to the object image of the predetermined field angle, and the information, which represents the frame number of the frame that records the object image, on the storage device 54 of the cartridge 53. The writing of the information may be carried out with a contact technique via a contact point or with a non-contact technique.

An image, which has been recorded on the photographic film 51 by using the pseudo zoom camera, is subjected to the pseudo zoom processing, which is carried out by the photo printing system shown in FIG. 7 in the manner described above.

How the pixel density conversion for the pseudo zoom processing is carried out by the image size enlargement or reduction processing means 112 in the system constitution shown in FIG. 8 will be described hereinbelow. The image size enlargement or reduction processing means 112 receives the storage information H of each of frames of the photographic film 51A from the reading means 103. As described above, the storage information H represents an image range ratio R of the image displayed in the finder to the object image.

In the region A shown in FIG. 24, the image range ratio R is "1" at all times. With respect to the frame associated with the image range ratio of "1," the image size enlargement or reduction processing means 112 does not carry out the pixel density conversion processing for the image size enlargement or reduction specifically, in such cases, printing processing is carried out such that an image shown in FIG. 9A, which has been recorded in a certain frame F on the developed photographic film 51A, may be reproduced on a recording material 200 having a predetermined size as shown in FIG. 9B, such that the image size may not be enlarged or reduced. In this manner, in such cases, a print, on which an image of the same field angle as the field angle of the image displayed in the finder has been recorded, is obtained.

In the regions B and C shown in FIG. 24, the image range ratio R, which is represented by the storage information H, takes a value falling within the range of 1 to 3. With respect to the frame associated with the image range ratio taking such a value, the image size enlargement or reduction processing means 112 carries out the image size enlargement processing on the image signal, which has been detected by the scanner 110, such that, for example, the center point of the photographic image may not be shifted, and such that only a range of 1/R in horizontal and vertical directions may be reproduced on the recording material 200 having a predetermined size. The image size enlargement processing is carried out with a scale of image size enlargement of at most 3. Specifically, in such cases, printing processing is carried out such that, of an image shown in FIG. 9A, which has been recorded in a certain frame F on the developed photographic film 51A, only the region surrounded by the double-dot chained lines shown in FIG. 9A may be reproduced on the recording material 200 as shown in FIG. 9C.

As described above, with the fifth embodiment of the pseudo zoom camera and this embodiment of the photo printing system in accordance with the present invention, even if the taking lens 10 having a zoom magnification ratio of 2 is employed, a photoprint can be obtained as if it were photographed with a taking lens having a zoom magnification ratio of 6. Also, the field angle of the image, which will be printed with an enlarged size through the pseudo zoom operation, can be confirmed through the finder at the time of the photographing operation.

In the fifth embodiment of the pseudo zoom camera in accordance with the present invention, the zoom magnification ratio of the taking lens 10 is set to be 2, which is lower than the zoom magnification ratio (=3) of the zoom optical system 31. Therefore, the taking lens 10 can be prevented from becoming large in size and expensive in cost due to an increase in zoom magnification ratio, and the pseudo zoom camera can be kept comparatively small in size and cheap in cost.

Also, with the fifth embodiment of the pseudo zoom camera, the zoom magnification ratio (=3) of the zoom optical system 31 is higher than the zoom magnification ratio (=2) of the taking lens 10. Therefore, as the tele-conversion lens 43, which is apt to become large in size and expensive in cost due to an increase in magnification ratio, a tele-conversion lens having a comparatively low magnification ratio (=2) can be employed. Therefore, also with this feature, the pseudo zoom camera can be kept small in size and cheap in cost.

In the fifth embodiment of the pseudo zoom camera in accordance with the present invention, the maximum zoom magnification ratio, m, in the pseudo zoom operation, the zoom magnification ratio, n, of the taking zoom lens, the zoom magnification ratio, p, of the finder zoom optical system, and the zoom magnification ratio, q, of the tele-conversion lens are not limited to the values described above.

An embodiment of the camera in accordance with the present invention will be described hereinbelow.

Figure 25:
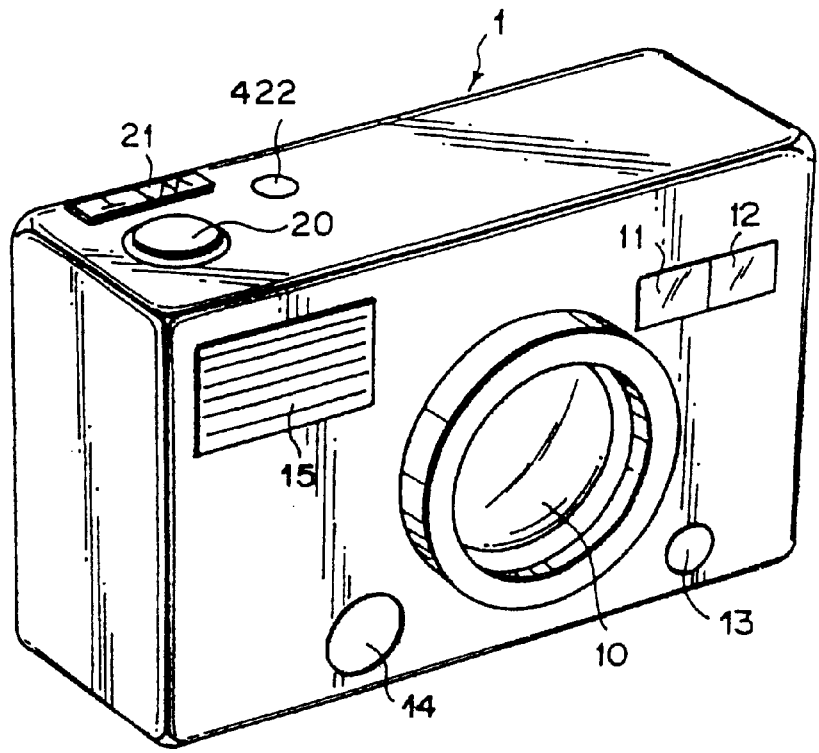
FIG. 25 is a perspective view showing an embodiment of the camera in accordance with the present invention.
Figure 26:
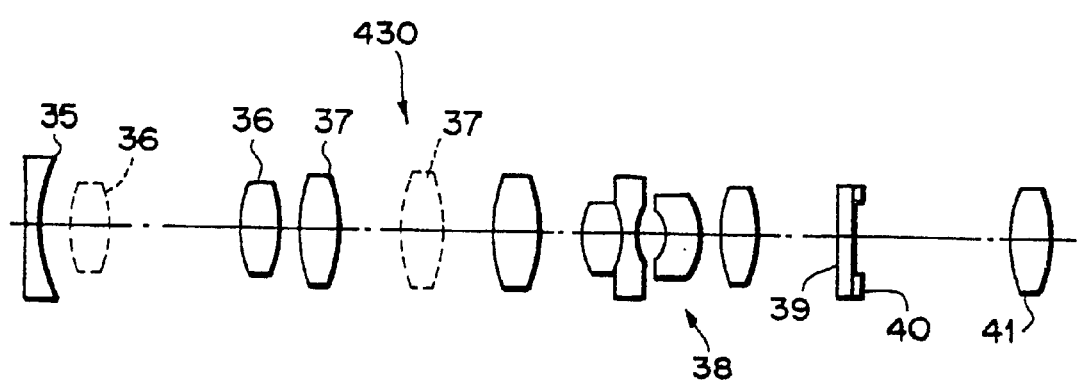
FIG. 26 is a side view showing a finder optical system in the camera shown in FIG. 25.

FIG. 25 is a perspective view showing an embodiment of the camera in accordance with the present invention. FIG. 26 is a side view showing a finder optical system in the camera shown in FIG. 25.

As illustrated in FIG. 25, the camera is provided with the taking lens 10 constituted of a zoom lens, the finder window 11, the AE (automatic exposure) light receiving window 12, the AF (automatic focusing) light projecting window 13, the strobe flashing section 15, and the like, which are located at the front surface of the body 1. Also, the shutter push button 20, the zoom lever 21, a correction mode switch 422, and the like, are located at the top surface of the body 1.

A finder optical system 430 shown in FIG. 26 is an ordinary relay type of real image finder optical system. The finder optical system 430 comprises the objective lens 35, the zoom lenses 36 and 37, the relay lens 38, the focal plate 39 on which a finder image is formed, the visual field plate 40 which indicates the range of an image recorded, the eyepiece 41, and the like.

In this camera, the film cartridge 50 shown in FIG. 4 is utilized.

Figure 27:
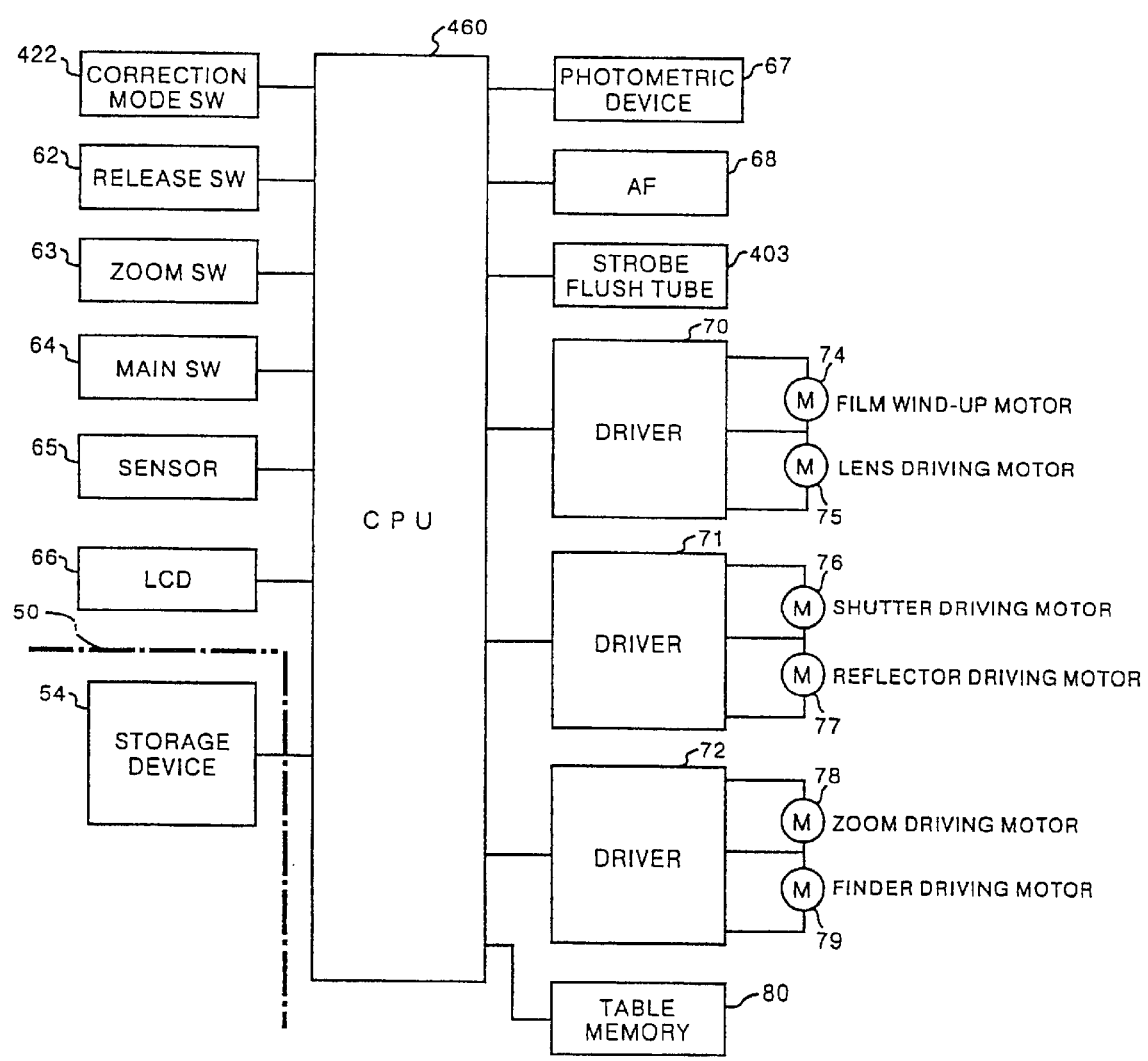
FIG. 27 is a block diagram showing an electric control constitution in the camera shown in FIG. 25.

FIG. 27 is a block diagram showing an electric control constitution in the camera shown in FIG. 25. As illustrated in FIG. 27, the electric circuitry of the camera is provided with a central processing unit (CPU) 460, which controls fundamental operations of the camera. The CPU 460 receives signals from the correction mode switch 422, the release switch 62, the zoom switch 63, the main switch 64, and the sensor 65. (The sensor 65 represents a group of various kinds of sensors.)

Also, the CPU 460 is connected to the liquid crystal display device (LCD) 66 which displays various kinds of information in, for example, the finder, the photometric device 67 for determining a correct exposure, the AF circuit 68, a strobe flash tube 403, and the drivers 70, 71, and 72. Each of these devices is controlled by the CPU 460. Further, the CPU 460 is connected to a table memory 80, which will be described later.

The driver 70 drives a film wind-up motor 74 and a lens driving motor 75. The driver 71 drives the shutter driving motor 76 and the reflector driving motor 77 for operating a reflector of the strobe, which will be described later. The driver 72 drives the zoom driving motor 78 and the finder driving motor 79.

In the taking lens 10, a predetermined number of lenses are moved along the optical axis direction by a known cam mechanism, which receives the rotation force of the zoom driving motor 78, and the focal length is thereby changed. Also, in the finder optical system 430, the zoom lenses 36 and 37 are moved along the optical axis direction by a known cam mechanism, which receives the rotation force of the finder driving motor 79, and the focal length is thereby changed. In FIG. 26, the wide-end positions of the zoom lenses 36 and 37 are indicated by the solid lines, and the tele-end positions of them are indicated by the broken lines.

FIGS. 32A and 32B show the strobe flashing section 15 in the camera shown in FIG. 25. The strobe flashing section 15 comprises an optical panel (a Fresnel plate) 400, which is secured to the front surface of the camera body, a reflector (a reflecting plate) 402, which is located at the rear of the optical panel 400, and the strobe flash tube 403, which is located at a position inside of the space defined by the reflector 402. As illustrated in FIGS. 32A and 32B, the reflector 402 and the strobe flash tube 403 are driven by the aforesaid reflector driving motor 77 and can be moved together in the forward and backward directions in the camera such that the distances of them from the optical panel 400 may be altered.

FIG. 33 is an explanatory diagram showing a change in light distribution characteristics of the strobe flashing section 15, which change occurs when the reflector 402 and the strobe flash tube 403 are moved. In cases where the distances of the reflector 402 and the strobe flash tube 403 from the optical panel 400 are comparatively short, the light distribution characteristics indicated by the solid line in FIG. 33 may be obtained. In such cases, when the distances are set to be comparatively long, the light distribution characteristics change to the characteristics indicated by the broken line in FIG. 33. Specifically, in the latter case, the decrease in peripheral light quantity becomes larger than in the former case. Also, in the latter case, the center light quantity becomes large, and the light throw distance becomes long.

The table memory 80 shown in FIG. 27 stores information representing appropriate movement distances of the reflector 402 and the strobe flash tube 403 from the optical panel 400. The appropriate movement distances are set with respect to each zooming position of the taking lens 10.

How the photographing operation with this embodiment of the camera is carried out will be described hereinbelow. In this embodiment of the camera, the taking lens 10 having a zoom magnification ratio of 3 is employed. As the finder optical system 430, a zoom optical system having a zoom magnification ratio of 6 is employed. Specifically, in this case, the finder optical system 430, which does not take part in the image quality of the object image, has a zoom magnification ratio higher than the zoom magnification ratio of the taking lens 10.

In the region in which the zoom ratio of the taking lens 10 takes a value falling within the range of 1 to 3, as in an ordinary camera, in accordance with the zooming operation, the field angle of the image displayed in the finder and the photographing field angle are changed in an interlocked manner. When the zooming operation is carried out to the tele-side beyond this range, only the field angle of the image displayed by the finder optical system 430 can be changed, while the photographing field angle is being kept unchanged. In such cases, the CPU 460 writes the storage information H, which represents the image range ratio of the image displayed by the finder optical system 430 to the object image, on the storage device 54 of the film cartridge 50 shown in FIG. 4.

How the zoom control processing, the processing for altering the light distribution characteristics of the strobe flashing section 15, and the like, are carried out by the CPU 460 shown in FIG. 27 will be described hereinbelow with reference to FIGS. 28, 29, 30, and 31.

Figure 28:
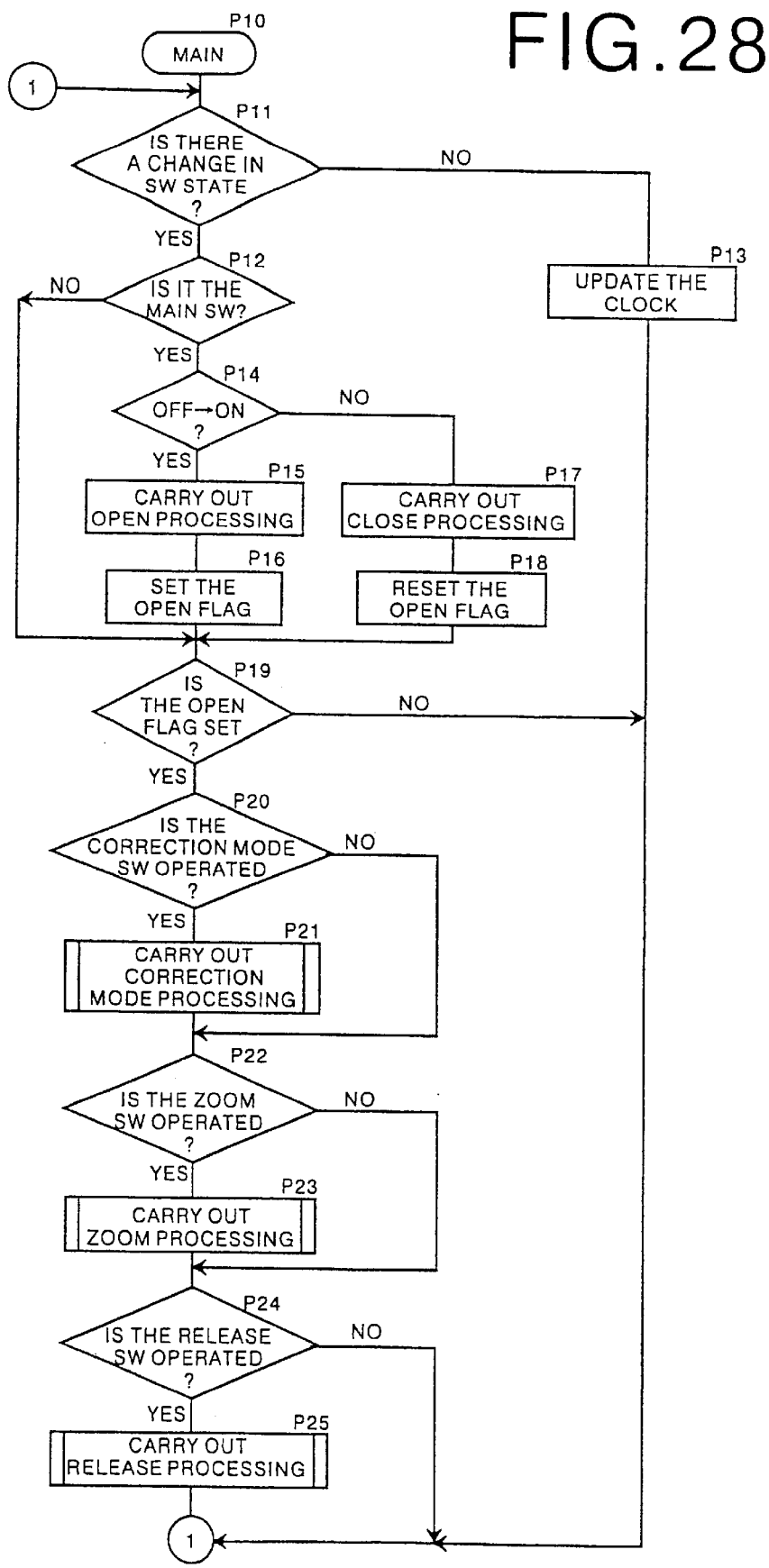
FIG. 28 is a flow chart showing how control processing is carried out in the electric control constitution shown in FIG. 27.

FIG. 28 shows a flow of general control processing carried out by the CPU 460. As illustrated in FIG. 28, in a step P10, the general control processing starts. In a step P11, a judgment is made as to whether there is or is not a change in the state of various switches of the camera. In cases where it has been judged that there is no change in the switch state, in a step P13, the incorporated clock is updated, and the processing returns to the step P11.

In cases where it has been judged in the step P11 that there is a change in the switch state, in a step P12, a judgment is made as to whether the switch whose state has been changed is or is not the main switch 64 shown in FIG. 27. In cases where it has been judged that the switch whose state has been changed is the main switch 64, in a step P14, a judgment is made as to whether the change in the state of the main switch 64 is or is not an off-to-on change.

In cases where it has been judged that the change in the state of the main switch 64 is the off-to-on change, in a step P15, open processing for setting the zoom type of taking lens 10 in a waiting state is carried out. Thereafter, in a step P16, processing for setting an open flag is carried out. In cases where it has been judged in the step P14 that the change in the state of the main switch 64 is the on-to-off change, in a step P17, close processing for setting the zoom type of taking lens 10 in a retreating state is carried out. Thereafter, in a step P18, processing for resetting the open flag is carried out.

After the open flag has been set or reset, or in cases where it has been judged in the step P12 that the switch whose state has been changed is not the main switch 64, the processing proceeds to a step P19. In the step P19, a judgment is made as to whether the open flag is or is not set. In cases where it has been judged that the open flag is not set, the processing returns to the step P11. In cases where it has been judged that the open flag is set, in a step P20, a judgment is made as to whether the correction mode switch 422 (shown in FIGS. 25 and 27) is or is not operated.

In cases where it has been judged that the correction mode switch 422 is operated, in a step P21, correction mode processing, which will be described later, is carried out. The processing then proceeds to a step P22.

In cases where it has been judged that the correction mode switch 422 is not operated, the processing proceeds from the step P20 to the step P22.

In the step P22, a judgment is made as to whether the zoom switch 63 shown in FIG. 27 is or is not operated. In cases where it has been judged that the zoom switch 63 is not operated, the processing proceeds to a step P24, which will be described later. In cases where it has been judged that the zoom switch 63 is operated, in a step P23, zoom processing is carried out. How the zoom processing is carried out will be described later.

Thereafter, in the step P24, a judgment is made as to whether the release switch 62 shown in FIG. 27 is or is not operated. In cases where it has been judged that the release switch 62 is not operated, the processing returns to the step P11. In cases where it has been judged that the release switch 62 is operated, in a step P25, release processing is carried out. Thereafter, the processing returns to the step P11.

Figure 29:
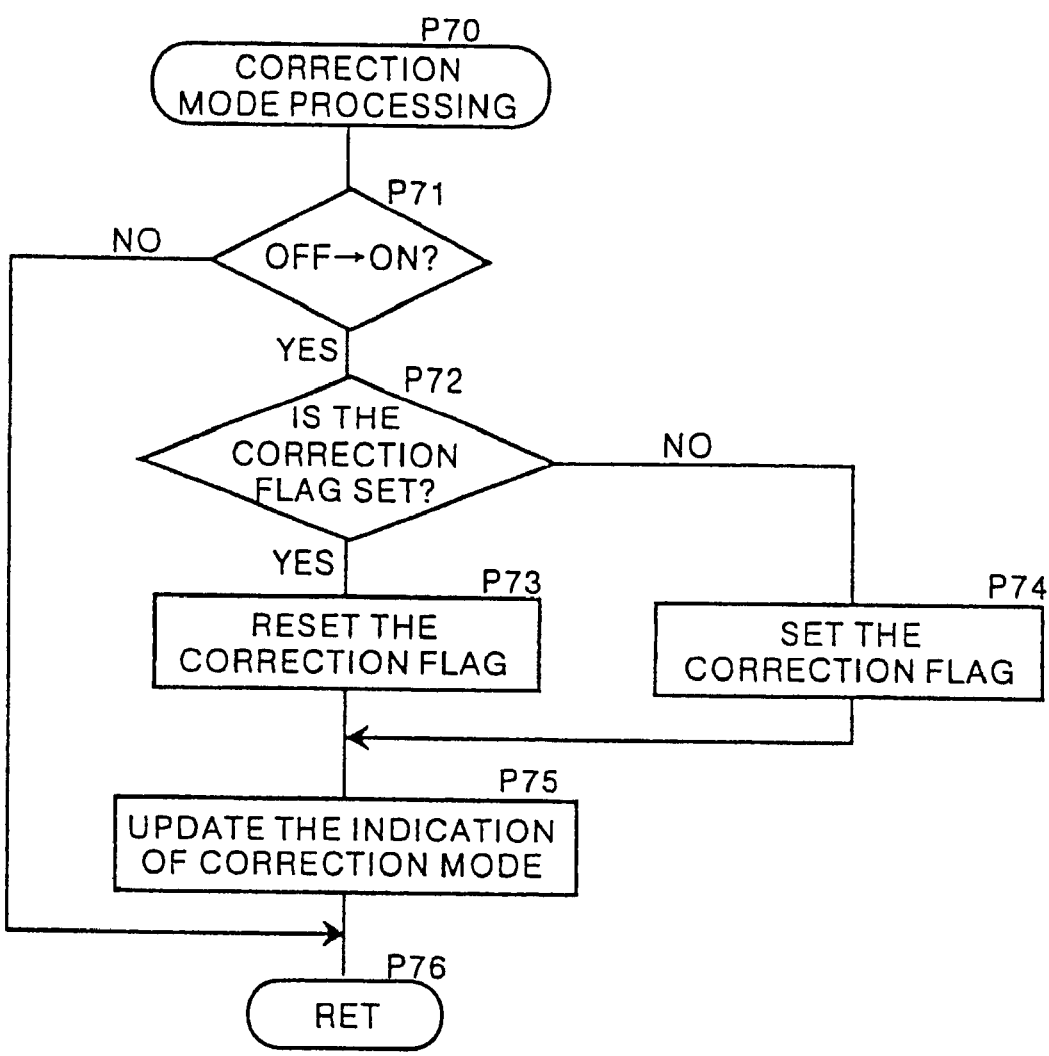
FIG. 29 is a flow chart showing a part of the flow of the control processing shown in FIG. 28.

How the correction mode processing is carried out in the step P21 will be described hereinbelow with reference to FIG. 29. As illustrated in FIG. 29, in a step P70, the subroutine processing for the correction mode processing starts. In a step P71, a judgment is made as to whether the operation of the correction mode switch 422 is or is not an off-to-on operation.

In cases where it has been judged that the operation of the correction mode switch 422 is the off-to-on operation, in a step P72, a judgment is made as to whether the correction flag is or is not set. In cases where it has been judged that the correction flag is set, in a step P73, the correction flag is reset. In cases where it has been judged that the correction flag is not set, in a step P74, the correction flag is set.

When the correction flag has been set or reset, in a step P75, the indication on the LCD 66 shown in FIG. 27 is updated. With the updating operation, the indication that the correction mode is on is displayed or erased. Thereafter, in a step P76, the subroutine is finished. Also, the processing returns to the flow shown in FIG. 28.

Figure 30:
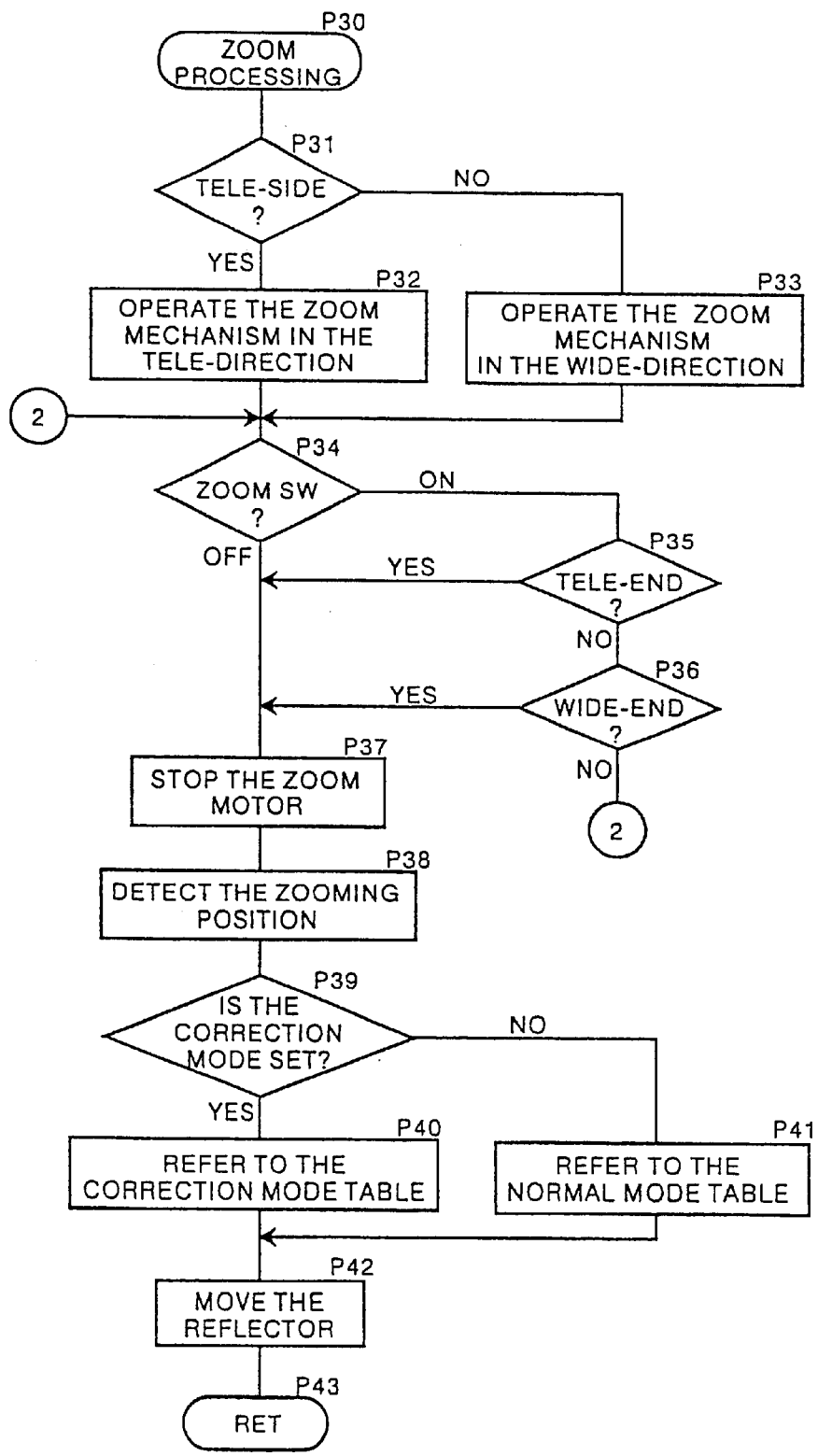
FIG. 30 is a flow chart showing a different part of the flow of the control processing shown in FIG. 28.

How the zoom processing is carried out in the step P23 shown in FIG. 28 will be described hereinbelow with reference to FIG. 30. As illustrated in FIG. 30, in a step P30, the subroutine processing for the zoom processing starts. In a step P31, a judgment is made as to whether the operation of the zoom switch 63 is or is not the operation to the tele-side.

In cases where it has been judged that the operation of the zoom switch 63 is the operation to the tele-side, in a step P32, processing for zooming the taking lens 10 by a predetermined distance to the tele-side is carried out. The zooming is carried out by operating the zoom driving motor 78 with the driver 72. In cases where it has been judged that the operation of the zoom switch 63 is not the operation to the tele-side, i.e. in cases where the zoom switch 63 is operated to the wide-side, in a step P33, processing for zooming the taking lens 10 by a predetermined distance to the wide-side is carried out.

The zooming processing to the tele-side or the wide-side is carried out in the manner described above. Thereafter, in a step P34, a judgment is made as to whether the zoom switch 63.is or is not operated even further. In cases where it has been judged that the zoom switch 63 is operated even further, in a step P35, a judgment is made as to whether the taking lens 10 has or has not reached the tele-end position. In cases where it has been judged that the taking lens 10 has reached the tele-end position, in a step P37, the zoom driving motor 78 is stopped.

In cases where it has been judged that the taking lens 10 has not reached the tele-end position, in a step P36, a judgment is made as to whether the taking lens 10 has or has not reached the wide-end position. In cases where it has been judged that the taking lens 10 has reached the wide-end position, in the step P37, the zoom driving motor 78 is stopped.

In cases where it has been judged that the taking lens 10 has not reached the wide-end position, the processing returns to the step P34, and the same processing as the processing described above is repeated. In cases where it has been judged in the step P34 that the zoom switch 63 is not operated, in the step P37, the zoom driving motor 78 is stopped.

When the zoom driving motor 78 is thus stopped, in cases where the taking lens 10 is in the state in which the zoom magnification ratio falls within the range of 1 to 3, as described above, the zooming position of the finder optical system 430 is such that the zoom magnification ratio may fall within the range of 1 to 3, and the image of the same field angle as the field angle of the image displayed in the finder can be recorded. In cases where the finder optical system 430 is in the state in which the zoom magnification ratio falls within the range of 3 to 6, the zooming position of the taking lens 10 is set at the tele-end position at all times.

Thereafter, in a step P38, the zooming position of the taking lens 10 is detected. The detection is carried out by utilizing, for example, an output of a linear encoder for detecting the positions of the zoom lenses.

Thereafter, in a step P39, a judgment is made as to whether the correction mode is or is not set, i.e. whether the aforesaid correction flag is or is not on. In cases where it has been judged that correction flag is on, in a step P40, reference is made to a correction mode table, which is stored in the table memory 80 shown in FIG. 27, and the processing for calculating the movement distances of the reflector 402 and the strobe flash tube 403 from the optical panel 400 is carried out. In cases where it has been judged that correction flag is not on, in a step P41, reference is made to a normal mode table, which is stored in the table memory 80 shown in FIG. 27, and the processing for calculating the movement distances of the reflector 402 and the strobe flash tube 403 from the optical panel 400 is carried out.

Table 1 below shows an example of the correction mode table. Table 2 below shows an example of the normal mode table.

TABLE 1

[Correction Mode Table]

| Zoom-ing Position | Center Light Quantity | Top/bottom light quantity | | | | Right/left light quantity | | | | [Unit:EV] Reflector movement distance |
|---|---|---|---|---|---|---|---|---|---|---|
| | | Top 100% | Top 50% | Bottom 50% | Bottom 100% | Left 100% | Left 50% | Right 50% | Right 100% | |
| Z1 | 0.00 | −2.30 | −0.81 | −0.81 | −2.30 | −3.00 | −1.05 | −1.05 | −3.00 | 4.0 mm |
| Z2 | −0.10 | −2.00 | −0.70 | −0.70 | −2.00 | −2.60 | −0.91 | −0.91 | −2.60 | 4.6 mm |
| Z3 | −0.20 | −1.70 | −0.60 | −0.60 | −1.70 | −2.20 | −0.77 | −0.77 | −2.20 | 5.2 mm |
| Z4 | −0.30 | −1.40 | −0.49 | −0.49 | −1.40 | −1.80 | −0.63 | −0.63 | −1.80 | 5.8 mm |
| Z5 | −0.40 | −1.10 | −0.39 | −0.39 | −1.10 | −1.40 | −0.49 | −0.49 | −1.40 | 6.4 mm |
| Z6 | −0.50 | −0.80 | −0.28 | −0.28 | −0.80 | −1.00 | −0.35 | −0.35 | −1.00 | 7.0 mm |
| Z7 | −0.60 | −0.50 | −0.18 | −0.18 | −0.50 | −0.60 | −0.21 | −0.21 | −0.60 | 7.6 mm |
| Z8 | −0.70 | −0.40 | −0.14 | −0.14 | −0.40 | −0.40 | −0.14 | −0.14 | −0.40 | 8.2 mm |

TABLE 2

[Normal Mode Table]

| Zooming Position | Center Light Quantity | Top/bottom light quantity | | | | Right/left light quantity | | | | [Unit:EV] Reflector movement distance |
|---|---|---|---|---|---|---|---|---|---|---|
| | | Top 100% | Top 50% | Bottom 50% | Bottom 100% | Left 100% | Left 50% | Right 50% | Right 100% | |
| Z1 | −0.50 | −0.30 | −0.11 | −0.11 | −0.30 | −0.20 | −0.07 | −0.07 | −0.20 | 2.0 mm |
| Z2 | −0.80 | −0.25 | −0.09 | −0.09 | −0.25 | −0.16 | −0.06 | −0.06 | −0.16 | 2.5 mm |
| Z3 | −1.10 | −0.20 | −0.07 | −0.07 | −0.20 | −0.12 | −0.04 | −0.04 | −0.12 | 3.1 mm |
| Z4 | −1.40 | −0.15 | −0.05 | −0.05 | −0.15 | −0.08 | −0.03 | −0.03 | −0.08 | 3.7 mm |
| Z5 | −1.70 | −0.10 | −0.04 | −0.04 | −0.10 | −0.04 | −0.01 | −0.01 | −0.04 | 4.3 mm |
| Z6 | −2.00 | −0.05 | −0.02 | −0.02 | −0.05 | 0.00 | 0.00 | 0.00 | 0.00 | 4.9 mm |
| Z7 | −2.30 | 0.00 | 0.00 | 0.00 | 0.00 | 0.00 | 0.00 | 0.00 | 0.00 | 5.5 mm |
| Z8 | −2.60 | 0.00 | 0.00 | 0.00 | 0.00 | 0.00 | 0.00 | 0.00 | 0.00 | 6.1 mm |

When Table 1 and Table 2 are compared with each other, in cases where the zooming position of the taking lens 10 is the same, the movement distances of the reflector 402 and the strobe flash tube 403 from the optical panel 400, which distances are defined in the correction mode table, are longer than those defined in the normal mode table. Specifically, when the correction mode table is referred to, the light distribution characteristics of the strobe are set such that the decrease in peripheral light quantity may become large and the light throw distance may become long.

Also, when the movement distances described above are calculated, pieces of information representing the center light quantity, the top and bottom light quantities, and the right and left light quantities, which are specified with respect to the movement distances in the table, and the information representing the corresponding frame number are stored in a memory (not shown).

In Tables 1 and 2, a zooming position Z1 is the wide-end position, and a zooming position Z8 is the tele-end position. Zooming positions Z2 through Z7 are the positions located successively between the wide-end position and the tele-end position.

Thereafter, in a step P42, processing for moving the reflector 402 and the strobe flash tube 403 by the movement distances, which have been obtained by making reference to the table in the manner described above, is carried out. The movement is carried out by the reflector driving motor 77 shown in FIG. 27. When the movement has been finished, in a step P43, the subroutine processing is finished. Also, the processing returns to the flow shown in FIG. 28.

Figure 31:
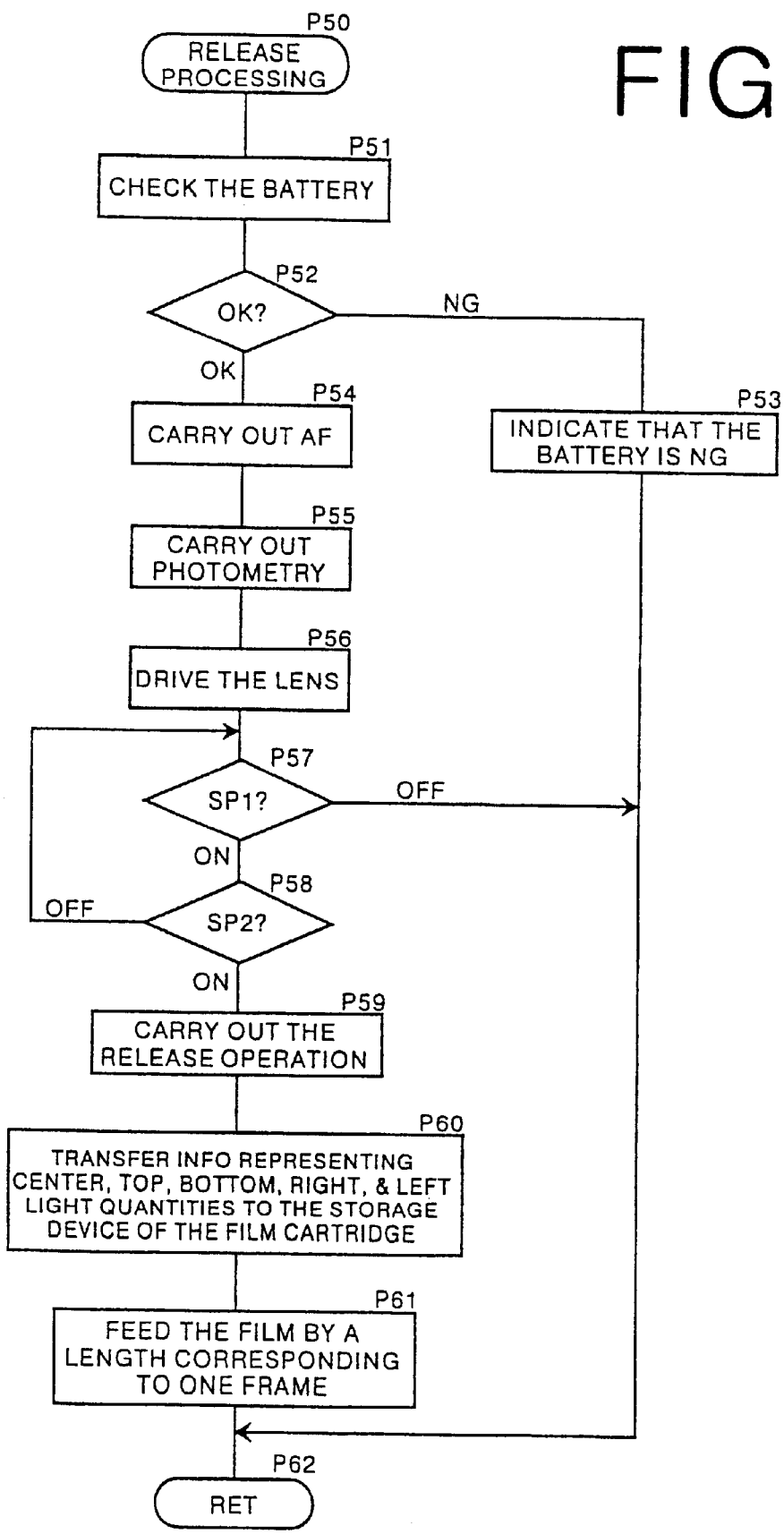
FIG. 31 is a flow chart showing a further different part of the flow of the control processing shown in FIG. 28, FIGS. 32A and 32B are side views showing a strobe flashing section in the camera shown in FIG. 25.

How the release processing in the step P25 shown in FIG. 28 is carried out will be described hereinbelow with reference to FIG. 31. As illustrated in FIG. 31, in a step P50, the subroutine processing for the release starts. Thereafter, in a step P51, a battery check is made. In a step P52, a judgment is made as to whether the results of the battery check are or are not good. In cases where it has been judged that the battery does not satisfy predetermined performance, in a step P53, the results of the battery check are indicated in the finder. Also, in a step P62, the subroutine processing is finished.

In cases where it has been judged that in the step P52 that the results of the battery check are good, in steps P54, P55, and P56, respectively, distance measurement, photometry, and lens driving processing for the focusing are carried out.

Thereafter, in a step P57, a judgment is made as to whether the shutter push button 20 shown in FIG. 25 has or has not reached a predetermined push-down position P1. In cases where it has been judged that the shutter push button 20 has not reached the push-down position P1, in the step P62, the subroutine processing is finished. Also, the processing returns to the flow shown in FIG. 28.

In cases where it has been judged that the shutter push button 20 has reached the push-down position P1, in a step P58, a judgment is made as to whether the shutter push button 20 has or has not reached a predetermined push-down position P2, which is deeper than the push-down position P1. In cases where it has been judged that the shutter push button 20 has not reached the push-down position P2, the processing returns to the step P57. In cases where it has been judged that the shutter push button 20 has reached the push-down position P2, in a step P59, a release operation is carried out, and the photographing operation is completed.

Thereafter, in a step P60, the pieces of information G representing the center light quantity, the top and bottom light quantities, and the right and left light quantities, which have been obtained in the step P40 or P41 shown in FIG. 30 and have been stored in the memory (not shown) together with the information representing the corresponding frame number, are transferred to the storage device 54 of the cartridge 53 shown in FIG. 4 and written on it. At this time, information H, which represents the image range of the image displayed by the aforesaid finder optical system 430, is also written on the storage device 54.

The writing of the information may be carried out with a contact technique via a contact point or with a non-contact technique.

In a step P61, the photographic film 51 is fed by a length corresponding to one frame. Thereafter, in a step P62, the subroutine is finished. Also, the processing returns to the flow shown in FIG. 28.

After object images have been recorded in the frames of the photographic film 51 accommodated in the film cartridge 50, the film cartridge 50 is taken out of the camera body 1 and subjected to the development processing in a processing laboratory, or the like. In this manner, the photographic latent images having been recorded on the photographic film 51 are developed. From the thus formed negative film, photoprints are formed on predetermined recording paper. At this time, processing for compensation for the insufficiency in peripheral light quantity of the strobe and the pseudo zoom processing are carried out in accordance with the pieces of information, which have been stored in the storage device 54. How the such processing is carried out will hereinbelow be described in detail.

In this embodiment, the photo printing system illustrated in FIG. 7 is utilized.

In the photo printing system, as described above, the image processing apparatus 101 carries out predetermined image processing on the image signal, which has been detected from the developed photographic film 51A, and transfers the processed image signal to the photo printer 102. Also, the image processing apparatus 101 records the processed image signal on media 106, such as CD-R. Further, in this embodiment, the image processing apparatus 101 receives pieces of information G and H, which have been stored in the storage device 54 and have been read by the reading means 103, from the reading means 103.

The system constitution of the photo printing system, which is employed in this embodiment, will hereinbelow be described in detail with reference to FIG. 34. In the constitution shown in FIG. 34, functions concerning the image processing may be provided as the functions of the image processing apparatus 101, or may be incorporated as the functions of the photo printer 102 or the film scanner. Therefore, the constitution shown in FIG. 34 will be described hereinbelow without the correspondence with FIG. 7 being manifested.

As illustrated in FIG. 34, the scanner 110 detects an image signal from the photographic image. The image signal is processed by various image processing means 111, 112, 413, 114, 115, and 116 and is then used in the photo printer 102 for reproducing a photoprint.

The set-up gradation/color processing means 111 automatically makes a judgment as to under-exposure or over-exposure and makes a correction to an appropriate value.

The image size enlargement or reduction processing means 112 converts pixel density for matching the size of the printed image to the width of a recording material (e.g., a roll of printing paper) or for carrying out the pseudo zoom processing. An image density correction processing means 413 adjusts the image density, which is represented by the image signal, with respect to each of portions of the image. The graininess suppression type of sharpness enhancement processing means 114 carries out a graininess suppression type of sharpness enhancement processing described in, for example, Japanese Unexamined Patent Publication No. 9(1997)-22460.

Further, besides a series of image processing described above, color conversion in accordance with characteristics of the printer is carried out on the image signal for print reproduction by the 3D conversion processing means 115 or 116. The 3D conversion processing varies in accordance with whether the film from which the image signal was obtained is negative film or reversal film.

How the pixel density conversion for the pseudo zoom processing is carried out by the image size enlargement or reduction processing means 112 will be described hereinbelow. The image size enlargement or reduction processing means 112 receives the storage information H of each of frames of the photographic film 51A from the reading means 103. As described above, the storage information H represents the image range ratio of the image displayed in the finder to the object image. In accordance with the image range ratio, the image size enlargement or reduction processing means 112 carries out the image size enlargement or reduction processing (pixel density conversion) such that a printed image of the same range as the image displayed in the finder may be obtained.

At this time, as described above, as for the images having been recorded when the finder optical system 430 is set in the state in which the zoom magnification ratio falls within the range of 1 to 3, the field angle is identical with the field angle of the image displayed in the finder. Therefore, as for such images, the relationship between the size of the image recorded on the film and the size of the printed image becomes identical with the relationship shown in FIGS. 9A and 9B. Specifically, in such cases, printing processing is carried out such that an image shown in FIG. 9A, which has been recorded in a certain frame F on the developed photographic film 51A, may be reproduced on the recording material 200 having a predetermined size as shown in FIG. 9B, such that the image size may not be enlarged or reduced.

As for the images having been recorded when the finder optical system 430 is set in the state in which the zoom ratio falls within the range of 3 to 6, the relationship between the size of the image recorded on the film and the size of the printed image becomes identical with the relationship shown in FIGS. 9A and 9C. Specifically, as for such images, the pseudo zoom processing is carried out.

As described above, with this embodiment of the camera and the photo printing system in accordance with the present invention, even if the taking lens 10 having a zoom ratio of 3 is employed, a photoprint can be obtained as if it were photographed with a taking lens having a zoom ratio of 6.

How the image density correction processing is carried out by the image density correction processing means 413 will be described hereinbelow. The reading means 103 reads the storage information G with respect to each frame from the storage device 54 of the film cartridge 50 and feeds it into the image density correction processing means 413. When necessary, the image density correction processing means 413 carries out processing on the image signal, which represents the image recorded in the frame, for partially setting the printed image density at a low value such that the insufficiency in peripheral light quantity may be compensated for. Whether the processing is or is not necessary, the range of the correction, and the amount of correction are determined in accordance with a predetermined program and from the center light quantity, the top and bottom light quantities, and the right and left light quantities, which are represented by the storage information G.

In cases where the image density correction processing is carried, even if an image was recorded with the strobe, which was set such that the peripheral light quantity may become small and the light throw distance may become long, a print can be obtained, in which the image density has been corrected over the entire area.

In this embodiment, the printed image density is partially corrected such that the insufficiency in peripheral light quantity of the strobe may be compensated for. However, in cases where an image is recorded by setting the light distribution characteristics of the strobe such that a sufficient peripheral light quantity may be obtained, under-exposure will often occur over the entire image area. With the embodiment of the camera and the photo printing system in accordance with the present invention, such under-exposure can also be compensated for.

What is claimed is:

1. A camera, which utilizes a film cartridge provided with an information storing means, the camera comprising:
   i) a light distribution characteristics altering means for altering light distribution characteristics of a strobe, and
   ii) a writing means for writing information, which represents said light distribution characteristics with respect to each of frames on photographic film, and information, which represents the corresponding frame number, on the information storing means of the film cartridge.

2. A camera as defined in claim 1, wherein said light distribution characteristics altering means changes positions of a flash tube and a reflector of said strobe relative to the position of an optical panel, which is located in front of said flash tube.

3. A camera as defined in claim 1, wherein said light distribution characteristics altering means changes relationship between a position of a flash tube of said strobe and a position of a reflector of said strobe.

4. A camera as defined in claim 1, wherein said light distribution characteristics altering means changes characteristics of an optical panel, which is located in front of a flash tube of said strobe.

5. A camera as defined in claim 1, wherein the camera further comprises:
 a taking lens constituted of a zoom optical system,
 a plurality of tables, each of which defines the light distribution characteristics with respect to one of a plurality of zooming positions of said taking lens,
 a table selecting means for selecting a table from the plurality of said tables, and
 a control means for controlling said light distribution characteristics altering means in accordance with the table, which has been selected by said table selecting means, such that the light distribution characteristics according to a zooming position of said taking lens may be obtained.

6. A camera as defined in claim 1, wherein said writing means also writes information representing an image range ratio of an image, which is displayed in a region of a finder representing an image recording range, to an object image, which is formed by a taking lens optical system of the camera, said information being written on the information storing means of the film cartridge.

7. A photo printing system, wherein a photoprint is obtained from the film cartridge having been used in a camera as defined in claim 1, the photo printing system comprising:
 i) a printing means for printing a n object image on a recording material and from the photographic film, which has been subjected to development processing,
 ii) a reading means for reading said information representing said light distribution characteristics, which information has been written on the information storing means of the film cartridge, and
 iii) a printed image density control means for controlling printed image density, which is formed by said printing means, in accordance with said information, which has been read by said reading means, such that an incorrect exposure may be compensated for with respect to each portion in a surface of said recording material.

8. A photo printing system as defined in claim 7, wherein said printed image density control means controls the printed image density at a peripheral portion of said recording material, such that insufficiency in brightness of an edge of an image field due to said strobe may be compensated for.

9. A photo printing system as defined in claim 7, wherein said printing means comprises:
 a) a film image read-out means for reading out a film image formed on the photographic film, which has been subjected to the development processing, and thereby obtaining an image signal representing the film image, and
 b) a printed image output means for reproducing said film image on the recording material from said image signal, and
 said printed image density control means carries out signal processing on said image signal and thereby changes the printed image density.

10. A photo printing system as defined in claim 7, wherein said printing means prints the object image in a predetermined image forming area on the recording material and from the photographic film, which has been subjected to the development processing, said printing being carried out such that image size enlargement and reduction scales may be altered,
 said reading means also reads information representing an image range ratio of an image, which is displayed in a region of a finder representing an image recording range, to an object image, which is formed by a taking lens optical system of the camera, said information having been written on the information storing means of the film cartridge, and
 the photo printing system further comprises an image size enlargement and reduction scales control means for setting the image size enlargement scale or the image size reduction scale in the printing operation, which is carried out by said printing means, at a value at which the image displayed in said region of said finder is printed in said image forming area such that the entire area of the image displayed in said region may approximately exactly correspond to the entire area of said image forming area, said image size enlargement scale or said image size reduction scale being set in accordance with said information, which represents said image range ratio and has been read by said reading means.

11. A camera, which utilizes a film cartridge provided with an information storing means, the camera comprising:
 i) a light distribution characteristics altering means for altering light distribution characteristics of a strobe, and
 ii) a writing means for writing information, which represents said light distribution characteristics on photographic film, on the information storing means of the film cartridge.

12. A camera as defined in claim 11, wherein said light distribution characteristics altering means changes positions of a flash tube and a reflector of said strobe relative to the position of an optical panel, which is located in front of said flash tube.

13. A camera as defined in claim 11, wherein said light distribution characteristics altering means changes relationship between a position of a flash tube of said strobe and a position of a reflector of said strobe.

14. A camera as defined in claim 11, wherein said light distribution characteristics altering means changes characteristics of an optical panel, which is located in front of a flash tube of said strobe.

15. A camera as defined in claim 11, wherein the camera further comprises:
 a taking lens constituted of a zoom optical system,
 a plurality of tables, each of which defines the light distribution characteristics with respect to one of a plurality of zooming positions of said taking lens,
 a table selecting means for selecting a table from the plurality of said tables, and
 a control means for controlling said light distribution characteristics altering means in accordance with the table, which has been selected by said table selecting means, such that the light distribution characteristics according to a zooming position of said taking lens may be obtained.

16. A camera as defined in claim 11, wherein said writing means also writes information representing an image range ratio of an image, which is displayed in a region of a finder representing an image recording range, to an object image, which is formed by a taking lens optical system of the camera, said information being written on the information storing means of the film cartridge.

17. A photo printing system, wherein a photoprint is obtained from the film cartridge having been used in a camera as defined in claim 11, the photo printing system comprising:

i) a printing means for printing an object image on a recording material and from the photographic film, which has been subjected to development processing, ii) a reading means for reading said information representing said light distribution characteristics, which information has been written on the information storing means of the film cartridge, and iii) a printed image density control means for controlling printed image density, which is formed by said printing means, in accordance with said information, which has been read by said reading means, such that an incorrect exposure may be compensated for with respect to each portion in a surface of said recording material.

18. A photo printing system as defined in claim 17, wherein said printed image density control means controls the printed image density at a peripheral portion of said recording material, such that insufficiency in brightness of an edge of an image field due to said strobe may be compensated for.

19. A photo printing system as defined in claim 17, wherein said printing means comprises:

a) a film image read-out means for reading out a film image formed on the photographic film, which has been subjected to the development processing, and thereby obtaining an image signal representing the film image, and b) a printed image output means for reproducing said film image on the recording material from said image signal, and said printed image density control means carries out signal processing on said image signal and thereby changes the printed image density.

20. A photo printing system as defined in claim 17, wherein said printing means prints the object image in a predetermined image forming area on the recording material and from the photographic film, which has been subjected to the development processing, said printing being carried out such that image size enlargement and reduction scales may be altered, said reading means also reads information representing an image range ratio of an image, which is displayed in a region of a finder representing an image recording range, to an object image, which is formed by a taking lens optical system of the camera, said information having been written on the information storing means of the film cartridge, and the photo printing system further comprises an image size enlargement and reduction scales control means for setting the image size enlargement scale or the image size reduction scale in the printing operation, which is carried out by said printing means, at a value at which the image displayed in said region of said finder is printed in said image forming area such that the entire area of the image displayed in said region may approximately exactly correspond to the entire area of said image forming area, said image size enlargement scale or said image size reduction scale being set in accordance with said information, which represents said image range ratio and has been read by said reading means.

* * * * *